US00RE46186E

(19) United States
(12) Reissued Patent
Sabe et al.

(10) Patent Number: US RE46,186 E
(45) Date of Reissued Patent: Oct. 25, 2016

(54) INFORMATION PROCESSING APPARATUS, INFORMATION PROCESSING METHOD, AND COMPUTER PROGRAM FOR CONTROLLING STATE TRANSITION

(71) Applicant: Sony Corporation, Tokyo (JP)

(72) Inventors: Kohtaro Sabe, Tokyo (JP); Katsuki Minamino, Tokyo (JP); Kenta Kawamoto, Tokyo (JP); Hirotaka Suzuki, Kanagawa (JP); Kenichi Hidai, Tokyo (JP)

(73) Assignee: Sony Corporation (JP)

(21) Appl. No.: 13/927,708

(22) Filed: Jun. 26, 2013

Related U.S. Patent Documents

Reissue of:
(64) Patent No.: 8,290,885
Issued: Oct. 16, 2012
Appl. No.: 12/381,499
Filed: Mar. 12, 2009

(30) Foreign Application Priority Data

Mar. 13, 2008 (JP) ..... P2008-064993
Mar. 13, 2008 (JP) ..... P2008-064994
Mar. 13, 2008 (JP) ..... P2008-064995

(51) Int. Cl.
*G06F 17/00* (2006.01)
*G06N 5/00* (2006.01)
*G05B 19/045* (2006.01)
*G06N 99/00* (2010.01)
(Continued)

(52) U.S. Cl.
CPC ..... *G05B 19/045* (2013.01); *G05B 13/0265* (2013.01); *G06N 99/005* (2013.01); *G05B 2219/23288* (2013.01); *G10L 15/142* (2013.01)

(58) Field of Classification Search
CPC ..... G05B 19/045; G05B 13/0265; G05B 2219/23288; G10L 15/142; G06N 99/005
USPC ..... 706/14, 25, 19, 22, 55, 58, 59; 700/94; 715/716; 704/256.1–256.8
See application file for complete search history.

(56) References Cited

U.S. PATENT DOCUMENTS 5,995,963 A * 11/1999 Nanba et al.
6,212,510 B1 * 4/2001 Brand ..... G06K 9/00342 706/12

(Continued)

FOREIGN PATENT DOCUMENTS

JP 5054068 A 3/1993

OTHER PUBLICATIONS

English translation of Japanese Office Action issued on Dec. 8, 2009, issued in Japanese Patent Application No. 2008-064993.

(Continued)

*Primary Examiner* — Adam L Basehoar
(74) *Attorney, Agent, or Firm* — Lerner, David, Littenberg, Krumholz & Mentlik, LLP

(57) ABSTRACT

An information processing apparatus includes: model learning means for self-organizing, on the basis of a state transition model having a state and state transition to be learned by using time series data as data in time series, an internal state from an observation signal obtained by a sensor; and controller learning means for performing learning for allocating a controller, which outputs an action, to each of transitions of a state or each of transition destination states in the state transition model indicating the internal state self-organized by the model learning means.

30 Claims, 60 Drawing Sheets

(51) Int. Cl.
*G05B 13/02* (2006.01)
*G10L 15/14* (2006.01)

(56) References Cited

U.S. PATENT DOCUMENTS

| | | | | |
|---|---|---|---|---|
| 6,801,656 | B1 * | 10/2004 | Colmenarez et al. | 382/159 |
| 7,076,102 | B2 * | 7/2006 | Lin | G06K 9/00335 348/E7.086 |
| 7,203,635 | B2 * | 4/2007 | Oliver | G06K 9/6293 345/156 |
| 7,260,558 | B1 * | 8/2007 | Cheng | G06F 17/30985 706/12 |
| 2002/0165717 | A1 * | 11/2002 | Solmer | G06F 17/2775 704/256.4 |
| 2005/0004786 | A1 * | 1/2005 | Thomason | 703/17 |
| 2005/0256817 | A1 * | 11/2005 | Wren et al. | 706/45 |
| 2006/0241927 | A1 * | 10/2006 | Kadambe et al. | 703/20 |
| 2006/0248026 | A1 * | 11/2006 | Aoyama et al. | 706/12 |
| 2008/0300879 | A1 * | 12/2008 | Bouchard et al. | 704/256 |
| 2009/0018877 | A1 * | 1/2009 | Houck et al. | 705/7 |

OTHER PUBLICATIONS

Tatsuya Akutsu,Mathematical Algorithms of Bioinformatics, publication dated Feb. 15, 2007, pp. 62-71. (Hidden Markov Model).

Brants, T., Estimating Markov model structures, Fourth International Conference on Spoken Language, 1996, ICSLP 96, Proceedings, Oct. 3, 1996 No. 2, pp. 893-896.

Ikeda, Shiro, Generation of the phoneme model by the structure search of HMM, Institute of Electronics, Information and Communication Engineers article magazine, Japan, Corporate judicial person Institute of Electronics, Information and Communication Engineers, Jan. 25, 1995, vol. J78-D-II, No. 1, pp. 10-18.

Itsuki, Noda, "Hidden Markov Modeling for Multi-agent Systems," PRICAI 2002, LNAI 2417, pp. 128-137, 2002. Springer-Verlag Berlin Heidelberg 2002.

B. Fritzke, "Growing Grid—a self-organizing network with constant neighborhood range and adaptation strength", *Neural Processing Letters*, vol. 2, No. 5, pp. 9-13 (1995).

* cited by examiner

FIG. 32B
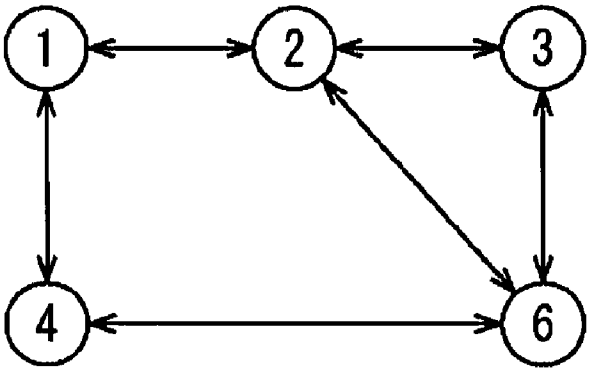
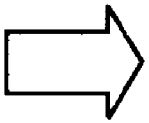
FIG. 32A
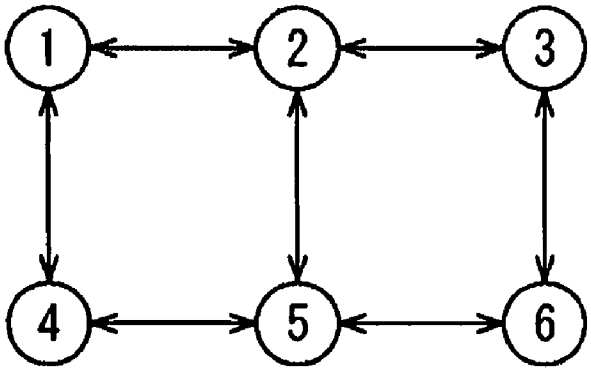

FIG. 33B
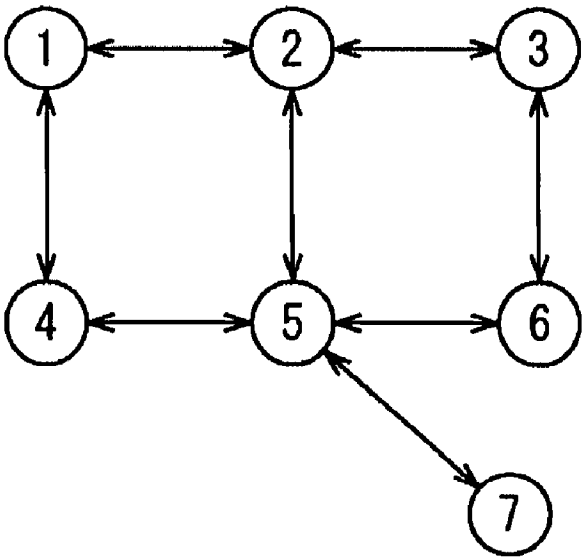
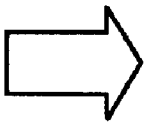
FIG. 33A
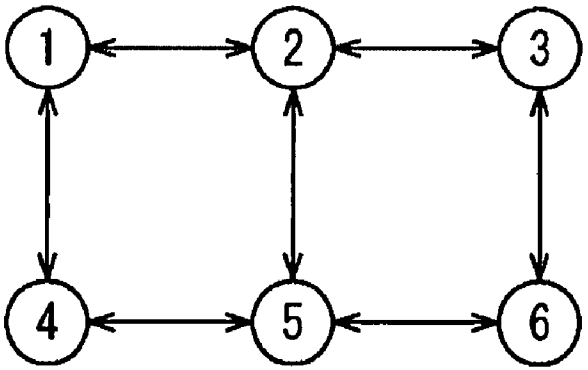

FIG. 34B
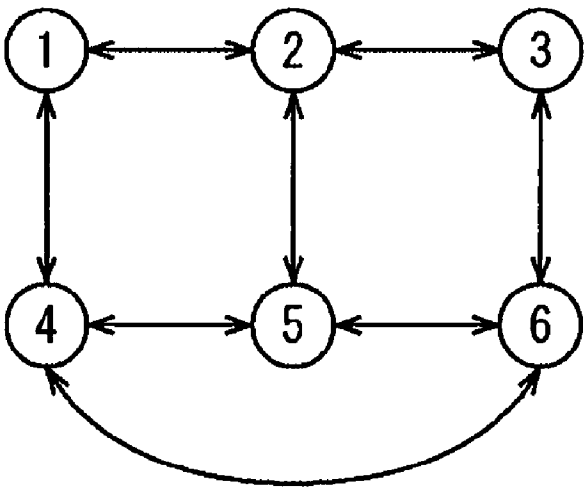
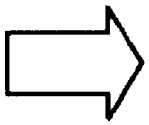
FIG. 34A
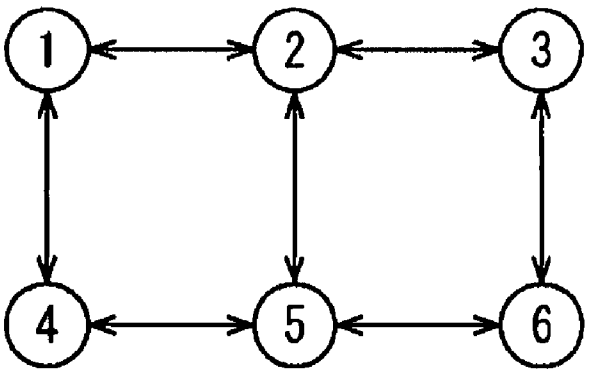

LEARNING INITIAL PERIOD

LEARNING INTERMEDIATE PERIOD

AFTER LEARNING ENDS

FIG. 46

$$\begin{bmatrix}1\\1\\1\end{bmatrix}_{t=0} \quad \begin{bmatrix}1\\2\\1\end{bmatrix}_{t=1} \quad \begin{bmatrix}1\\2\\1\end{bmatrix}_{t=2} \quad \begin{bmatrix}2\\2\\1\end{bmatrix}_{t=3} \quad \begin{bmatrix}2\\4\\3\end{bmatrix}_{t=4} \quad \begin{bmatrix}3\\4\\3\end{bmatrix}_{t=5} \quad \cdots$$

FIG. 47A $\{1, 2\} : 2 \times 4 = 8$ $$\begin{bmatrix} 1 \\ 1 \\ - \end{bmatrix} \begin{bmatrix} 1 \\ 2 \\ - \end{bmatrix} \cdots \begin{bmatrix} 2 \\ 3 \\ - \end{bmatrix} \begin{bmatrix} 2 \\ 4 \\ - \end{bmatrix}$$

FIG. 47B $\{1, 3\} : 2 \times 3 = 6$ $$\begin{bmatrix} 1 \\ - \\ 1 \end{bmatrix} \begin{bmatrix} 1 \\ - \\ 2 \end{bmatrix} \cdots \begin{bmatrix} 2 \\ - \\ 2 \end{bmatrix} \begin{bmatrix} 2 \\ - \\ 3 \end{bmatrix}$$

FIG. 47C $\{2, 3\} : 4 \times 3 = 12$ $$\begin{bmatrix} - \\ 1 \\ 1 \end{bmatrix} \begin{bmatrix} - \\ 1 \\ 2 \end{bmatrix} \cdots \begin{bmatrix} - \\ 4 \\ 2 \end{bmatrix} \begin{bmatrix} - \\ 4 \\ 3 \end{bmatrix}$$

FIG. 47D $\{1, 2, 3\} : 2 \times 4 \times 3 = 24$ $$\begin{bmatrix} 1 \\ 1 \\ 1 \end{bmatrix} \begin{bmatrix} 1 \\ 1 \\ 2 \end{bmatrix} \cdots \begin{bmatrix} 2 \\ 4 \\ 2 \end{bmatrix} \begin{bmatrix} 2 \\ 4 \\ 3 \end{bmatrix}$$

FIG. 48A

{2} : 4

$$\begin{bmatrix} * \\ 1 \\ - \end{bmatrix} \begin{bmatrix} * \\ 2 \\ - \end{bmatrix} \begin{bmatrix} * \\ 3 \\ - \end{bmatrix} \begin{bmatrix} * \\ 4 \\ - \end{bmatrix}$$

FIG. 48B

{3} : 3

$$\begin{bmatrix} * \\ - \\ 1 \end{bmatrix} \begin{bmatrix} * \\ - \\ 2 \end{bmatrix} \begin{bmatrix} * \\ - \\ 3 \end{bmatrix}$$

FIG. 48C

{2, 3} : 4 × 3 = 12

$$\begin{bmatrix} * \\ 1 \\ 1 \end{bmatrix} \begin{bmatrix} * \\ 1 \\ 2 \end{bmatrix} \cdots \begin{bmatrix} * \\ 4 \\ 2 \end{bmatrix} \begin{bmatrix} * \\ 4 \\ 3 \end{bmatrix}$$

FIG. 49

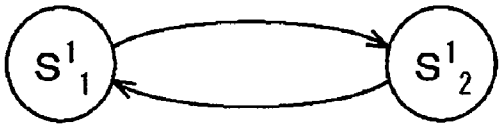

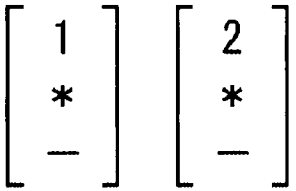
FIG. 50A {1} :2
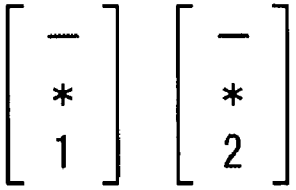
FIG. 50B {3} :3
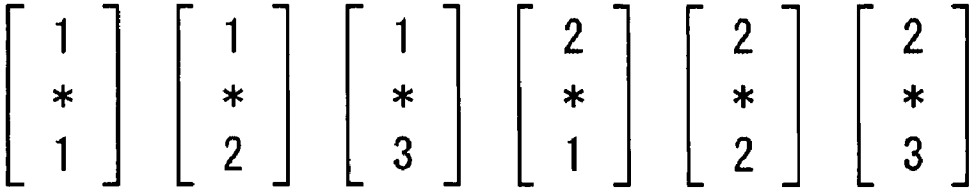
FIG. 50C {1, 3} :2 × 3=6

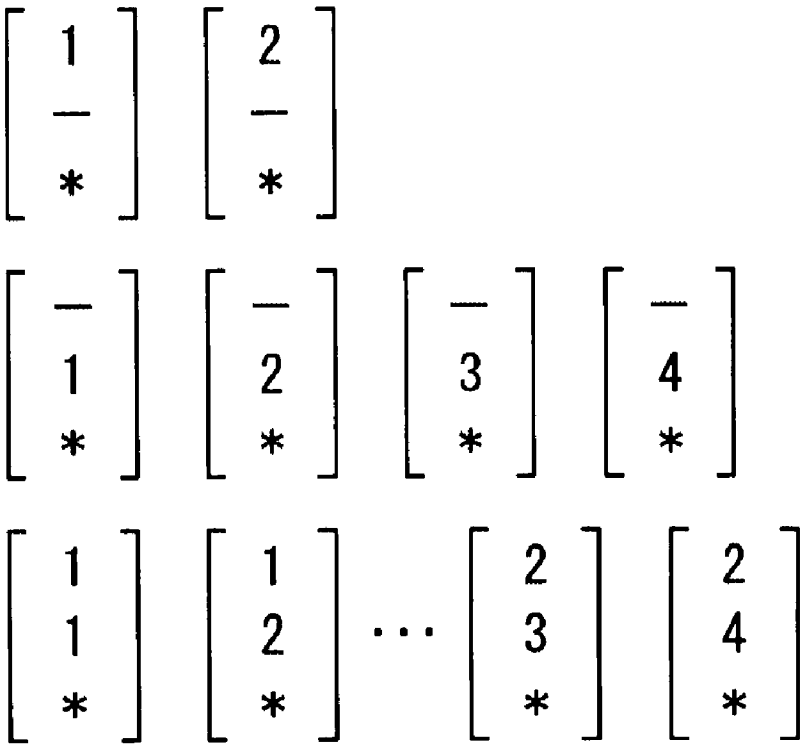
FIG. 52A {1} : 2
FIG. 52B {2} : 4
FIG. 52C {1, 2} : 2 × 4 = 8

FIG. 53

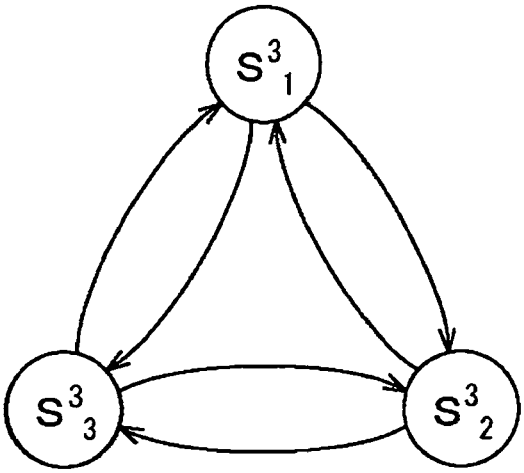

FIG. 54A

COUNT-UP OF EVENT OCCURRENCE COUNTER $$\begin{bmatrix} 1 \\ 1 \\ - \end{bmatrix} \begin{bmatrix} 1 \\ - \\ 1 \end{bmatrix} \begin{bmatrix} - \\ 1 \\ 1 \end{bmatrix} \begin{bmatrix} 1 \\ 1 \\ 1 \end{bmatrix}$$

FIG. 54B

COUNT-UP OF TRANSITION OCCURRENCE COUNTER $$(1 \rightarrow 2)^{(2)} \begin{bmatrix} 1 \\ * \\ - \end{bmatrix} \quad (1 \rightarrow 2)^{(2)} \begin{bmatrix} - \\ * \\ 1 \end{bmatrix} \quad (1 \rightarrow 2)^{(2)} \begin{bmatrix} 1 \\ * \\ 1 \end{bmatrix}$$

*FIG. 55*

COUNT-UP OF EVENT OCCURRENCE COUNTER $$\begin{bmatrix} 1 \\ 2 \\ - \end{bmatrix} \begin{bmatrix} 1 \\ - \\ 1 \end{bmatrix} \begin{bmatrix} - \\ 2 \\ 1 \end{bmatrix} \begin{bmatrix} 1 \\ 2 \\ 1 \end{bmatrix}$$

*FIG. 56A*

COUNT-UP OF EVENT OCCURRENCE COUNTER $$\begin{bmatrix} 1 \\ 2 \\ - \end{bmatrix} \quad \begin{bmatrix} 1 \\ - \\ 1 \end{bmatrix} \quad \begin{bmatrix} - \\ 2 \\ 1 \end{bmatrix} \quad \begin{bmatrix} 1 \\ 2 \\ 1 \end{bmatrix}$$

*FIG. 56B*

COUNT-UP OF TRANSITION OCCURRENCE COUNTER $$\begin{array}{ccc} (1 \rightarrow 2)^{(1)} & (1 \rightarrow 2)^{(1)} & (1 \rightarrow 2)^{(1)} \\ \begin{bmatrix} * \\ 2 \\ - \end{bmatrix} & \begin{bmatrix} * \\ - \\ 1 \end{bmatrix} & \begin{bmatrix} * \\ 2 \\ 1 \end{bmatrix} \end{array}$$

FIG. 57A

COUNT-UP OF EVENT OCCURRENCE COUNTER $$\begin{bmatrix} 2 \\ 2 \\ - \end{bmatrix} \quad \begin{bmatrix} 2 \\ - \\ 1 \end{bmatrix} \quad \begin{bmatrix} - \\ 2 \\ 1 \end{bmatrix} \quad \begin{bmatrix} 2 \\ 2 \\ 1 \end{bmatrix}$$

FIG. 57B

COUNT-UP OF TRANSITION OCCURRENCE COUNTER $$(2 \rightarrow 4)^{(2)} \begin{bmatrix} 2 \\ * \\ - \end{bmatrix} \quad (2 \rightarrow 4)^{(2)} \begin{bmatrix} - \\ * \\ 1 \end{bmatrix} \quad (2 \rightarrow 4)^{(2)} \begin{bmatrix} 2 \\ * \\ 1 \end{bmatrix} \quad (1 \rightarrow 3)^{(3)} \begin{bmatrix} 2 \\ - \\ * \end{bmatrix} \quad (1 \rightarrow 3)^{(3)} \begin{bmatrix} - \\ 2 \\ * \end{bmatrix} \quad (1 \rightarrow 3)^{(3)} \begin{bmatrix} 2 \\ 2 \\ - \end{bmatrix}$$

$$\begin{bmatrix} 2 \\ 4 \\ - \end{bmatrix} \quad \begin{bmatrix} 2 \\ - \\ 3 \end{bmatrix} \quad \begin{bmatrix} - \\ 4 \\ 3 \end{bmatrix} \quad \begin{bmatrix} 2 \\ 4 \\ 3 \end{bmatrix}$$

FIG. 58A
COUNT-UP OF EVENT OCCURRENCE COUNTER $$(2 \rightarrow 3)^{(1)} \begin{bmatrix} * \\ 4 \\ - \end{bmatrix} \quad (2 \rightarrow 3)^{(1)} \begin{bmatrix} * \\ - \\ 3 \end{bmatrix} \quad (2 \rightarrow 3)^{(1)} \begin{bmatrix} * \\ 4 \\ 3 \end{bmatrix}$$

FIG. 58B
COUNT-UP OF TRANSITION OCCURRENCE COUNTER

FIG. 59A $\{1\}:2$ $$\begin{bmatrix} 1 \\ * \\ - \end{bmatrix} \begin{bmatrix} 2 \\ * \\ - \end{bmatrix}$$

FIG. 59B $\{3\}:3$ $$\begin{bmatrix} - \\ * \\ 1 \end{bmatrix} \begin{bmatrix} - \\ * \\ 2 \end{bmatrix} \begin{bmatrix} - \\ * \\ 3 \end{bmatrix}$$

FIG. 59C $\{1, 3\}:2 \times 3 = 6$ $$\begin{bmatrix} 1 \\ * \\ 1 \end{bmatrix} \begin{bmatrix} 1 \\ * \\ 2 \end{bmatrix} \begin{bmatrix} 1 \\ * \\ 3 \end{bmatrix} \begin{bmatrix} 2 \\ * \\ 1 \end{bmatrix} \begin{bmatrix} 2 \\ * \\ 2 \end{bmatrix} \begin{bmatrix} 2 \\ * \\ 3 \end{bmatrix}$$

FIG. 60A $$\begin{bmatrix} 1 \\ * \\ - \end{bmatrix} \cdots \begin{bmatrix} 1 \\ * \\ 1 \end{bmatrix} \cdots$$

FIG. 60B $$\begin{bmatrix} 1 \\ 1 \\ - \end{bmatrix} \cdots \begin{bmatrix} 1 \\ 1 \\ 1 \end{bmatrix} \cdots$$

FIG. 60C $$\overset{(1 \to 2)^{(2)}}{\begin{bmatrix} 1 \\ * \\ - \end{bmatrix}} \cdots \overset{(1 \to 2)^{(2)}}{\begin{bmatrix} 1 \\ * \\ 1 \end{bmatrix}} \cdots$$

FIG. 61A $$\begin{bmatrix} 1 \\ * \\ - \end{bmatrix}$$

FIG. 61B $$\begin{bmatrix} 1 \\ * \\ 1 \end{bmatrix} \begin{bmatrix} 1 \\ * \\ 2 \end{bmatrix} \begin{bmatrix} 1 \\ * \\ 3 \end{bmatrix}$$

INFORMATION PROCESSING APPARATUS, INFORMATION PROCESSING METHOD, AND COMPUTER PROGRAM FOR CONTROLLING STATE TRANSITION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

The present application claims priority from Japanese Patent Application Nos. JP 2008-064993, JP 2008-064994, and JP 2008-064995, all filed in the Japanese Patent Office on Mar. 13, 2008, the entire contents of which are incorporated herein by reference.

BACKGROUND OF THE INVENTION

1. Field of the Invention

The present invention relates to an information processing apparatus, an information processing method, and a computer program, and, more particularly to an information processing apparatus, an information processing method, and a computer program that can self-organize an internal state to create an environment model.

2. Description of the Related Art

In recent years, researches and developments have been actively performed concerning reinforcement learning. The reinforcement learning means a method of mechanical learning for autonomously acquiring an optimum behavior on the basis of actual experiences and returns. Mechanical learning for learning by trial and error, relying only on returns from an environment, a control method for attaining the returns is referred to as reinforcement learning in a broad sense (see, for example, "Reinforcement Learning" Richard S. Sutton, Andrew G. Barto, translated by Sadayoshi Mikami and Masaaki Minakawa, Morikita Publishing. The reinforcement learning have been applied to various Markov decision problems having finite numbers of states and finite numbers of behaviors such as acquisition of strategies in games and achieved successes.

However, there are still a large number of problems in applying the reinforcement learning to various difficult problems in the real world.

One significant problem among the problems is that returns, behaviors, and environment models are learned all together. In the reinforcement learning, an environment is acquired in a form of prediction of a return that can be received, i.e., a value. In other words, it is only learned how much value a present state has. A change in a state is not modeled. In architectures such as SARSA and actor critic, a value function depending on a present actor (behavior determination) is learned. Therefore, it is necessary to learn an actor and a value function from the beginning every time a purpose (a return) changes. However, originally, an environment model indicating how an environment changes when a user behaves toward the environment how should be able to be used in common even if a purpose changes. Therefore, in solving various problems, it is more efficient to plan a behavior on the basis of an environment prediction model.

SUMMARY OF THE INVENTION

However, it is difficult to say that the technique in the past can sufficiently set problems given to the reinforcement learning. It is possible to solve problems on the basis of a framework of the reinforcement learning if a human sorts out the problems in advance and passes the problems to a machine as Markov decision problems having finite numbers of states and finite numbers of behaviors as explained above. However, in problems in the real world, there are many unknown matters, for example, how many states are sufficient, how many pieces a behavior is divided into, whether a Markov decision process is adopted in the first place, and whether given information is enough. Therefore, in the past, the human sorts out a large number of problems and solve the problems before causing the machine to learn the problems.

Therefore, a framework for the machine itself to classify and solve the problems in this way is necessary. For this purpose it is demanded that the machine itself self-organizes an internal state to create an environment model. However, in the present situation, such a demand is not sufficiently met.

Therefore, it is desirable to make it possible to self-organize an internal state to create an environment model.

According to an embodiment of the present invention, there is provided an information processing apparatus including: model learning means for self-organizing, on the basis of state transition model having a state and state transition to be learned by using time series data as data in time series, an internal state from an observation signal obtained by a sensor; and controller learning means for performing learning for allocating a controller, which outputs an action, to each of transitions of a state or each of transition destination states in the state transition model indicating the internal state self-organized by the model learning means.

The information processing apparatus further includes: planning means for planning a path for attaining a target as a transition sequence of a state on the state transition model indicating the internal state self-organized by the model learning means; and execution managing means for invoking, for each of transitions included in the path planned by the planning means, the controller allocated by the controller learning means to manage execution of an action along the path.

The model learning means self-organizes, independently for each of plural modals, an internal state from an observation signal obtained by a sensor of a modal corresponding thereto on the basis of state transition models. The information processing apparatus further includes causality means for estimating causality of transition in one state transition model and a state of another state transition model among the state transition models for each of the plural modals respectively indicating the internal state self-organized by the model learning means.

The execution managing means causes, when it is difficult to directly control an internal state of a predetermined modal among the plural modals respectively indicating the internal state self-organized by the model learning means, the planning means to recursively execute planning to control the internal state on the basis of the causality estimated by the causality means.

The information processing apparatus further includes setting means for spontaneously setting a target from the internal state self-organized by the model learning means. The controller learning means, the planning means, and the execution managing means execute respective kinds of processing to realize the target spontaneously set by the setting means.

According to another embodiment of the present invention, there are provided an information processing method and a computer program corresponding to the information processing apparatus according to the embodiment explained above.

In the information processing apparatus, the information processing method, and the computer program according to the embodiments, an internal state is self-organized from an observation signal obtained by a sensor on the basis of a Markov model. In the Markov model indicating the self-organized internal state, learning for allocating a controller, which outputs an action, is allocated to each of transitions of a state.

As explained above, according to the present invention, the information processing apparatus and the like can self-organize an internal state to create an environment model.

BRIEF DESCRIPTION OF THE DRAWINGS

FIGS. 32A and 32B are diagrams for explaining merging of a state;

FIGS. 33A and 33B are diagrams for explaining addition of a state;

FIGS. 34A and 34B are diagrams for explaining addition of state transition;

FIG. 46 is a diagram of an example of a change with time in a state of a system;

FIGS. 47A to 47D are diagrams of examples of event occurrence counters;

FIGS. 48A to 48C are diagrams of examples of transition occurrence counters prepared in association with respective state transitions of a modal 1;

FIG. 49 is a diagram of an example of state transitions of the modal 1;

FIGS. 50A to 50C are diagrams of examples of transition occurrence counters prepared in association with respective state transitions of a modal 2;

FIGS. 52A to 52C are diagrams of examples of transition occurrence counters prepared in association with respective state transitions of a modal 3;

FIG. 53 is a diagram of an example of state transitions of the modal 3;

FIGS. 54A and 54B are diagrams of examples of an event occurrence counter and a transition occurrence counter that perform count-up;

FIG. 55 is a diagram of an example of the event occurrence counter that performs count-up;

FIGS. 56A and 56B are diagrams of another example of the event occurrence counter and the transition occurrence counter that perform count-up;

FIGS. 57A and 57B are diagrams of still another example of the event occurrence counter and the transition occurrence counter that perform count-up;

FIGS. 58A and 58B are diagrams of still another example of the event occurrence counter and the transition occurrence counter that perform count-up;

FIGS. 59a to 59AC are diagrams of examples of state vector patterns;

FIGS. 60A to 60AC are diagrams of examples of state vectors;

FIGS. 61A and 61B are diagrams of other examples of the state vectors;

DESCRIPTION OF THE PREFERRED EMBODIMENTS

Exemplary embodiments of the present invention are explained in detail below with reference to the accompanying drawings.

First, an overview of processing according to an embodiment of the present invention is explained with reference to FIGS. 1A, 1B and 2.

According to the embodiment, a target system or agent automatically constructs a model of an external environment on the basis of a sensor signal for observation (hereinafter referred to as observation signal) and an action signal of an action taken by the system or the agent. The system or the agent freely generates an intellectual behavior for realizing the automatic construction of the model and realizing an arbitrary state on an internally-perceived model.

In general, the "agent" indicates an autonomous entity that can perceives (e.g., senses) a state of an environment and select a behavior on the basis of a perceived content. However, in the following explanation, rather than the agent, the system is used as an operation entity.

The modeling of an external environment is not specifically limited. However, in this embodiment, a Hidden Markov Model (hereinafter referred to as HMM) is adopted as the modeling of an external environment.

Figure 1B:
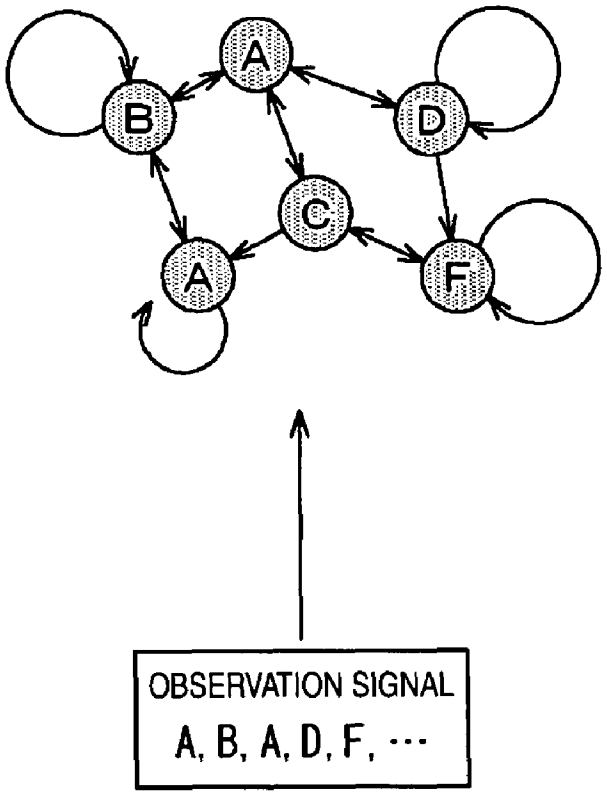
FIGS. 1A and 1B are diagrams for explaining an overview of processing according to an embodiment of the present invention.
Figure 1A:
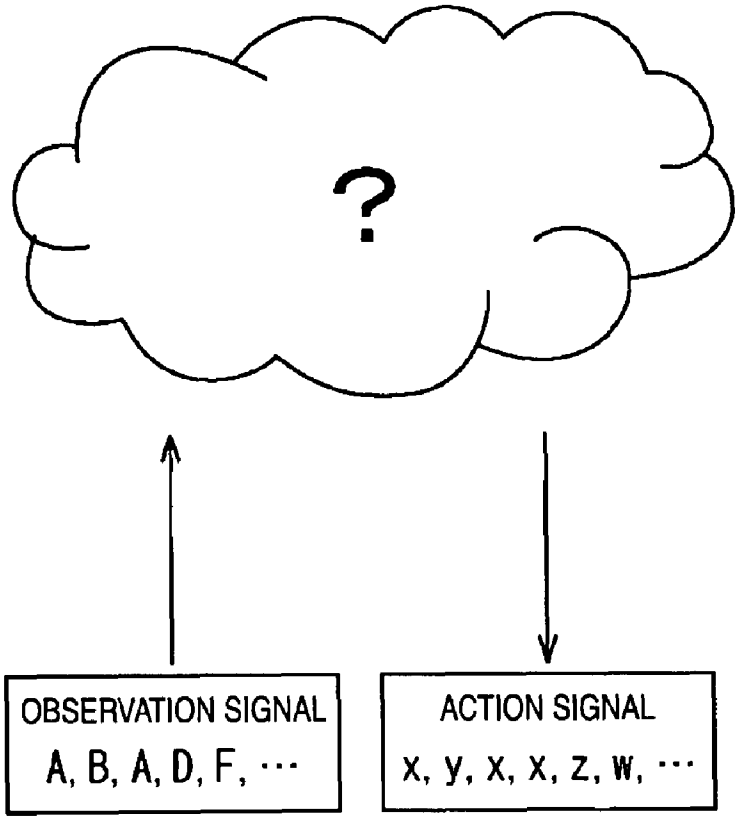

For example, as shown in FIG. 1A, a model for obtaining an action signal from an observation signal is created.

In this case, as shown in FIG. 1B, first, the system constructs an HMM only from an observation signal.

Figure 2B:
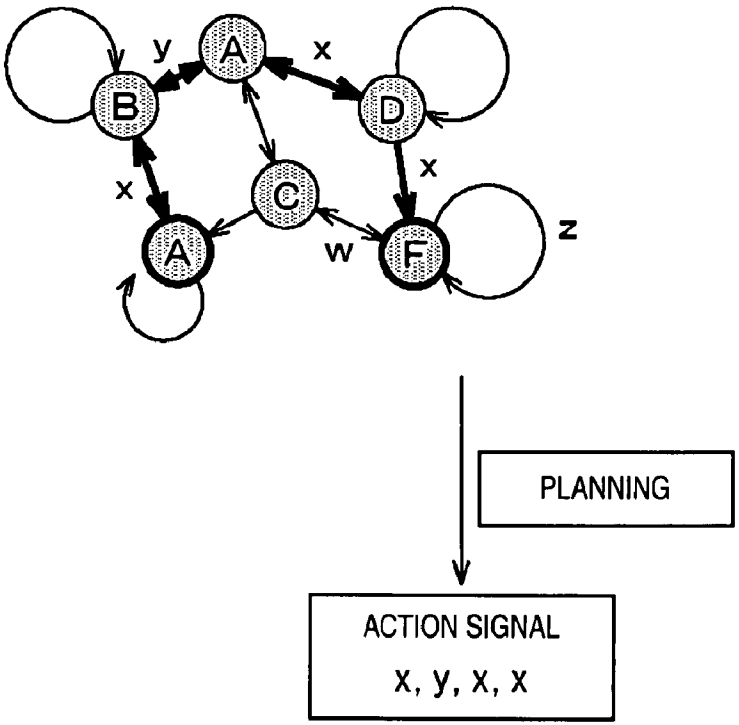
FIGS. 2A and 2B are diagrams for explaining the overview of the processing according to the embodiment.
Figure 2A:
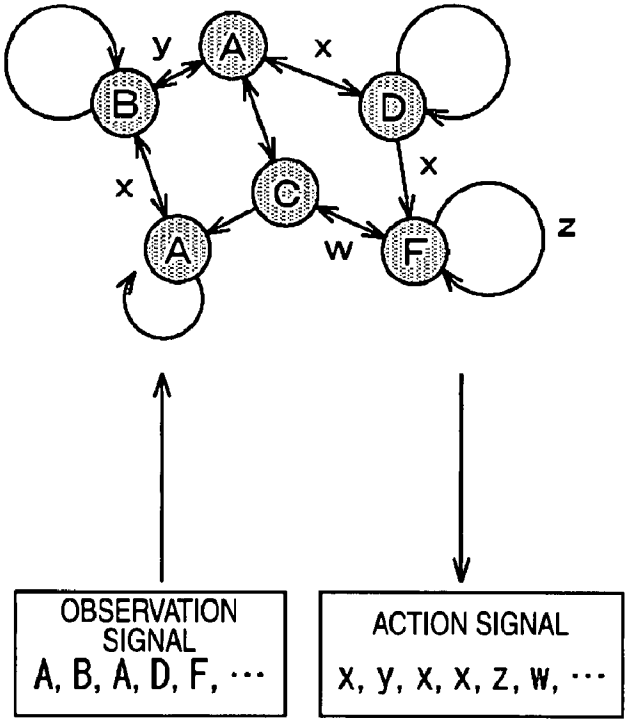

Subsequently, as shown in FIG. 2A, the system analyzes a relation between respective state transitions (hereinafter abbreviated as transitions as appropriate) of the constructed HMM and a behavior performed by the system (an action signal). Consequently, relations between sensor signals necessary for the respective transitions and action signals are learned as controllers.

As shown in FIG. 2B, when a target state (in an example in FIG. 2B, a state F) is given, the system calculates a transition sequence from a present state (in the example in FIG. 2B, a state A) to the target state (in the example in FIG. 2B, a transition sequence indicated by a bold line arrow). Such a transition sequence is hereinafter referred to as path as appropriate. The calculation of such a path is hereinafter referred to as planning. After the planning, the system can realize an arbitrary state by invoking controllers necessary for respective transitions included in the path.

The overview of the processing according to this embodiment is explained above. An information processing system according to this embodiment is explained below.

Figure 3:
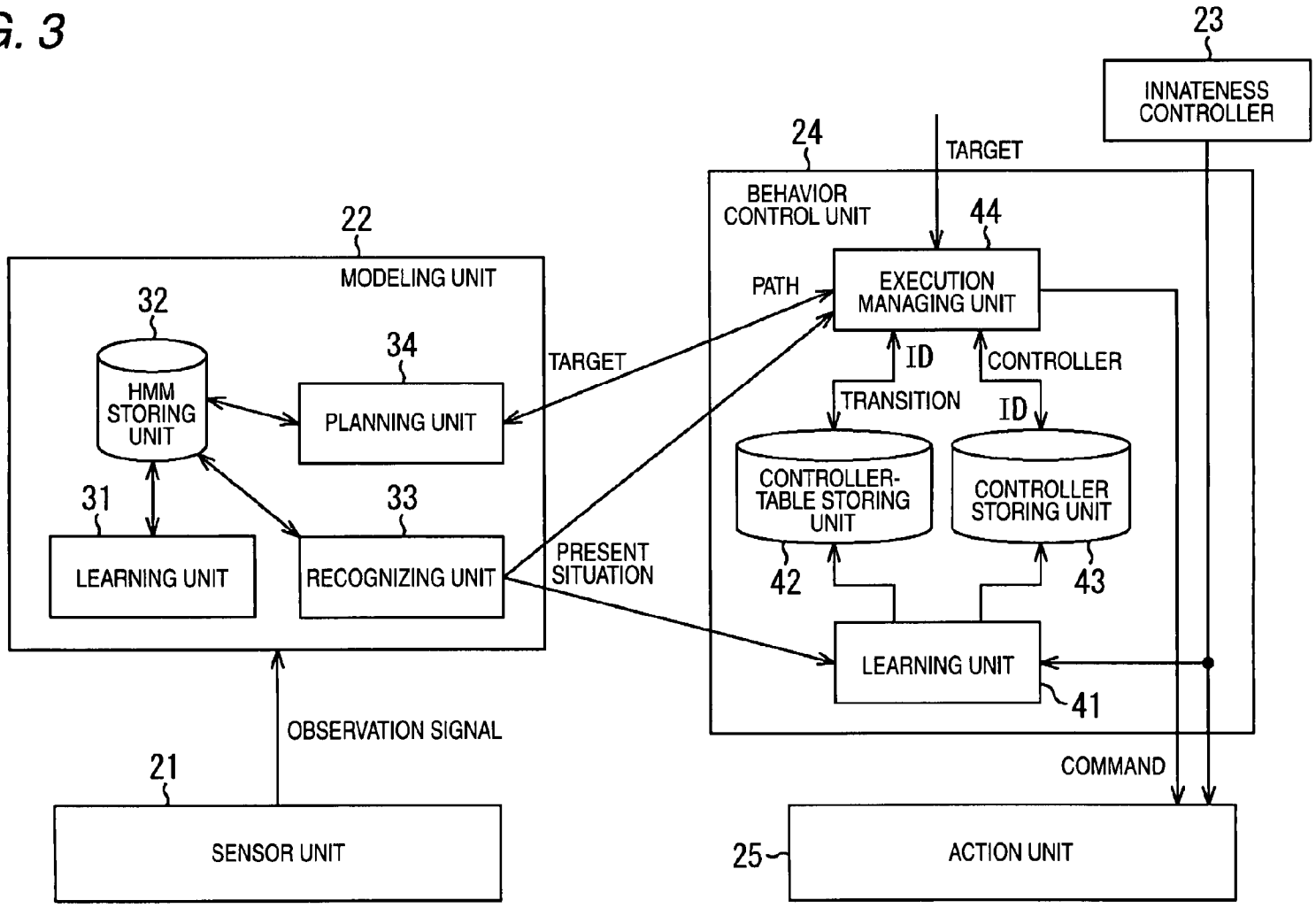
FIG. 3 is a functional block diagram of an information processing system according to the embodiment.

FIG. 3 is a functional block diagram of a functional configuration example of the information processing system according to this embodiment (hereinafter simply referred to as system shown in FIG. 3).

The system shown in FIG. 3 includes a sensor unit 21, a modeling unit 22, an innateness controller 23, a behavior control unit 24, and an action unit 25.

The sensor unit 21 observes a predetermined physical amount of an environment in which an agent is placed and provides the modeling unit 22 with a result of the observation as an observation signal.

The modeling unit 22 includes a learning unit 31, an HMM storing unit 32, a recognizing unit 33, and a planning unit 34.

The learning unit 31 constructs an HMM using the observation signal of the sensor unit 21 (see FIG. 1B) and stores the HMM in the HMM storing unit 32.

The recognizing unit 33 estimates, when the action unit 25 explained later behaves, respective transitions up to a present state (a present situation) using the HMM stored in the HMM storing unit 32 and an observation signal sequence of the sensor unit 21. An estimation result of the recognizing unit 33 is provided to the behavior control unit 24.

The planning unit 34 plans (calculates) an optimum path from the present state toward a target state using the HMM stored in the HMM storing unit 32 and provides the behavior control unit 24 with the optimum path (see FIG. 2B). The target state means a state given to the behavior control unit 24 as a target. The target state is provided from the behavior control unit 24 to the modeling unit 22.

The innateness controller 23 issues, on the basis of a predetermined innateness rule, various commands for learning of a learning unit 41 of the behavior control unit 24 explained later and provides the learning unit 41 and the action unit 25 with the commands.

The behavior control unit 24 includes the learning unit 41, a controller-table storing unit 42, a controller storing unit 43, and an execution managing unit 44.

The learning unit 41 learns a controller for each of transitions using respective transitions, which are recognized by the recognizing unit 33 on the basis of a behavior result of the action unit 25 conforming to a command from the innateness controller 23, and the command from the innateness controller 23 (see FIG. 2A). The learning unit 41 stores respective controllers in the controller storing unit 43. The learning unit 41 stores relations between the respective controllers and the transitions in the controller-table storing unit 42. Details of the controller are explained later.

The execution managing unit 44 generates a command for the action unit 25 such that the action unit 25 behaves along a path provided from the planning unit 34, i.e., realizes respective transitions in the path. The execution managing unit 44 provides the action unit 25 with the command. This command is inversely generated on the basis of information stored in the controller-table storing unit 42 and the controller storing unit 43. Details of processing by the execution managing unit 44 are explained later.

Further details of the system shown in FIG. 3 are explained with reference to an example in which a simple pendulum task is given as a task.

Figure 4:
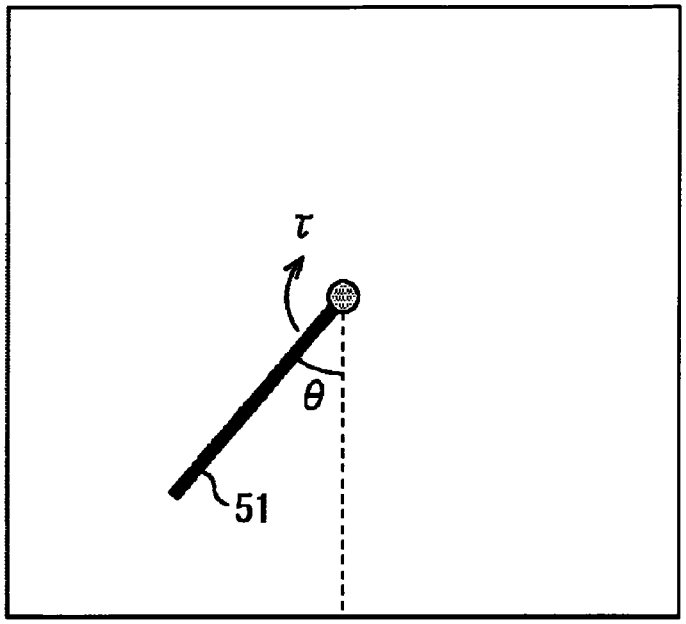
FIG. 4 is diagram for explaining a simple pendulum task.

As a target of the system shown in FIG. 3, a target of capturing an observation angle θ of a simple pendulum 51 as an observation signal and freely controlling the simple pendulum 51 using a generated torque τ as a control signal (an action signal) as shown in FIG. 4 is adopted. However, it is assumed that physical parameters such as the mass and the coefficient of friction of the simple pendulum 51 are unknown. The simple pendulum task in which such problems are set is often adopted as a problem of reinforcement learning.

In the problem setting in the simple pendulum task in the past, angular velocity ω is given in addition to the angle θ (i.e., two variables are given) as an observation signal. As a target, a target that the simple pendulum 51 swings up, i.e., the angle θ reaches 180° is given. Further, a target function for attaining the target, for example, a target function that a return is given when the angle θ reaches 180° or a higher value is outputted as the angle θ is closer to 180° is designed and given.

On the other hand, one of targets of the system shown in FIG. 3 is to realize an agent that can autonomously solve various tasks regardless of this simple pendulum task. Therefore, a limitation that only the angle θ, which is a part of a state, can be observed is applied to the system shown in FIG. 3. Another one of the targets of the system shown in FIG. 3 is to realize an arbitrary internal state rather than giving a target function. Therefore, the system shown in FIG. 3 does not need a target function dependent on a task of swing-up.

Figure 5:
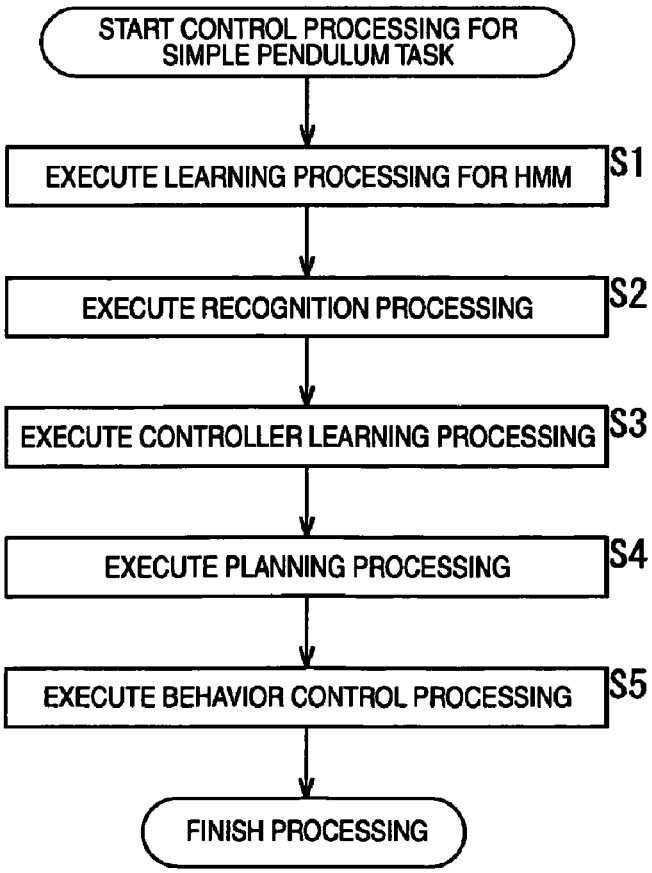
FIG. 5 is a flowchart for explaining an example of processing for controlling the simple pendulum task.

FIG. 5 is a flowchart for explaining an example of processing performed by the system shown in FIG. 3 to attain the simple pendulum task (hereinafter referred to as control processing for the simple pendulum task as appropriate).

In step S1, the system shown in FIG. 3 executes learning processing for an HMM.

In step S2, the system shown in FIG. 3 executes recognition processing.

In step S3, the system shown in FIG. 3 executes controller learning processing.

In step S4, the system shown in FIG. 3 executes planning processing.

In step S5, the system shown in FIG. 3 executes behavior control processing.

Details of the respective kinds of processing in steps S1 to S5 are individually explained below in the order of the steps.

First, the learning processing for an HMM in step S1 is explained.

In an initial state, the action unit 25 outputs a control signal τ generated at random or a control signal τ obtained by adding a proper perturbation to a pattern innately embedded in advance. Such a control signal τ is generated by the action unit 25 on the basis of, for example, a command given by the innateness controller 23.

Figure 6:
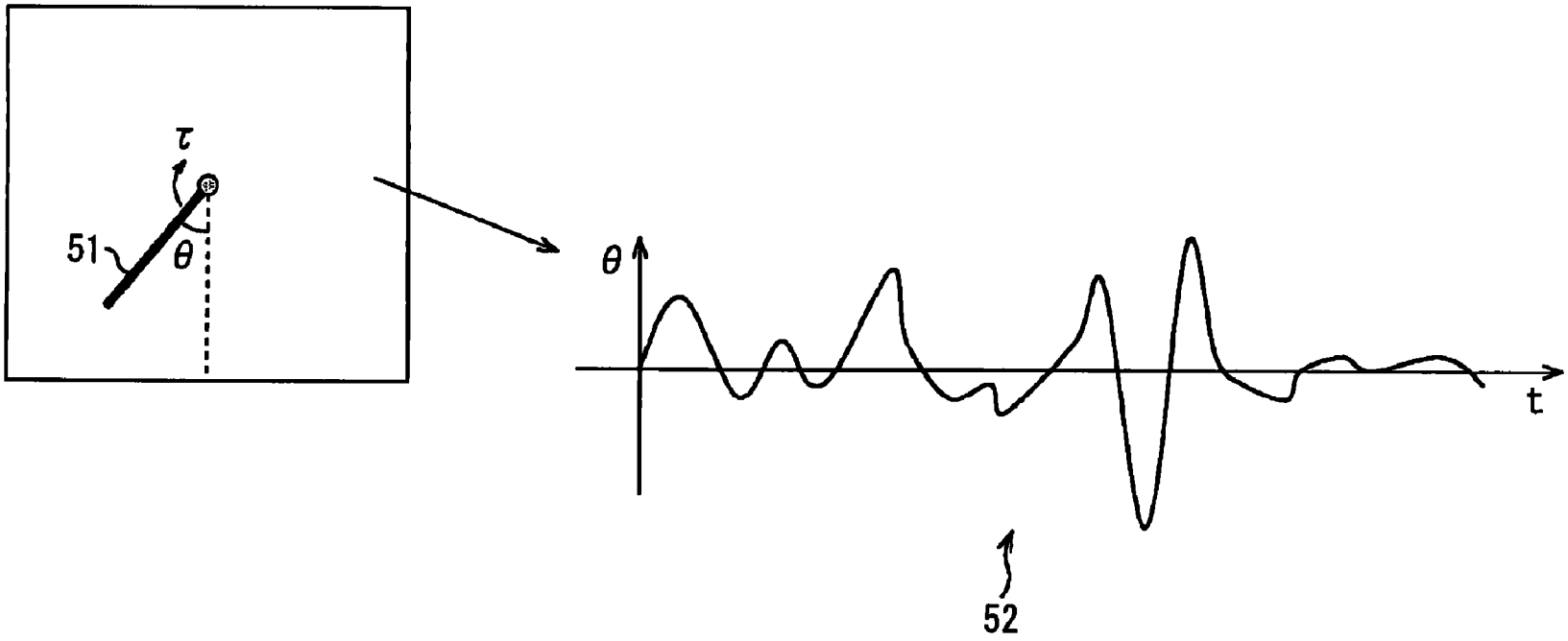
FIG. 6 is a diagram of an example of a time series observation signal.

A time series of the observation signal θ outputted from the sensor unit 21 during this period (hereinafter referred to as time series observation signal) is stored on a not-shown memory of the learning unit 31. A signal 52 shown in FIG. 6 is an example of the time series observation signal. At timing when a certain degree of time series observation signals are stored in the memory, the learning unit 31 learns these time series observation signals to construct an HMM and stores the HMM in the HMM storing unit 32.

The series of processing explained above is the learning processing for an HMM.

In the learning processing for an HMM, in general, a Baum-Welch algorithm is used. Examples of HMMs applicable to such an algorithm are shown in FIG. 7 to FIGS. 10A to 10C.

Figure 7:
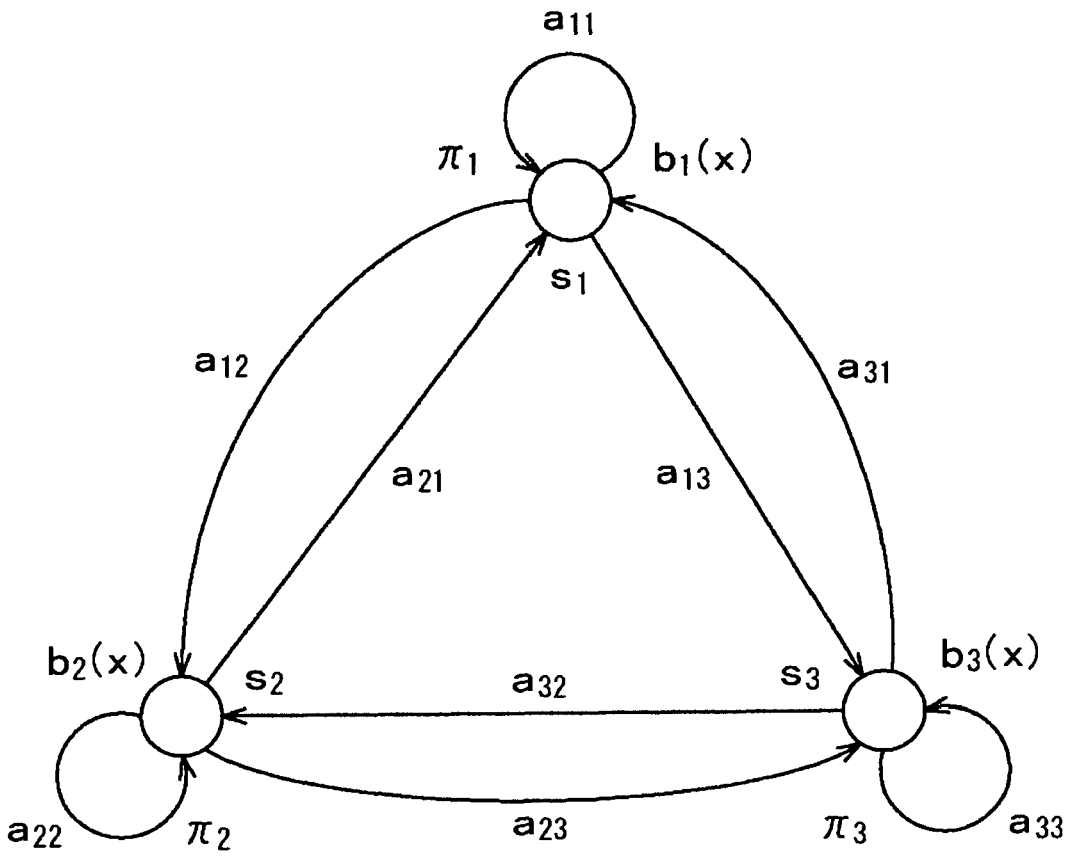
FIG. 7 is a diagram of an example of an HMM.
Figure 8:
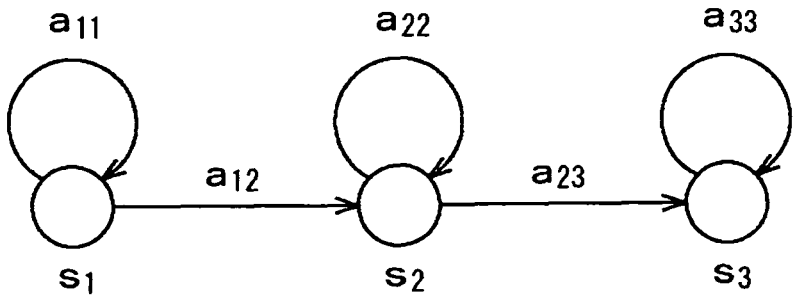
FIG. 8 is a diagram of an example of the HMM.

However, the system is caused to learn a totally-connected HMM shown in FIG. 7 without any limitation, the HMM converges to local minimum depending on an initial value of a parameter. This makes it difficult to learn the HMM.

Figure 9A:
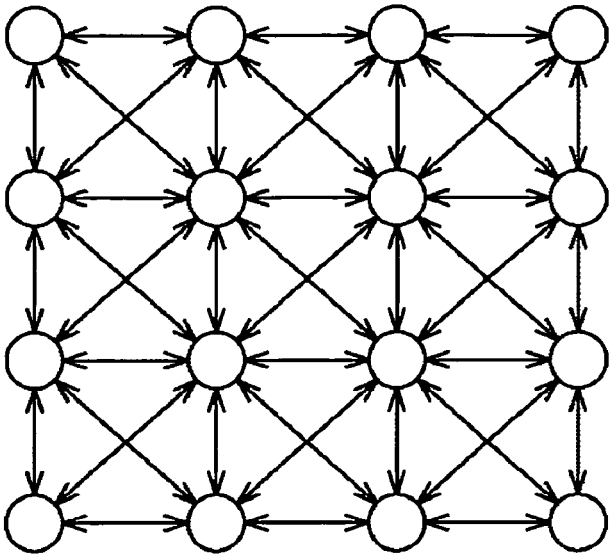
FIGS. 9A and 9B are diagrams of an example of an HMM.
Figure 9B:
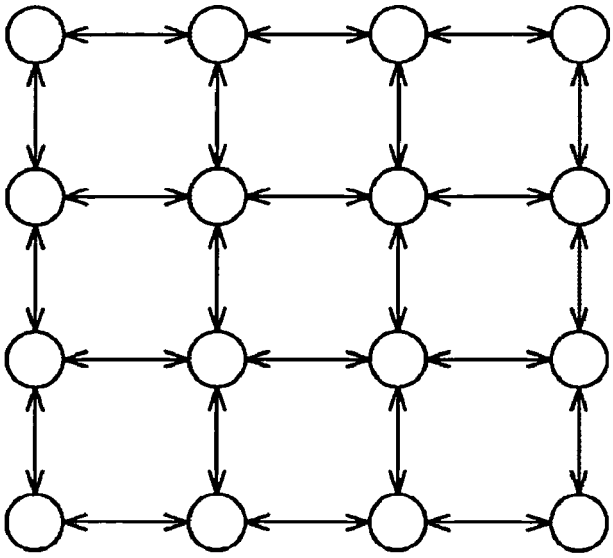
Figure 10A:
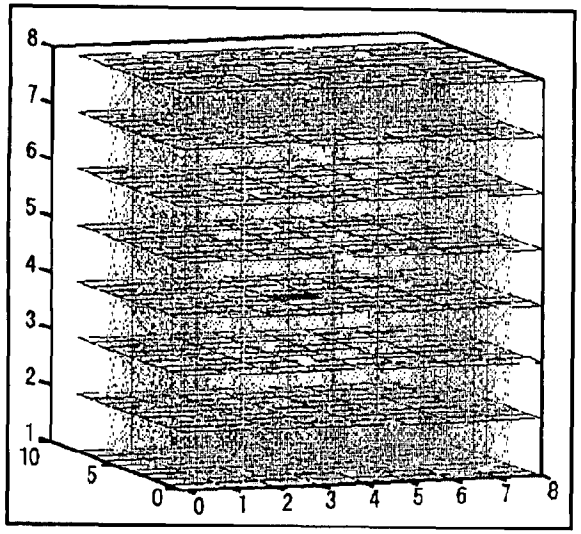
FIGS. 10A to 10C are diagrams of examples of HMMs.
Figure 10B:
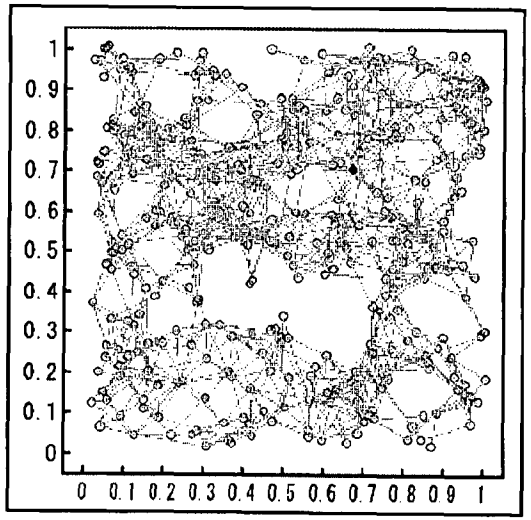
Figure 10C:
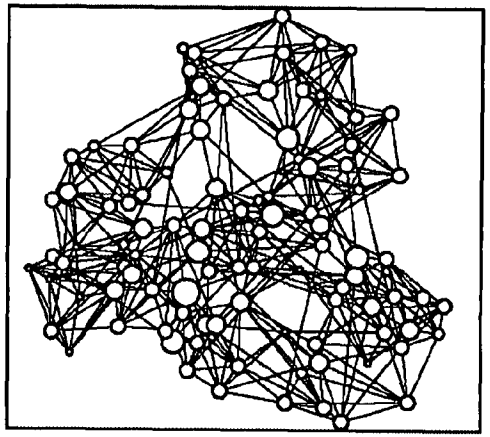

Therefore, in this embodiment, a hypothesis that almost all phenomena in the natural world can be represented by a sparse connection such as a small world network is adopted. In this embodiment, the Baum-Welch algorithm limited to sparse connection is adopted. Specifically, in this embodiment any one of HMMs shown in FIGS. 9A and 9B and FIGS. 10A to 10C, which are examples of a sparsely connected HMM, is adopted. The HMM shown in FIGS. 9A and 9B is a two-dimensional neighborhood restricted HMM. The HMM shown in FIG. 10A is an HMM by three-dimensional grid restriction. The HMM shown in FIG. 10B is an HMM by two-dimensional random arrangement restriction. The HMM shown in FIG. 10C is an HMM by a small world network.

Figure 11:
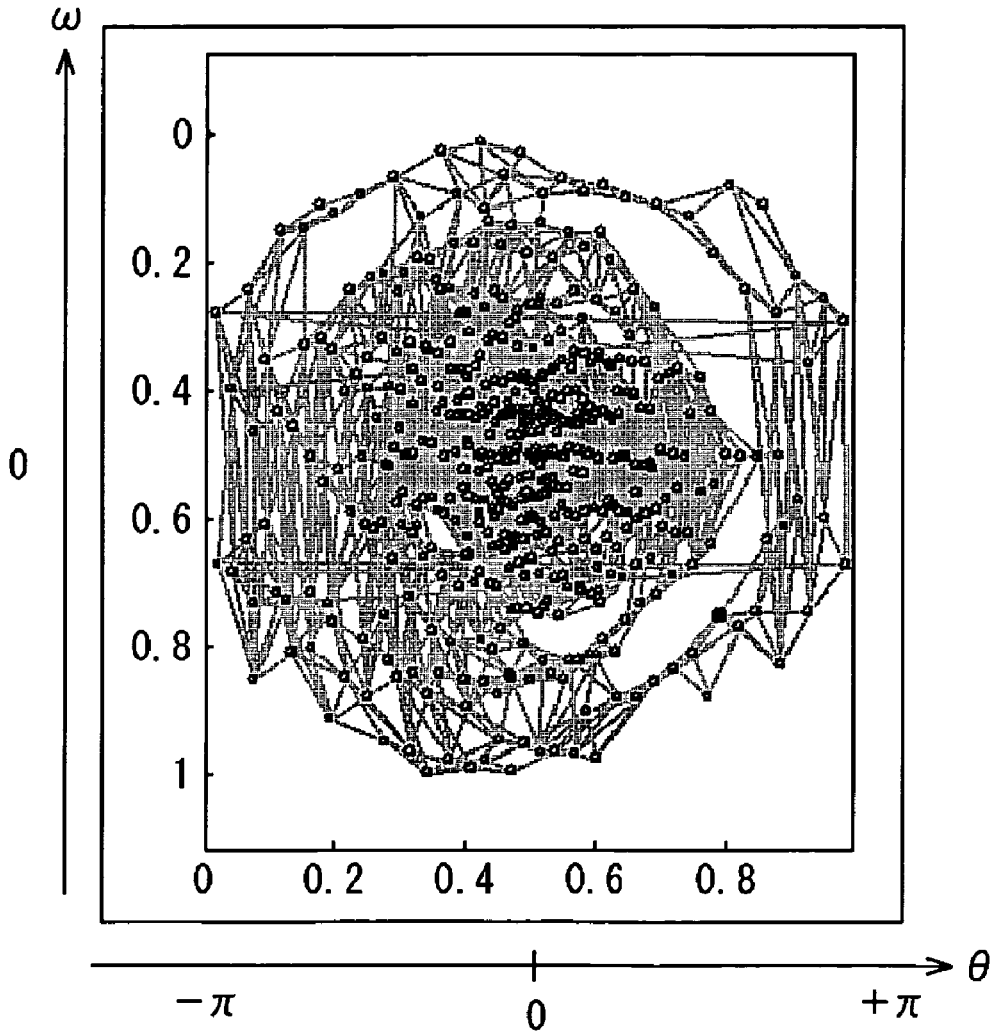
FIG. 11 is a diagram of an example of a learning result of an HMM in the simple pendulum task.

A display example of a result obtained by giving, in the simple pendulum task, a two-dimensional neighborhood restricted HMM with 484 nodes to the system as an initial structure and causing the system to learn a time series observation signal is shown in FIG. 11.

The abscissa of FIG. H indicates the angle θ of the simple pendulum 51 as an observation signal. The ordinate of FIG. H indicates the angular velocity ω of the simple pendulum 51. In FIG. 11, circles indicate nodes (states). A solid line between two circles indicates connection (transition) between two nodes. In the display example shown in FIG. 11, respective nodes are plotted as circles on a (θ,ω) space on the basis of an average of true states (θ,ω) of an environment at the time of nodes perceived by the system (the agent) shown in FIG. 3. Among connections among the nodes, only connections having transition probabilities equal to or larger than 0.01 are displayed as solid lines.

It is seen from the display example shown in FIG. 11 that the respective nodes are connected to only several nodes near the nodes. This means that the system shown in FIG. 3 is equivalent to a continuous change in the (θ,ω) space. This also means that, in such a case, a behavior of the system shown in FIG. 3 can be described by a sparse connection.

As an only exception, a change from θ=−π to θ=π is discontinuous when the simple pendulum 51 makes a full turn. Because nodes at the left end and the right end in FIG. 11 are connected in the display example shown in FIG. 11, it is also seen that this discontinuous change is learned.

It is also seen from the display example shown in FIG. 11 that different nodes are allocated to the same angle θ regardless of the fact that only the angel θ is observed as an observation signal. This indicates that the angular velocity ω can represent that a behavior of the system shown in FIG. 3 changes even at the same angle θ.

The learning processing for an HMM in step S1 is explained above. Subsequently, the recognition processing in step S2 is explained below.

The recognition processing is processing for estimating a present state of the system shown in FIG. 3 using the HMM constructed by the learning processing for an HMM in step S1. The recognition processing is executed by the recognizing unit 33.

A result of the recognition processing is used for the controller learning processing in step S3 explained later. The recognition processing is executed as one kind of processing of the behavior control processing in step S5 explained later separately from the processing in step S2 (see step S61 in FIG. 14).

Key information in the recognition processing is an observation signal sequence from the past to the present. The Viterbi Algorithm is widely used for state estimation for an HMM. Therefore, in this embodiment, it is assumed that the recognition processing is executed as follows: a state fifty steps before the present is set undefined, i.e., probabilities of respective nodes are set equal, the state fifty steps before the present is set as an initial state, observation results for fifty steps are given, and states in the respective steps are decided by the Viterbi Algorithm to estimate a state of the last fiftieth step, i.e., a present state.

Figure 12:
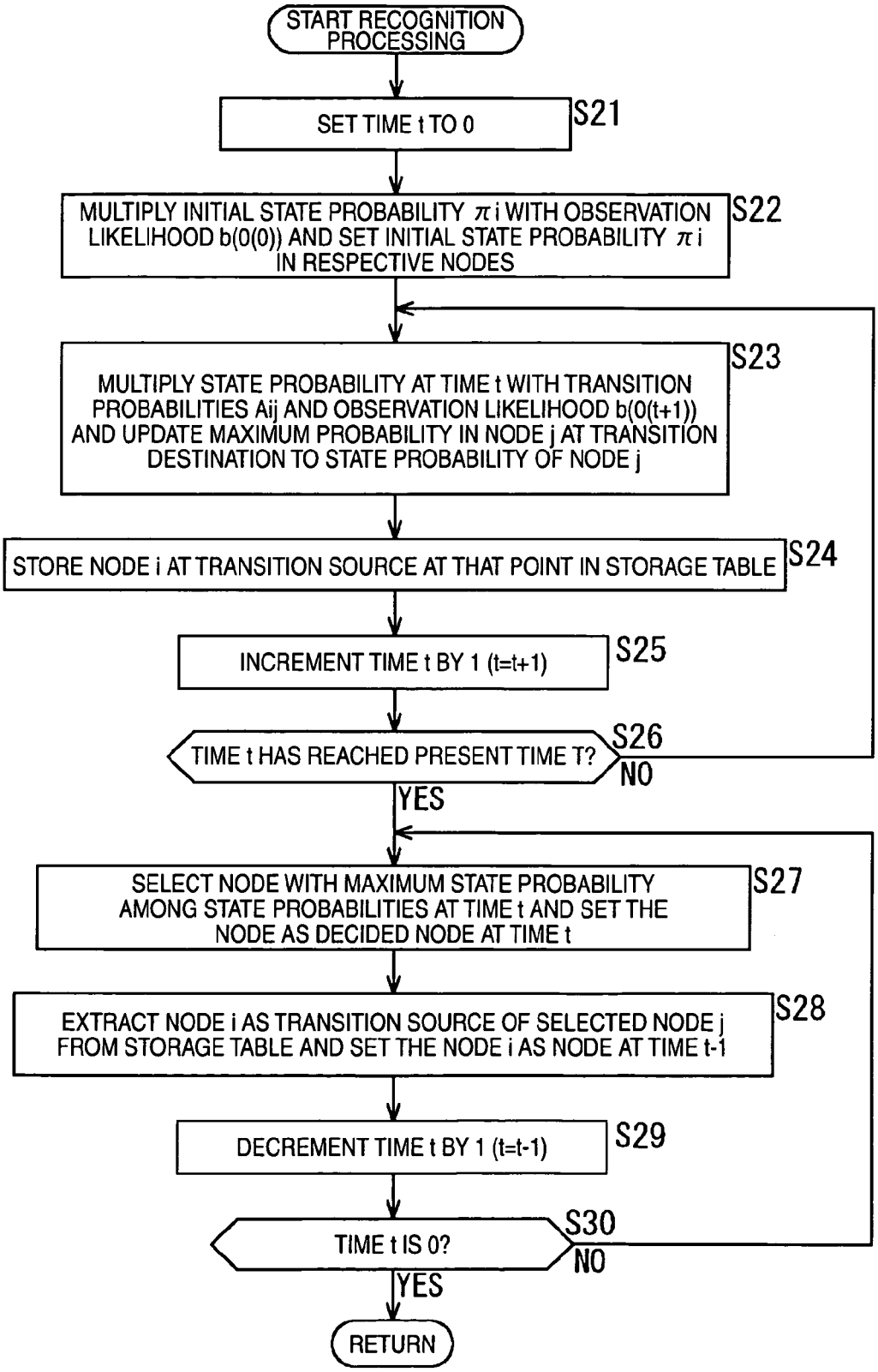
FIG. 12 is a flowchart for explaining a detailed example of recognition processing shown in FIG. 5.

Specifically, for example, in this embodiment, the recognition processing is executed according to a flowchart of FIG. 12.

In the following explanation, a transition probability from a node "i" to a node "j" is described as aij or Aij. An initial state probability is described as $\pi i$. An observation value (a level of an observation signal) at time t is described as o(t). Likelihood of the observation value o(t) at the node "i" is referred to as observation likelihood and described as bi(o(t)). Present time is described as T.

In step S21, the recognizing unit 33 sets the time t to 0.

In step S22, the recognizing unit 33 multiplies the initial state probability $\pi i$ with observation likelihood b(0(0)) and sets the initial state probability $\pi i$ in the respective nodes.

In step S23, the recognizing unit 33 multiplies a state probability at time t with the transition probability Aij and observation likelihood b(0(t+1)) and updates a maximum probability in the node "j" at a transition destination to a state probability of the node "j".

In step S24, the recognizing unit 33 stores the node "i" at a transition source at that point in a storage table. A constructing location for the storage table is not specifically limited. In this embodiment, for example, it is assumed that the storage table is constructed in the inside of the recognizing unit 33.

In step S25, the recognizing unit 33 increments the time t by 1 (t=t+1).

In step S26, the recognizing unit 33 determines whether the time t has reached the present time T.

When the time t is time before the present time T, the recognizing unit 33 determines in step S26 that the time t has not reached the present time T (NO in step S26). The processing is returned to step S23 and the processing in step S23 and subsequent steps is repeated.

Loop processing from step S23 to step S26 is repeated at every time t=0 to T. When the time t reaches the present time T, the recognizing unit 33 determines in step S26 that the time t has reached the present time T (YES in step S26). The processing proceeds to step S27.

In step S27, the recognizing unit 33 selects a node having a maximum state probability among state probabilities at time t and sets the node as a decided node at time t. In the processing in step S27 immediately after it is determined as YES in the processing in step S26 that the time t has reached the present time T, since the time t is the present time T, a decided node at the present time T is obtained.

In step S28, the recognizing unit 33 extracts the node "i" at the transition source of the node "j" selected in the processing in step S27 from the storage table and sets the node "i" as a node at time t−1.

In step S29, the recognizing unit 33 decrements the time t by 1 (time t=t−1).

In step S30, the recognizing unit 33 determines whether the time t is 0.

When the time t is time after 0, the recognizing unit 33 determines in step S30 that the time t is not 0 (NO in step S30). The processing is returned to step S27 and the processing in step S27 and subsequent steps is repeated.

Loop processing from step S27 to step S30 is repeated at every time t=T to 0. When the time t reaches 0, the recognizing unit 33 determines in step S30 that the time t is 0 (YES in step S30). The recognition processing is finished.

The recognition processing in step S2 is explained above. Subsequently, the controller learning processing in step S3 is explained below.

When the recognition processing in step S2 is executed, the node "i" indicating a state at every time is determined. The transition probability Aij from the node "i" to the node "j" indicating a state at the next time is also determined. In the following explanation, the transition probability Aij is referred to as transition edge Aij as appropriate. It should be noted that, while the lower-case letter "a" is used in such a manner as transition probability aij in the explanation of the recognition processing, the upper-case letter "A" is used in such a manner as transition probability Aij (transition edge Aij) in the explanation of the controller learning processing. This is for the purpose of preventing confusion with the lower-case letter "a" in an action a(t) explained later.

During the learning processing for an HMM in step S1, the system shown in FIG. 3 performs some random or innate behavior as explained above. A behavior performed by the system shown in FIG. 3 in a state "i" during the innate behavior is referred to as action a(t). The action a(t) is abbreviated as action "a" as appropriate. In this case, a causality model in which the transition edge Aij is caused by the action "a" holds.

The learning unit 41 of the behavior control unit 24 samples, with respect to each of caused transition edges Aij, the observation value o(t) (hereinafter abbreviated as observation value "o") and the action "a" at the point when the transition edge Aij is caused. In this case, if a time series observation signal is a signal for long time, the transition edges Aij are caused many times during the long time. Therefore, the learning unit 41 learns mapping a=Fij(o) with respect to one transition edge Aij using the sampled observation value "o" and action "a". As a learning method for this function mapping Fij( ), for example, a method like a neural network can be adopted. As a simplest example, a learning method for the function mapping Fij( ) for outputting an average of the action "a" regardless of the observation value "o" can be adopted.

Such a function mapping Fij( ) is stored in the controller storing unit 43 as a controller to be executed by the action unit 25.

A learning result of the controller, i.e., information indicating, for each of the transition edges Aij, which controller (the function mapping Fij( )) corresponds to the transition edge Aij is stored in the controller-table storing unit 42 in a table format. Such a table is referred to as controller table.

In this embodiment, it is assumed that an identifier (ID) for uniquely specifying each of the controllers (function mappings Fij( )) is given to the controller. In this case, as information indicating what the controller (the function mapping Fij( )) associated with a predetermined transition edge Aij is, an ID of the controller can be adopted. Therefore, in this embodiment, for each of the transition edges Aij, an ID of the controller (the function mapping Fij( )) corresponding to the transition edge Aij is stored in the controller table 42. In the controller storing unit 43, each of the controllers (the function mappings Fij( )) is stored to be tied to an ID thereof. An example of a method of using the ID is referred to in explanation of step S70 in FIG. 14.

As the controller learning processing in step S3, the processing for performing learning for allocating a controller for outputting an action to each of transitions of a state is explained as an example. However, as the controller learning processing according to this embodiment, besides the example explained above, for example, processing for performing learning for allocating a controller for outputting an action to each of transition destination states can also be adopted.

The planning processing in step S4 is explained below.

At a stage when the controller learning processing in step S3 ends, the system shown in FIG. 3 finishes the learning. The system can set an arbitrary target in an internal state formed by the system using an HMM and perform behavior for realizing the attainment of the target.

Therefore, the planning unit 34 sets up a plan (planning) for realizing the attainment of the target. Processing for setting up such a plan is the planning processing in step S4.

The planning unit 34 sets, as a goal, a target designated from the outside or endogenously obtained in the system. In the system shown in FIG. 3, the target is provided from the execution managing unit 44. In the following explanation, a node indicating a state of the goal is referred to as goal node "g". In this case, at a point when the goal node "g" and the node "i" indicating a present state (hereinafter referred to as present state node "i") are known, the planning unit 34 searches for a path connecting these two nodes on an HMM. Processing for searching for such a path from the present state node "i" to the goal node "g" is the planning processing in step S4.

Figure 13:
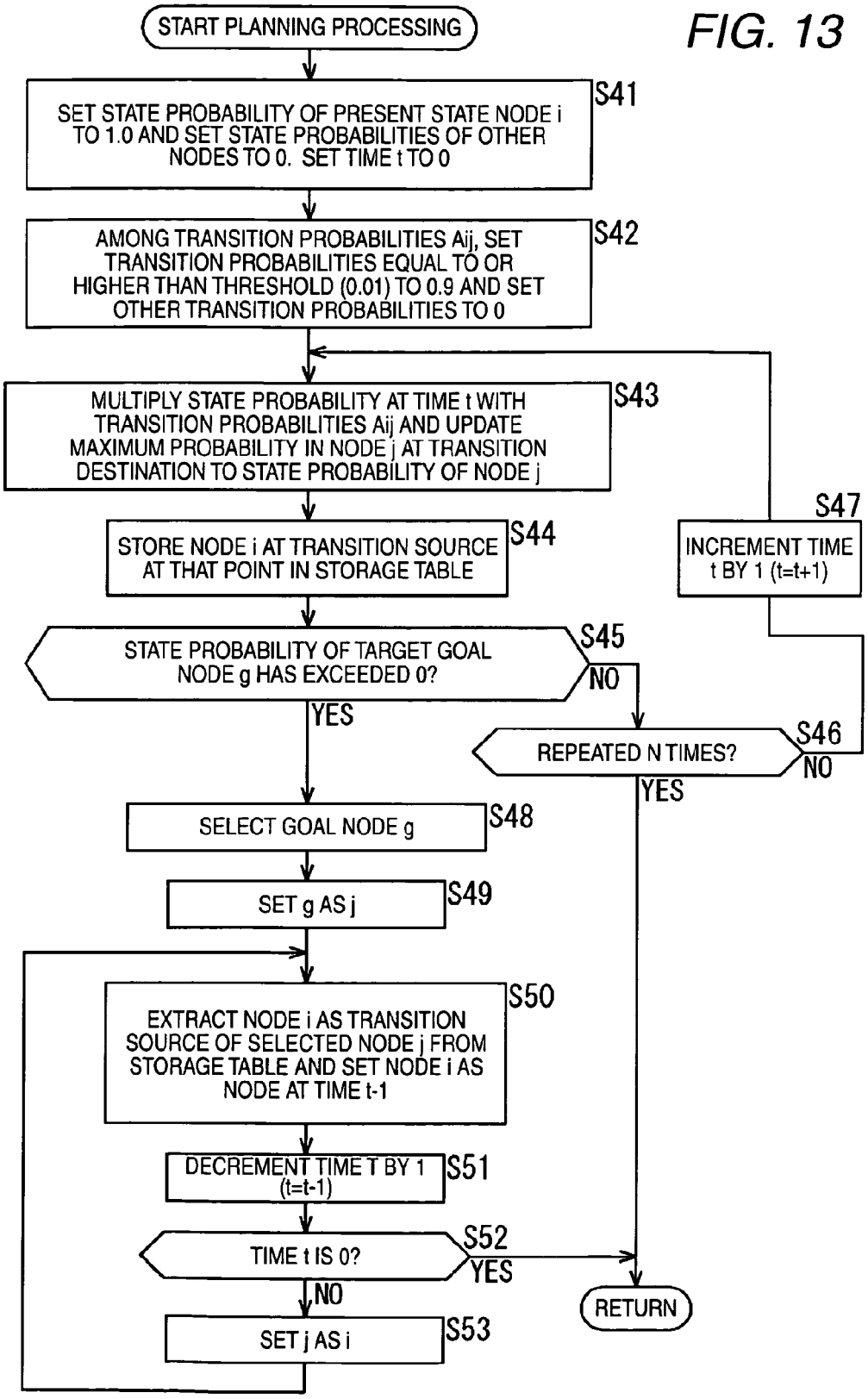
FIG. 13 is a flowchart for explaining a detailed example of the recognition processing shown in FIG. 5.

There are various algorithms for the path search. Any one of the algorithms may be adopted. However, in this embodiment, as indicated by a flowchart of FIG. 13, an algorithm as an application of the Viterbi Algorithm is adopted. FIG. 13 is a flowchart for explaining an example of the planning processing.

In step S41, the planning unit 34 sets a state probability of the present state node "i" to 1.0 and sets a state probability of the other nodes to 0. The planning unit 34 sets the time t to 0.

In step S42, the planning unit 34 sets the transition probabilities Aij equal to or higher than a threshold (0.01) to 0.9 and sets the other transition probabilities Aij to 0.

In step S43, the planning unit 34 multiplies the state probability at time t with the transition probability Aij and updates a maximum probability in the node "j" at the transition destination to a state probability of the node "j".

In step S44, the planning unit 34 stores the node "i" at the transition source at that point in the storage table. A constructing location for the storage table is not specifically limited. In this embodiment, for example, it is assumed that the storage table is constructed in the planning unit 34.

In step S45, the planning unit 34 determines whether a state probability of the goal node "g" as the target has exceeded 0.

When the state probability of the goal node "g" as the target is 0, assuming that the state probability has not reached the target, the planning unit 34 determines in step S45 that the state probability of the goal node "g" has not exceeded 0 (NO in step S45). The processing proceeds to step S46.

In step S46, the planning unit 34 determines whether loop processing from step S43 to step S47 has been repeated N times.

The N times repetition means that the state probability has not reached the target yet even if the steps are repeated N times. Therefore, in such a case, i.e., when the planning unit 34 determines in step S46 that the loop processing has been repeated N times (YES in step S46), the planning processing is finished on the assumption that the planning unit 34 has given up the planning.

On the other hand, when the loop processing has not been repeated N times yet, the planning unit 34 determines in step S46 that the loop processing has not been repeated N times (NO in step S46). The processing proceeds to step S47. In step S47, the planning unit 34 increments the time t by 1 (time t=t+1). Thereafter, the processing is returned to step S43 and the processing in step S43 and subsequent steps is repeated.

The loop processing from step S43 to step S47 is repeated several times in this way. As a result, when the state probability of the goal node "g" as the target exceeds 0, assuming that the state probability has reached the target, the planning unit 34 determines in step S45 that the state probability of the goal node "g" has exceeded 0 (YES in step S45). The processing proceeds to step S48.

In step S48, the planning unit 34 selects the goal node "g". In step S49, the planning unit 34 sets the goal node "g" equal to the node "j".

In step S50, the planning unit 34 extracts the node "i" at the transition source of the selected node "j" from the storage table and sets the node "i" as a node at time t−1.

In step S51, the planning unit 34 decrements the time t by 1.

In step S52, the planning unit 34 determines whether the time t is 0.

When the time t is time after 0, the planning unit 34 determines in step S52 that the time t is not 0 (NO in step S52). The processing proceeds to step S53. In step S53, the planning unit 34 sets the node "j" equal to the node "i". Thereafter, the processing is returned to step S50 and the processing in step S50 and subsequent steps is repeated.

Loop processing from step S50 to step S53 is repeated until the time t reaches 0. When the time t reaches 0, the planning unit 34 determines in step S52 that the time t is 0 (YES in step S52). The planning processing is finished. A node sequence formed at this point, i.e., a node sequence from the present state node "i" to the goal node "g" is decided as a path.

The planning processing in step S4 is explained above. Subsequently, the behavior control processing in step S5 is explained below.

Figure 14:
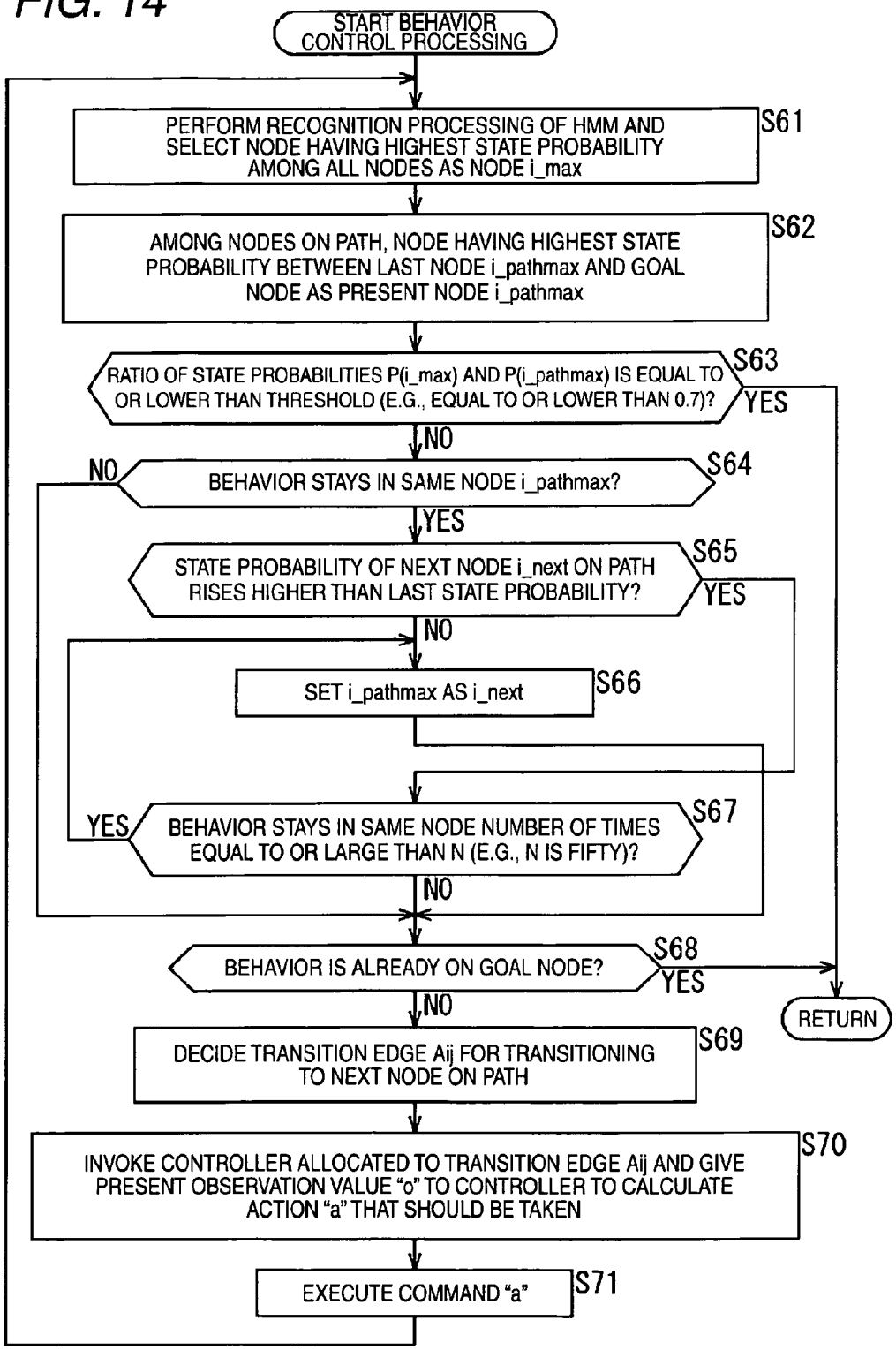
FIG. 14 is a flowchart for explaining a detailed example of the recognition processing shown in FIG. 5.

FIG. 14 is a flowchart for explaining an example of the behavior control processing by the behavior control unit 24, i.e., processing of behavior control by the behavior control unit 24 on the basis of the path (the node sequence) calculated in the processing in step S4.

In step S61, the execution managing unit 44 of the behavior control unit 24 performs recognition processing for an HMM and selects a node having a highest state probability among all the nodes as a node i_max.

In this embodiment, it is assumed that processing conforming to the flowchart of the example shown in FIG. 12 is executed as the recognition processing for an HMM. For convenience of explanation, an operation entity of the recognition processing for an HMM is the execution managing unit 44. However, actually, the operation entity is the recognizing unit 33. Accurately, the recognizing unit 33 performs the recognition processing for an HMM. The execution managing unit 44 selects the node i_max on the basis of a result of the processing.

In step S62, the execution managing unit 44 selects, as the present node i_pathmax, a node having a highest state probability between the last node i_pathmax and the goal node among the nodes on the path.

In step S63, the execution managing unit 44 determines whether a ratio of state probabilities P(i_max) and P(i_pathmax) is equal to or smaller than a threshold (e.g., equal to or smaller than 0.7). The state probability P (i_max) indicates a state probability of the node i_max. The state probability P(i_pathmax) indicates a state probability of the node i_pathmax.

When the ratio of the state probabilities P(i_max) and P(i_pathmax) is equal to or smaller than the threshold, assuming that the present behavior of the system shown in FIG. 3 deviates from the path, the execution managing unit 44 determines in step S63 that the ratio is equal to or smaller than the threshold (YES in step S63). The behavior control processing is finished.

On the other hand, when the ratio of the state probabilities P(i_max) and P(i_pathmax) exceeds the threshold, assuming that the present behavior of the system shown in FIG. 3 has not deviated from the path yet, the execution managing unit 44 determines in step S63 that the ratio is not equal to or smaller than the threshold (NO in step S63). The processing proceeds to step S64.

In step S64, the execution managing unit 44 determines whether the system stays in the same node i_pathmax, i.e., whether the node i_pathmax selected in the present processing in S62 and the node i_pathmax selected in the last processing in step S62 are the same.

When the system does not stay in the same node, the system is regarded as moving along the path. Therefore, the execution managing unit 44 determines in step S64 that the system does not stay in the same node i_pathmax (NO in step S64). The processing proceeds to step S68. Processing in step S68 and subsequent steps is explained later.

On the other hand, when the system stays in the same node i_pathmax, it is likely that the system is not moving along the path. Therefore, the execution managing unit 44 determines in step S64 that the system stays in the same node i_pathmax (YES in step S64). The processing proceeds to step S65.

In step S65, the execution managing unit 44 determines whether a state probability of the next node i_next on the path rises to be higher than the last state probability.

When the state probability of the next node i_next does not rise, assuming that the system is not transitioning along the path, the execution managing unit 44 determines in step S65 that the state probability of the next node i_next does not rise to be higher than the last state probability (NO in step S65). In step S66, the execution managing unit 44 sets the node i_pathmax as the node i_next. Thereafter, the processing proceeds to step S68. Processing in step S68 and subsequent steps is explained later.

On the other hand, when the state probability of the next node i_next rises, the execution managing unit 44 determines in step S65 that the state probability of the next node i_next rises to be higher than the last state probability (YES in step S65). The processing proceeds to step S67.

In step S67, the execution managing unit 44 determines whether the system stays in the same node the number of times equal to or larger than N (e.g., fifty).

When the system does not stay in the same node the number of times equal to or larger than N, the execution managing unit 44 determines in step S67 that the system does not stay in the same node the number of times equal to or larger than N (NO in step S67). The processing proceeds to step S68. Processing in step S68 and subsequent steps is explained later.

On the other hand, when the system stays in the same node the number of times equal to or larger than N, the execution managing unit 44 determines in step S67 that the system stays in the same node the number of times equal to or larger than N (YES in step S67). In step S66, the execution managing unit 44 sets the node i_pathmax as the node i_next. In other words, when the system stays in the same node the number of times equal to or larger than N, the execution managing unit 44 regards that the path is advanced by force. Thereafter, the processing proceeds to step S68.

In step S68, the execution managing unit 44 determines whether the system is already on the goal node.

When it is recognized that the system is already on the goal node, the execution managing unit 44 determines in step S68 that the system is already on the goal node (YES in step S68). Assuming that the system has reached the target, the execution managing unit 44 finishes the behavior control processing.

On the other hand, when it is recognized the system is not already on the gold node, the execution managing unit 44 determines in step S68 that the system is not on the gold node (NO in step S68). The processing proceeds in step S69.

In step S69, the execution managing unit 44 decides the transition edge Aij for transitioning to the next node on the past.

In step S70, the execution managing unit 44 invokes the controller (the function mapping Fij( )) allocated to the transition edge Aij. The action unit 25 gives the present observation value "o" to the controller to calculate the action "a" that should be performed.

More accurately, in this embodiment, an ID of the controller (the function aping Fij( )) allocated to the transition edge Aij is read out from the controller-table storing unit 42. The controller (the function mapping Fij( )) specified by the ID is read out from the controller storing unit 43. An output obtained as a result of inputting the present observation value "o" to the function mapping Fij( ) as the controller is the action "a".

The action "a" is provided to the action unit 25 as a command. Therefore, in step S71, the action unit 25 executes the command "a".

Thereafter, the processing is returned to step S61. The processing in step S61 and subsequent steps is repeated.

When the execution managing unit 44 determines in step S68 that system is already on the goal node (YES in step S68) and the behavior control processing ends, the execution managing unit 44 may determine again whether the node i_max at that point is truly the goal node. When a result of re-determination is a result indicating that the node i_max is the goal node, the entire control processing for the simple pendulum shown in FIG. 5 is finished. On the other hand, when the result of the re-determination is a result indicating that the node i_max is not the goal node, the system shown in FIG. 3 returns the processing to step S4. The system performs the behavior control processing in step S5 again after executing the planning processing again in the same goal node and creating a new path.

Figure 15:
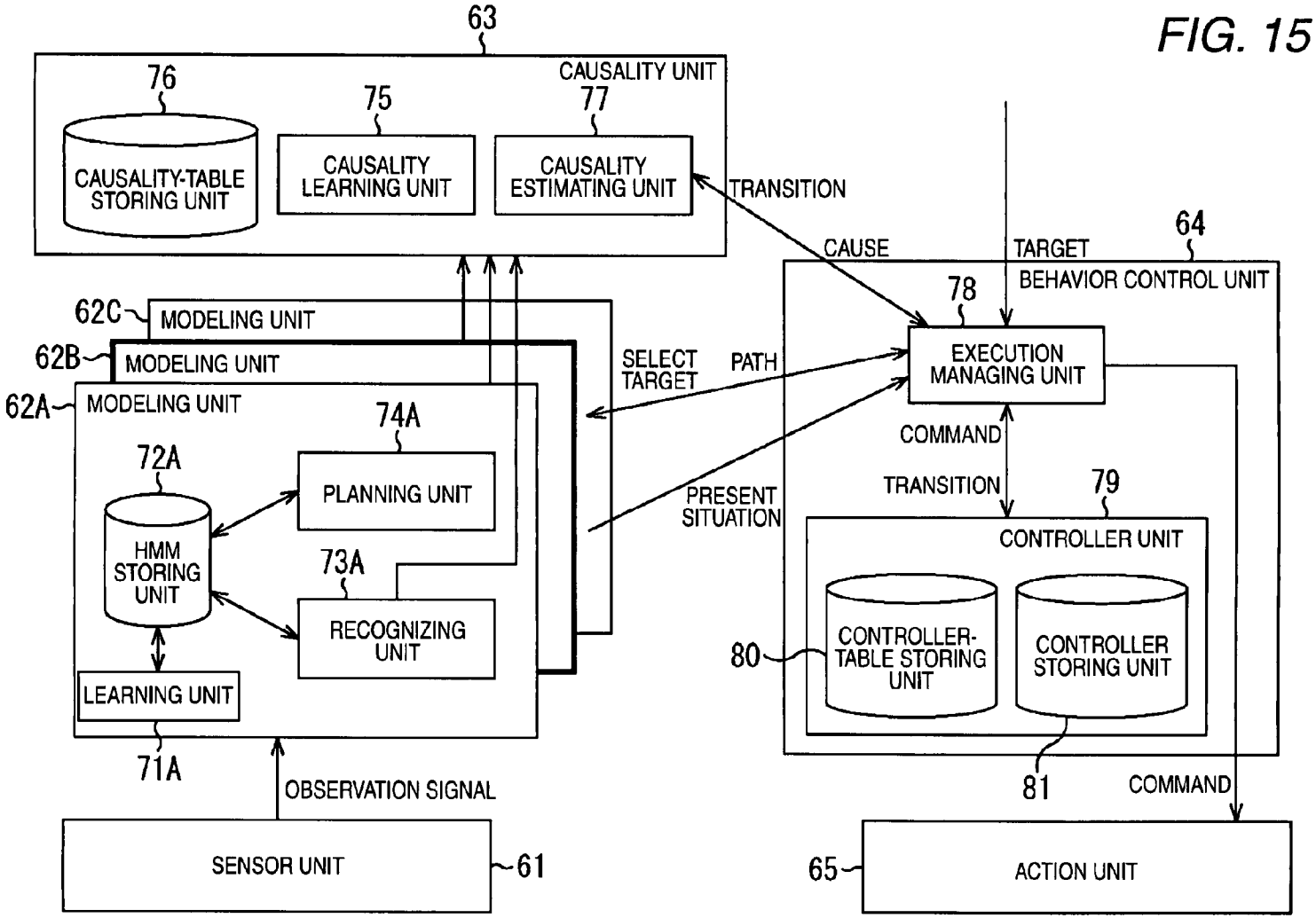
FIG. 15 is a functional block diagram of an information processing system according to an embodiment of the present invention.

The system shown in FIG. 3 that can attain the simple pendulum task is explained above. However, in the system shown in FIG. 3, it is difficult to attain a multi-modal task explained later. On the other hand, a functional configuration example of a system that can attain the multi-modal task is shown in FIG. 15. FIG. 15 is a functional block diagram of an information processing system according to an embodiment of the present invention (hereinafter simply referred to as system shown in FIG. 15) having a functional configuration example different from that in the system shown in FIG. 3.

The system shown in FIG. 15 includes a sensor unit 61, three kinds of modeling units 62A and 62C, a causality unit 63, a behavior control unit 64, and an action unit 65.

The sensor unit 61 is configured as a so-called multi-modal sensor.

The multi-modal sensor is briefly explained below.

As one of concepts obtained by expanding a human interface in the past is present as a concept of the multi-modal interface. As a synonym of the multi-modal interface, for example, there is a word called multi-media interface. Whereas the multi-media interface represents an interface that simply uses plural media (sound, video, tactile sense, etc.), the multi-media interface is referred to as multi-modal interface when the respective media are used in various forms and perform information transmission.

As an example of the multi-modal interface, there is an interface that sets events such as utterance, action, and line of sight as modals, causes these modals to cooperate with one another, simultaneously uses the modals, and combines plural kinds of messages to cause a human to understand a message that the human originally intends to communicate or is naturally transmitted.

In other words, the multi-modal sensor is a sensor for realizing such a multi-modal interface and is a sensor that can detect a physical amount corresponding to each of the plural modals (events).

For example, in the example shown in FIG. 15, the sensor unit 61 observes, for each of three modals, a predetermined physical amount of an environment in which the agent is placed, i.e., a physical amount corresponding to the modal and provides, as an observation signal, modeling units 62A, 62B, and 62C with a result of the observation.

Each of the modeling units 62A, 62B, and 62C has a function and a configuration basically same as those of the modeling unit 22 shown in FIG. 3. Concerning the modeling unit 62A, each of a learning unit 71A, an HMM storing unit 72A, a recognizing unit 73A, and a planning unit 74A has a function basically same as that of each of the learning unit 31, the HMM storing unit 32, the recognizing unit 33, and the planning unit 34 shown in FIG. 3. Although not shown in the figure, the modeling unit 62B includes a learning unit 71B, an HMM storing unit 72B, a recognizing unit 73B, and a planning unit 74B having functions and configurations basically same as those of each of the learning unit 31, the HMM storing unit 32, the recognizing unit 33, and the planning unit 34 shown in FIG. 3. The modeling unit 62C includes a learning unit 71C, an HMM storing unit 72C, a recognizing unit 73C, and a planning unit 74C having functions and configurations basically same as those of the learning unit 31, the HMM storing unit 32, the recognizing unit 33, and the planning unit 34 shown in FIG. 3.

Therefore, respective HMMs constructed as a result of learning performed by using observation signals for respective three modals of the sensor 61, i.e., HMMs of the three modals are stored in the HMM storing units 72A to 72C. The modals to be modeled by modeling units 62A to 62C are referred to as modals A to C. In this case, respective HMMs of the modals A to C are stored in the HMM storing units 72A to 72C.

Naturally, the number of modals is not limited to three and only has to be equal to or larger than two. However, in that case, modeling units corresponding to the modeling unit 62A equivalent to the number of modals are present.

The causality unit 63 includes a causality learning unit 75, a causality-table storing unit 76, and a causality estimating unit 77.

The causality learning unit 75 learns node transition, which is recognized by a recognizing unit 73AK on the basis of the structure of an HMM of a modal K (K is any one of A to C), and a relation of a state of an HMM of another modal L (L is any one of A to C other than K). A result of the learning is stored in the causality-table storing unit 76. Details of processing by the causality learning unit 75 are explained later.

The behavior control unit 64 includes an execution managing unit 78 and a controller unit 79. The controller unit 79 includes a controller-table storing unit 80 and a controller storing unit 81. The controller-table storing unit 80 and the controller storing unit 81 have functions and configurations basically same as those of the controller-table storing unit 42 and the controller storing unit 43 shown in FIG. 3.

When a target is given, the execution managing unit 78 determines the modal K corresponding to the target and provides the modeling unit 62K with the modal K. A planning unit 74K of the modeling unit 62K plans a path according to the target and provides the execution managing unit 78 with the path. The execution managing unit 78 controls the action unit 65 such that the system (the agent) shown in FIG. 15 behaves along the path. First, the execution managing unit 78 inquires, in order to realize the path, the causality estimating unit 77 of a cause node that is a cause of transition. The causality estimating unit 77 estimates the cause node and a cause modal and provides the execution managing unit 78 with the cause node and the cause modal. The cause node and the cause modal are explained later. If the cause modal is a controller, the execution managing unit 78 inquires the controller unit 79 and outputs a command corresponding to the controller. If the cause node is a node on an HMM of another modal L, the execution managing unit 78 recursively inquires a planning unit 74L of a path with the node set as a target. Details of the series of processing by the execution managing unit 78 are explained later.

The action unit 65 performs a predetermined behavior according to a command from the behavior control unit 64.

The system shown in FIG. 15 is explained more in detail below with reference to an example in which a multi-modal task is given as a task.

Figure 16:
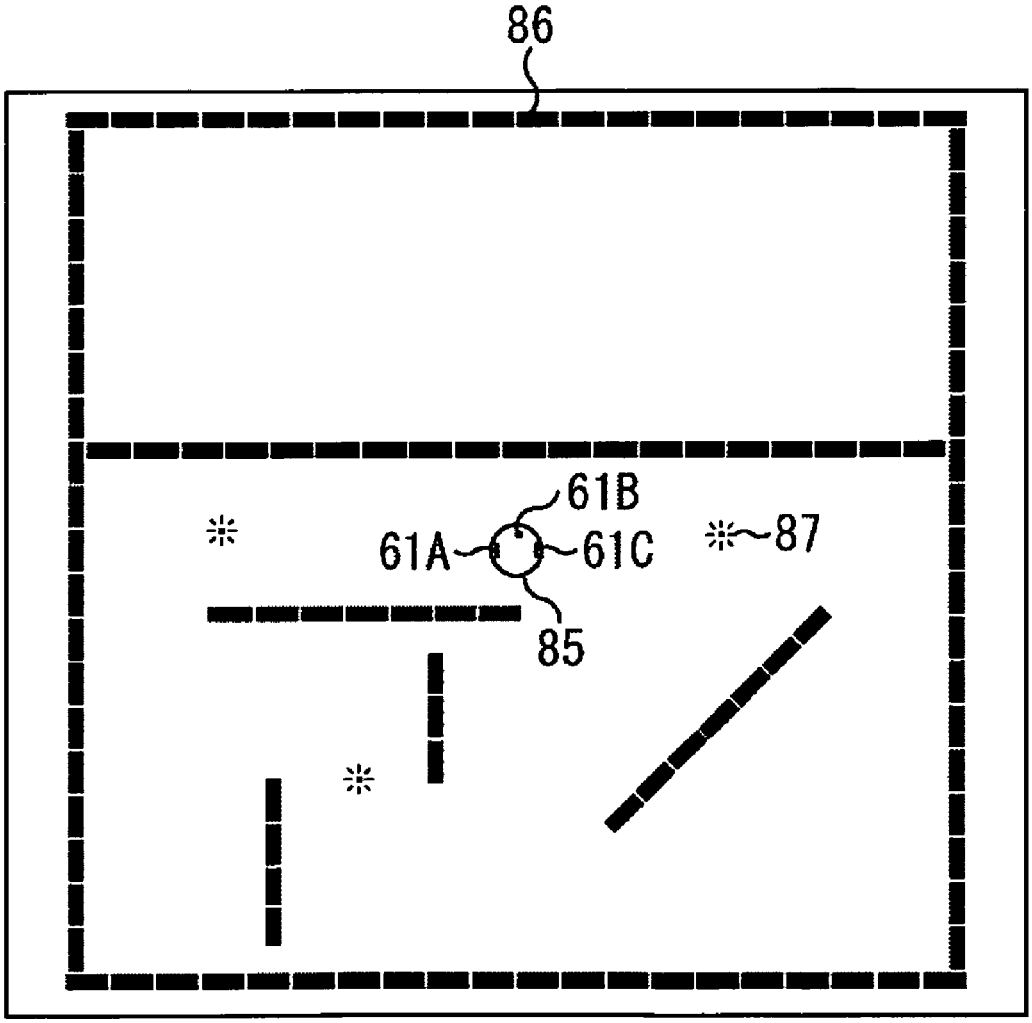
FIG. 16 is a diagram of an example of display of a simulator applicable to a multi-modal task.

Specifically, it is assumed that a multi-modal task explained below is given. The multi-modal task has a purpose of allowing a round mobile robot 85 to freely move within an area surrounded by a wall 86 as shown in FIG. 16. A point 87 indicates that a light source is present there.

The applicant performed, as an experiment by a simulator, movement of the mobile robot 85 shown in FIG. 16. FIG. 16 is a diagram of an external appearance of the simulator. A prototype of the simulator shown in FIG. 16 adopted in this experiment is disclosed in a document "Olivier Michel. Khepera Simulator Package version 2.0: Freeware mobile robot simulator written at the University of Nice Sophia—Antipolis by Oliver Michel. Downloadable from the World Wide Web at http://wwwi3s.unice.fr/~orn/khep-sim.html" (Document A).

Figure 17:
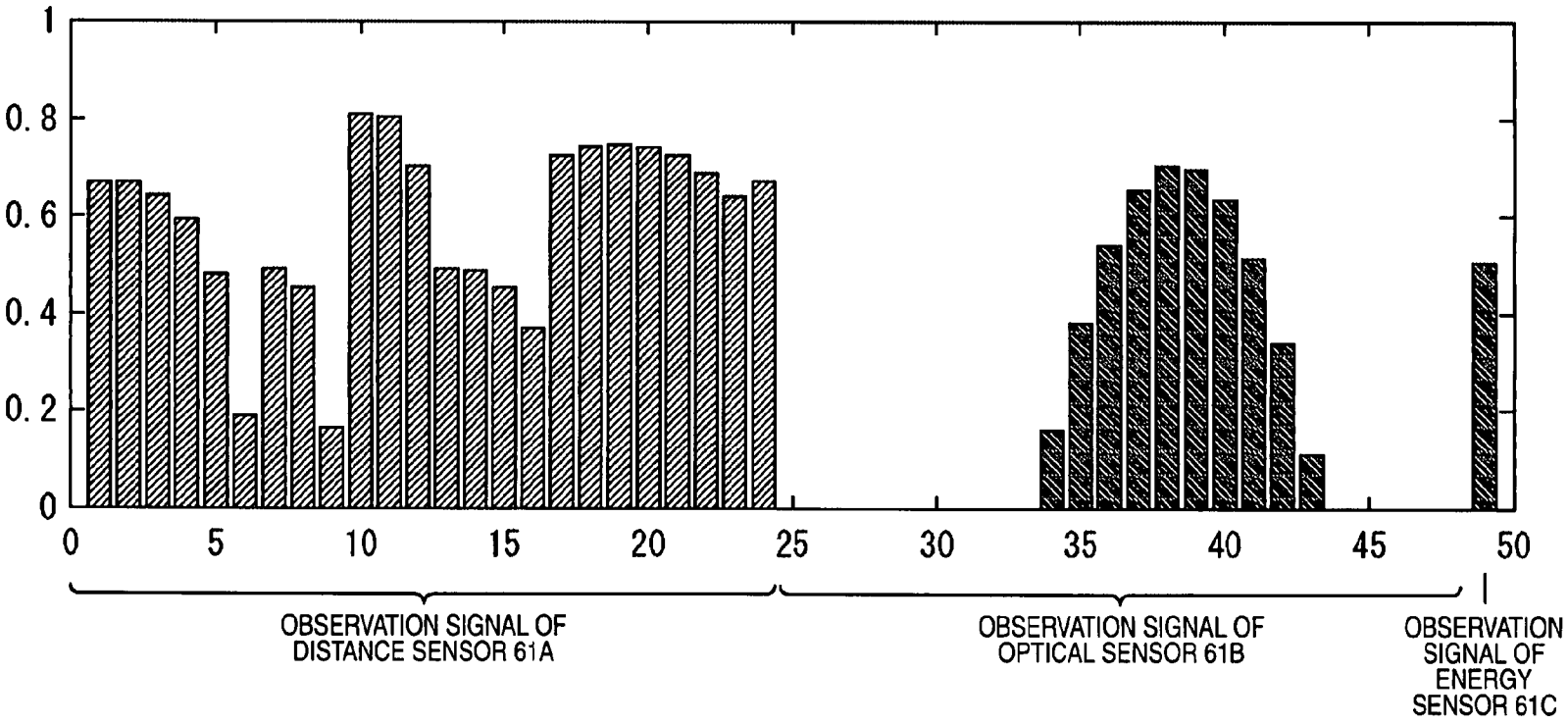
FIG. 17 is a diagram of an example of an observation signal of a multi-modal sensor.

The prototype is referred to above because the simulator adopted this time is not the simulator per se disclosed in the document but a simulator incorporating observation signals and actions shown in FIG. 17.

As shown in FIGS. 16 and 17, the robot 85 is mounted with, as the sensor unit 61, an energy sensor 61C in addition to a distance sensor 61A that detects a distance to the wall 86 and an optical sensor 61B that detects brightness of light. The robot 85 can move by driving left and right wheels.

It should be note that arrangement positions in FIG. 16 of the distance sensor 61A, the optical sensor 61B, and the energy sensor 61C do not always coincide with actual arrangement positions.

As shown in FIG. 17, on the assumption that the distance sensor 61A is attached in twenty-four directions around the robot 85, the distance sensor 61A outputs values corresponding to distances to the wall in the respective twenty-four directions as an observation signal. In FIG. 17, bar graphs with numbers 1 to 24 respectively represents signal intensities (instantaneous values) of the observation signals in the twenty-four directions.

On the assumption that the optical sensor 61B is attached in twenty-four directions (same as the directions of the distance sensor 61A) around the robot 85, the optical sensor 61B outputs values corresponding to brightness of light in the respective twenty-four directions as an observation signal. However, taking into account the fact that light has a diffusing characteristic, the values of the observation signal are adapted to be not only values in one direction but also values affected by the sensors around the robot 85. In FIG. 17, bar graphs of numbers 25 to 48 respectively represent signal intensities (instantaneous values) of the observation signal in the twenty-four directions.

The energy sensor 61C observes energy defined as explained below and outputs an observation value of the energy as an observation signal. The energy is consumed in proportion to a movement amount and supplied in proportion to an amount of irradiated light. In FIG. 17, a bar graph with a number 49 represents signal intensity (instantaneous value) of the observation signal.

As an action (a behavior), i.e., as a command given to the action unit 65, a command of a movement amount is adopted. Specifically, a command ($\Delta x$, $\Delta y$) for movement along the abscissa and the ordinate on the simulator shown in FIG. 16 (hereinafter referred to as movement command) is adopted. $\Delta x$ is a movement command in an x direction (a horizontal direction in the figure) $\Delta y$ is a movement command in the y axis (a vertical direction in FIG. 16).

In summary, the robot 85 has a detection function realized by using the twenty-four-dimension distance sensor 61A, the twenty-four-dimension optical sensor 61B, and the one-dimensional energy sensor 61C. The robot 85 also has input and output functions for two-dimensional movement command. The robot 85 is an agent controlled by the system shown in FIG. 15. Therefore, the robot 85 displays these various functions to make it possible to self-organize an internal state and arbitrarily control the internal state.

An overview of a flow of the processing of the system shown in FIG. 15 for attaining a multi-modal task explained above is similar to the control processing for the simple pendulum task shown in FIG. 5. Therefore, only differences from the control processing for the simple pendulum task shown in FIG. 5 are explained below.

First, the system shown in FIG. 15 executes the learning processing for an HMM in the same manner as the processing in step S1 of the control processing for the simple pendulum task shown in FIG. 5. However, the learning processing for an HMM executed by the system shown in FIG. 15 is different from the learning processing shown in FIG. 5 and is processing explained below.

The system shown in FIG. 15 (the agent as the robot 85A) performs a behavior on the basis of a random or simple innateness rule (e.g., when the system moves in a certain direction and bumps against the wall 86, the system changes the direction). It is assumed that, when the behavior based on the innateness rule is performed, the innateness controller 23 shown in FIG. 3 is provided in the system shown in FIG. 15 as well.

In the control processing for the simple pendulum task shown in FIG. 5, learning for an HMM is performed by using the time series observation signal (the time series signal at the angle $\theta$) as only observation information.

On the other hand, in the system shown in FIG. 15, a modality of the sensor unit 61 is known. The robot 85 has a detection function realized by the twenty-four dimensional distance sensor 61A, the twenty-four dimensional optical sensor 61B, and one-dimensional energy sensor 61C. Therefore, the learning processing for an HMM is performed for each of three kinds of observation signals, i.e., an observation signal (distance) of the distance sensor 61A, an observation signal (light) of the optical sensor 61B, and an observation signal (energy) of the energy sensor 61C. A learning processing unit for an HMM concerning one observation signal is basically the same as the learning processing for an HMM in the control processing for the simple pendulum task shown in FIG. 5.

In the example shown in FIG. 15, the modeling unit 62A constructs an HMM for distance and stores the HMM in the HMM storing unit 72A. The modeling unit 62B constructs an HMM for light and stores the HMM in the HMM storing unit 72B. The modeling unit 62C constructs an HMM for energy and stores the HMM in the HMM storing unit 72C.

Figure 18A:
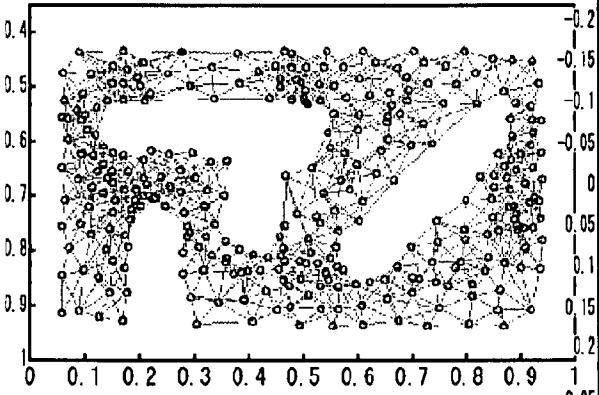
FIGS. 18A to 18C are diagrams of examples of learning results of HMMs in respective modals in the multi-modal task.

A display example of a learning processing result for an HMM by the modeling unit 62A, i.e., a display example of a result obtained by giving, as an initial structure, a two-dimensional neighborhood structure HMM with 400 nodes to the system and causing the system to learn a time series of the observation signal (distance) of the distance sensor 61A is shown in FIG. 18A.

Figure 18B:
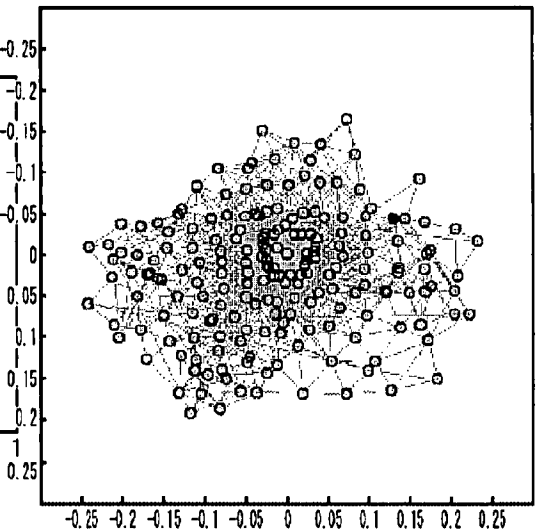

A display example of a learning processing result for an HMM by the modeling unit 62B, i.e., a display example of a result obtained by giving, as an initial structure, a two-dimensional neighborhood structure HMM with 100 nodes to the system and causing the system to learn a time series of the observation signal (light) of the distance sensor 61B is shown in FIG. 18B.

Figure 18C:
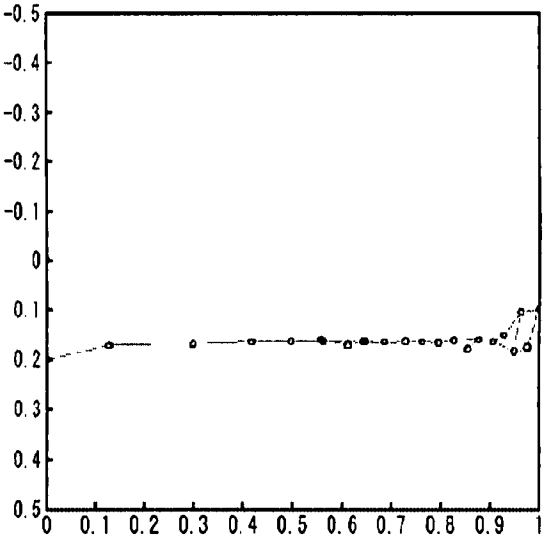

A display example of a learning result of the modeling unit 62C, i.e., a display example of a result obtained by giving, as an initial structure, a two-dimensional neighborhood structure HMM with 100 nodes to the system and causing the system to learn a time series of the observation signal (energy) of the distance sensor 61C is shown in FIG. 18C.

In FIG. 18A, nodes (white void circles) are plotted in average positions where the robots 85 is present when the respective nodes are recognized. The abscissa indicates a distance in the horizontal direction x and the ordinate indicates a distance in the vertical direction y.

In FIG. 18B, nodes (white void circles) are plotted in average positions where the robot 85 is present when the respective nodes are recognized. The abscissa indicates a distance in the horizontal direction x and the ordinate indicates a distance in the vertical direction y. A center position, i.e., a coordinate (0,0) indicates a position of the point 87 as a light source. The coordinate (0,0) does not mean a position of specific one point 87 but means a position of any one of three points 87 shown in FIG. 16.

Concerning FIG. 18C, nodes (white void circles) are plotted on a space of a value of energy (the ordinate) and a distance to light (the point 87 as the light source) closest to an average position where the robot 85 is present.

Since the distance sensor 61A senses the wall 86, it is seen that the HMM for distance shown in FIG. 18A is represented as a topological network of a maze configuration.

Concerning the HMM for light shown in FIG. 18B, it is seen that a network is formed in a radial shape around the light source (the points 87A).

Concerning the HMM for energy shown in FIG. 18C, since energy simply rises and falls, it is seen that a network like one chain is formed. A method of plotting shown in FIG. 18C is a method of plotting with a distance to light (a distance to the point 87A) set on the abscissa. Therefore, it is seen that network in which, when close to the light, state transition is formed in a direction in which energy rises and, on the other hand, when distant from the light, a direction of state transition is determined in a direction in which energy falls, i.e., a so-called latter-type network is formed.

Figure 19:
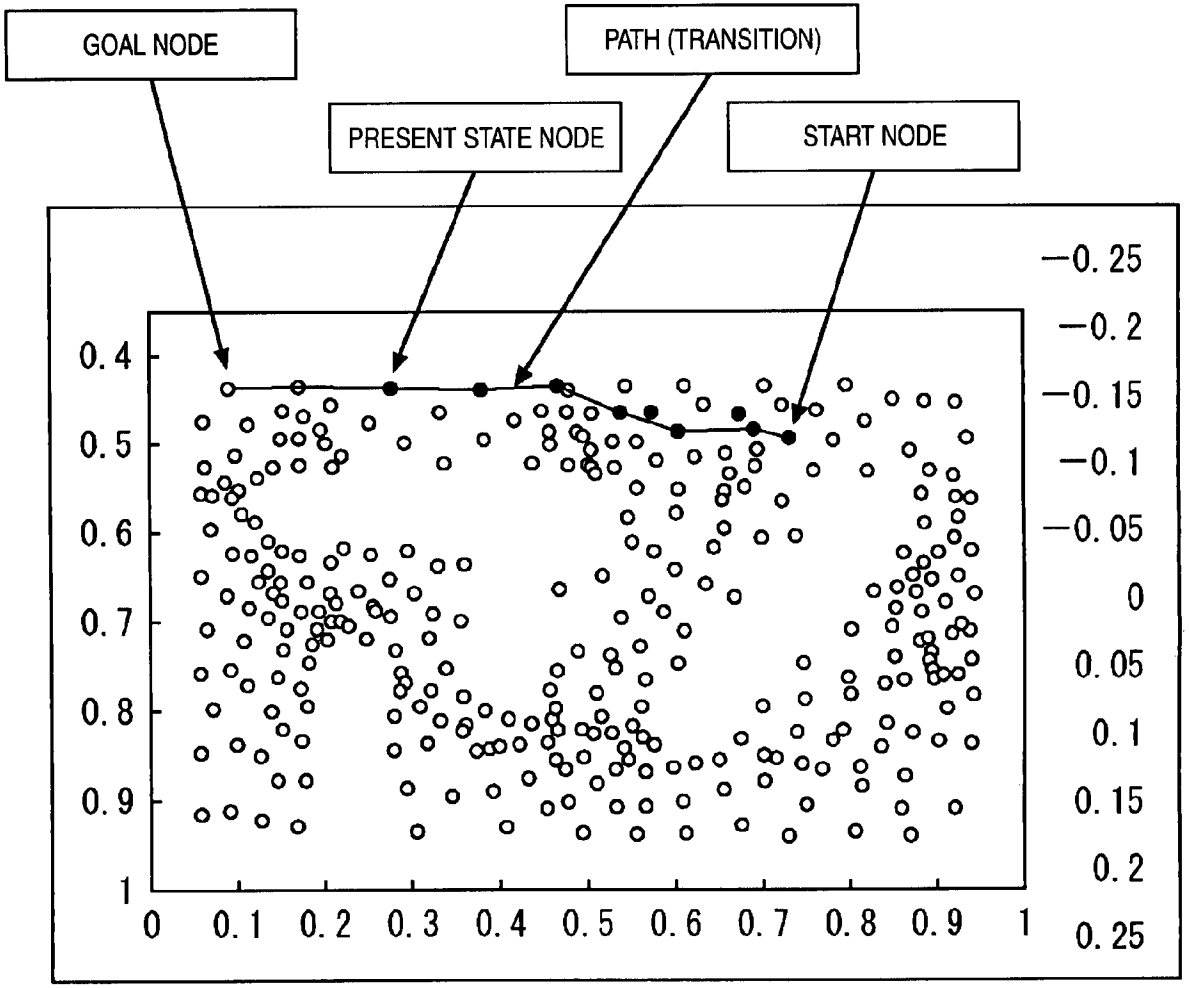
FIG. 19 is a diagram for explaining an example of a path and control of an HMM for distance.

When the multi-modal task as the target is considered only in terms of an HMM for distance and an action (a command) and controlled to be in an arbitrary state, a state shown in FIG. 19 is obtained. The behavior control processing can be realized by an idea same as that of the simple pendulum task. In other words, in this case, the system shown in FIG. 15 only has to execute steps S2 to S5 in FIG. 5.

However, in the problem setting for the multi-modal task, a direct correlation is not always present between the state transitions of the respective HMMs shown in FIGS. 18A to 18C and an action (a behavior). Therefore, it is difficult to solve such a problem of the multi-modal task simply by directly learning an action (a behavior) at the time when the state transitions are caused.

For example, transition of the HMM for energy shown in FIG. 18C depends on a distance relation between the light sources (the points 87) on the simulator shown in FIG. 16 and the robot 85. Therefore, the transition of the HMM for energy shown in FIG. 18C has no relation with a moving action indicating in which direction the robot 85 moves at a certain instance. However, in an internal state like a position in the maze represented by the HMM for distance shown in FIG. 18A, a high relation is present between a moving action of the robot 85 and a transitioning node.

Therefore, in the system shown in FIG. 15, the causality unit 63 is provided in order to realize a function with which the agent (the robot 85) can autonomously find and control a relation between an internal state and a behavior even in such a case.

The causality unit 63 can execute processing explained below instead of steps S2 and S3 in FIG. 5 in order to attain the target of the multi-modal task.

In respective time steps, presently-recognized one node is decided according to recognition results in the respective HMMs shown in FIGS. 18A to 18C. As a recognition result in a unit HMM, for example, a result of the recognition processing shown in FIG. 12 concerning the unit HMM can be adopted.

In addition to the decided node, an action (a behavior) performed at that time can be treated as one modal by being discretized. In the following explanation, such a modal is referred to as action modal. A state of the action modal is referred to as action state.

A state of the HMM at time t including the action state is described as $S_{k,i}(^{t})$. "k" indicates a modal number. k=0 indicates the action modal. "i" indicates an index representing a state in the modal.

A probabilistic causality mode indicated by Formula (1) is assumed.

$$P(s_{k,j}(t+1)) = \sum_{i,l} P(s_{k,i} \rightarrow s_{k,j} \mid s_{m,l}(t))P(S_{k,i}(t))P(s_{m,l}(t)) \quad (1)$$

Formula (1) indicates that the next state of a certain modal depends on the present state and a state $S_{m,l}$ of certain another modal.

This "certain modal" is referred to as cause modal. A present station node in the cause modal is referred to as cause node. Then, when the cause modal is the action modal itself, Formula (1) indicates a simple behavior result model in which a node transitioned from the present state node (the cause node) changes according to a behavior (an action) performed at time t.

In the following explanation, finding of a cause modal and a cause node concerning node transition of respective modals is referred to causality estimation. Since the causality estimation is explained in detail later, only an overview of the causality estimation is explained below.

The causality estimation means, when transition occurs in a certain modal, counting states of other modals recognized at that point and deducing a state that occurs simultaneously with the transition at a high frequency. This makes it possible to find cause modals and cause nodes corresponding to respective transitions. The causality learning unit 75 finds a cause modal and a cause node corresponding to each of the transitions by performing such causality estimation for each of the transitions. The cause modal and the cause node for each of the transitions are stored in the causality-table storing unit 76 as a table. In the following explanation, such a table is referred to as causality table.

The overview of the causality estimation is further explained with reference to FIGS. 20 and 21.

Figure 20:
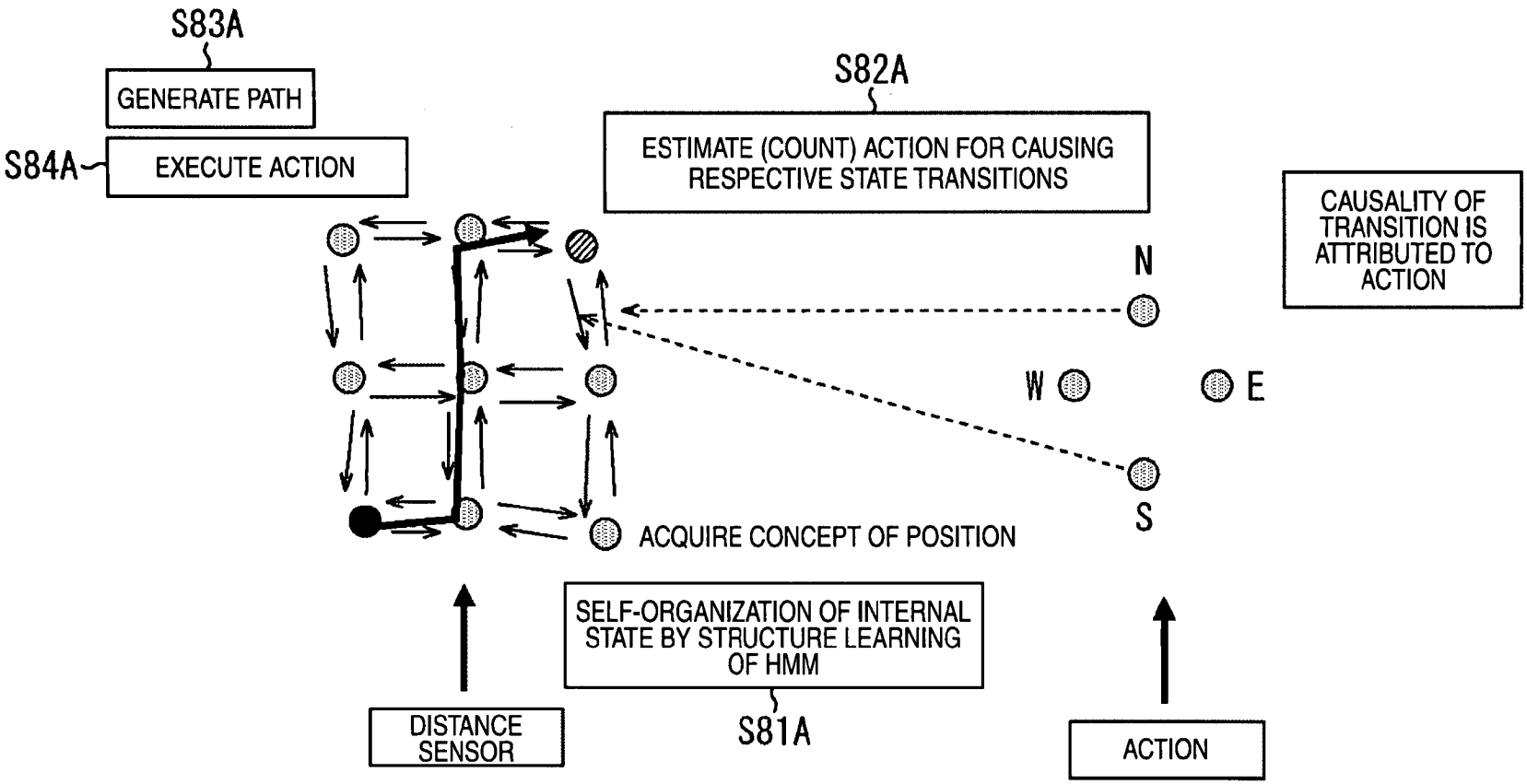
FIG. 20 is a diagram for explaining an overview of causality estimation.
Figure 24:
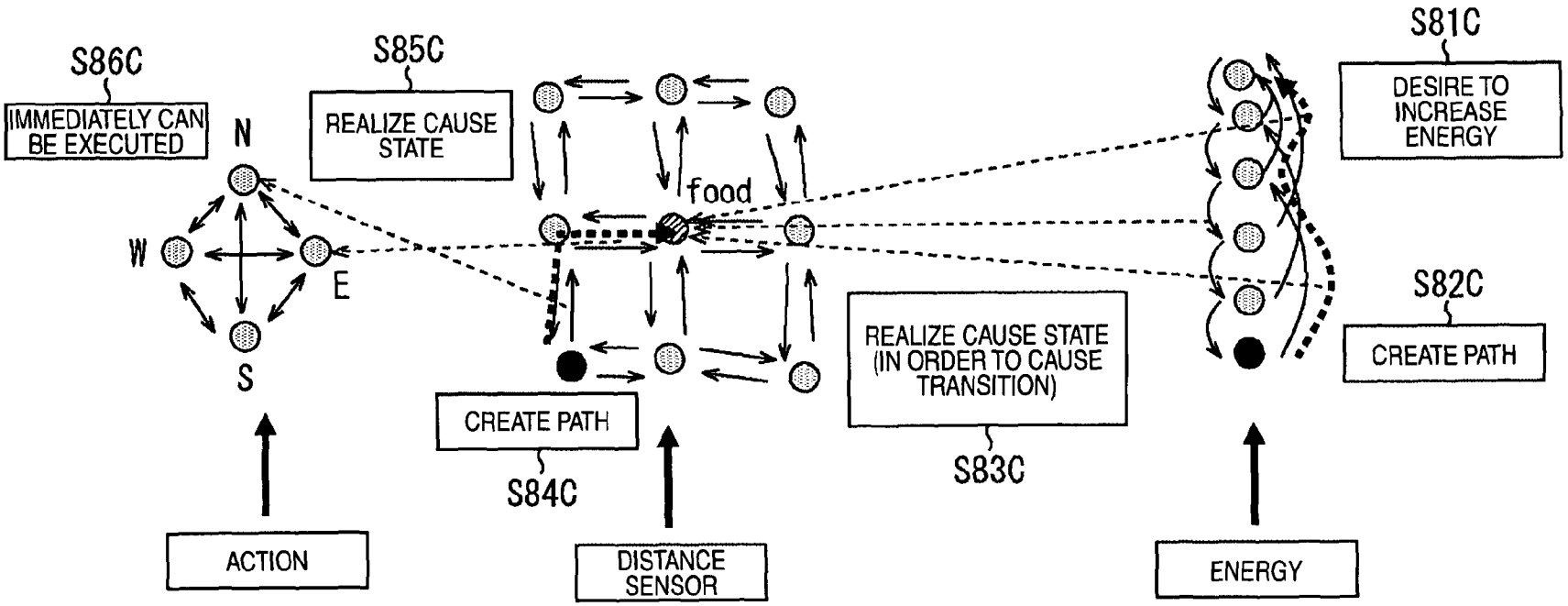
FIG. 24 is a diagram for explaining an example of multi-stage behavior control for causality in the multi-modal task.

In FIG. 20, movement of the moving robot 85 in the simulator shown in FIG. 16 is assumed as a task. Processing of the system shown in FIG. 15 in the case of one modal of only distance is shown in the figure. For convenience of explanation, in FIG. 20 (FIGS. 21 and 24 referred to later), as actions (behaviors) of the robot 85 (the agent), only moving actions in the four directions, E (east), W (west), S (south), and N (north), are adopted.

In this case, the system shown in FIG. 15 executes steps S81A to S84A explained below. Step S81A is processing of self-organization of an internal state by structure learning of an HMM for distance. Step S82A is processing of estimating, i.e., counting actions that cause respective state transitions. Step S83A is processing of generating a path. Step S84A is execution processing for an action.

Figure 21:
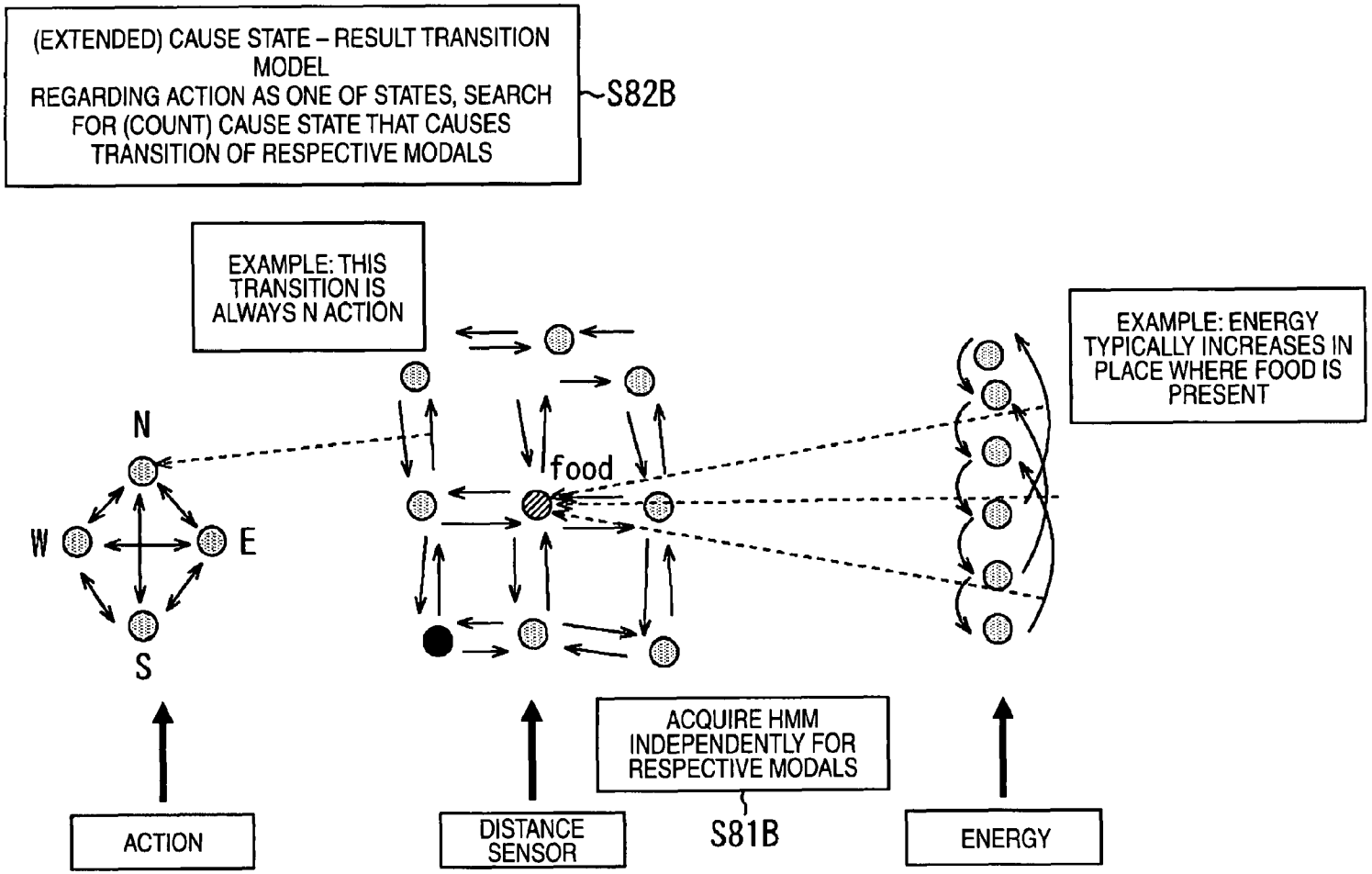
FIG. 21 is a diagram for explaining an overview of causality estimation.

On the other hand, in FIG. 21, although a task is the same as that shown in FIG. 20, a modal indicates processing of the system shown in FIG. 15 at the time when energy is also present in addition to distance. As explained above, in step S81B, the system shown in FIG. 15 acquires HMMs independently for respective modals. In an example shown in FIG. 21, an HMM for distance and an HMM for energy are acquired. Subsequently, in step S82B, the system shown in FIG. 15 generates a "(extended) cause state—result transition model" shown in FIG. 21. The system shown in FIG. 15 searches for (counts), assuming that an action is one of states (an action state), a cause state that causes transitions of respective modals. For example, as shown in FIG. 21, in specific transition on the HMM for distance, when the system is typically in an action state to the north (N), the action state is counted. For example, in the HMM for energy, when energy typically increases in a location where food is present, a state of the food in the HMM for distance is counted.

When the causality table is stored in the causality-table storing unit 76 in this way, the system shown in FIG. 15 can finish the learning at that stage, set an arbitrary target in the internal state formed by the system itself, and perform a behavior for realizing attainment of the target.

Therefore, the system shown in FIG. 15 sets up a plan (planning) for realizing the attainment of the target. Such processing for setting up a plan is planning processing. However, this planning processing is different from the planning processing executed in step S4 of the control processing for the simple pendulum task shown in FIG. 5. Therefore, in the following explanation, planning processing performed in a multi-modal task is specifically referred to as multi-stage planning processing.

The system shown in FIG. 15 executes behavior control processing according to a result of the multi-stage planning processing. However, this behavior control processing is different from the behavior control processing executed in step S5 of the control processing for the simple pendulum task shown in FIG. 5. Therefore, behavior control processing performed in a multi-modal task is specifically referred to as multi-stage behavior control processing.

The following explanation indicates that, concerning an HMM for multi-modal, an arbitrary state can be controlled as a target, i.e., multi-stage behavior control processing can be performed.

In the multi-stage planning processing, as in the case of the simple pendulum task, the planning unit 74K of the modeling unit 62K (K is any one of A to C) sets, as a goal, a target designated from the outside or endogenously obtained in the system. However, a predetermined state (node) in a predetermined modal is set as the goal. In other words, a goal modal and a goal state are set.

Thereafter, the modeling unit 62K executes, for example, planning processing conforming to the flowchart of FIG. 13. Consequently, a path from a present state node (a start node) to a goal node in the modal K is generated.

Figure 22:
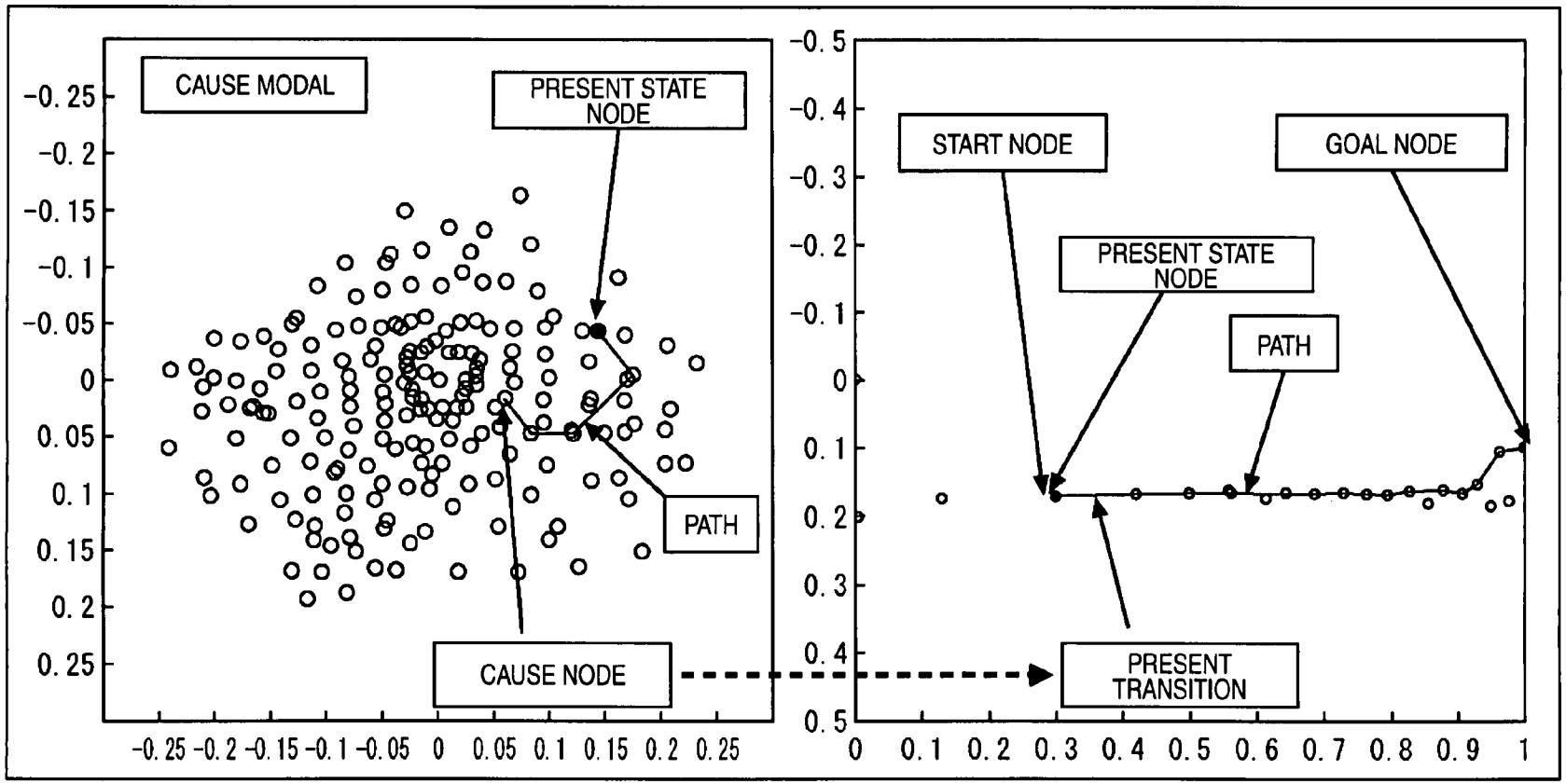
FIG. 22 is a diagram for explaining an example of multi-stage behavior control in the multi-modal task.

For example, the planning unit 74C executes the planning processing for the modal C for energy, a path shown on the right side of FIG. 22 is set.

Consequently, the behavior control unit 64 can execute multi-stage behavior control processing explained below.

The execution managing unit 78 of the behavior control unit 64 acquires, from the causality estimating unit 77 of the causality unit 63, cause modals and cause nodes allocated to respective transitions on the path from the start node to the goal node. When the causality estimating unit 77 receives notification of predetermined transition from the execution managing unit 78, the causality estimating unit 77 finds and extracts a cause modal and a cause node allocated to the predetermined transition from the causality-table storing unit 76 and provides the execution managing unit 78 with the cause modal and the cause node.

When the acquired cause modal is an action modal, the execution managing unit 78 can acquire a command corresponding to the cause node from the controller unit 79 and provide the action unit 65 with the command. Therefore, in this case, the execution managing unit 78 only has to execute behavior control processing conforming to the flowchart of FIG. 14.

On the other hand, when the cause modal is not an action modal, it is necessary to transition a present state of the cause modal to the cause node. For example, in an example shown in FIG. 22, the cause modal is the modal B for light. As shown on the left side of FIG. 22, it is necessary to transition the present state from the present state node to the cause node. Therefore, when the cause modal is a modal L (L is any one of A to C), the execution managing unit 78 requests a modeling unit 62L for the cause modal L to perform planning processing. The planning unit 74L of the modeling unit 62L executes planning processing for the present state node to the cause node and notifies the execution managing unit 78 of a result of the execution, i.e., a path. For example, in the example shown in FIG. 22, the planning unit 74B of the modeling unit 62B for the modal B for light executes the planning processing for the present state node to the cause node as shown on the left side of FIG. 22 and notifies the execution managing unit 78 of a result of the execution, i.e., a path.

The execution managing unit 78 acquires, from the causality estimating unit 77 of the causality unit 63, cause modals and cause nodes allocated to respective transitions on the notified path.

The execution managing unit 78 recursively invokes the cause modals and the cause nodes in this way. At a stage when the execution managing unit 78 reaches an action modal that the agent can directly output, the execution managing unit 78 determines an action (a command) at that time and provides the action unit 65 with the action.

Thereafter, at a stage when the execution managing unit 78 reaches the cause node through such a procedure of the behavior control processing, the execution managing unit 78 returns to the original modal and executes the behavior control processing in the modal. In the example shown in FIG. 22, at a stage when the execution managing unit 78 reaches a cause node on the left side of FIG. 22, i.e., a cause node on the HMM for the modal B for light as a cause nodal, as indicated by a dotted line, the execution managing unit 78 returns to the modal C for energy on the right side of FIG. 22. Transition of the present state node on the HMM occurs. At a stage when the execution managing unit 78 can finally reach a goal node given first (in the example shown in FIG. 22, a goal node on the HMM for energy on the right), the target is attained.

In some case, rather than one cause modal and one cause node, plural cause modals and cause nodes are present as in a large number of problems in the real world. For example, in the example shown in FIG. 16, since plural light sources (three points 87) are present on the maze, any one of the light sources may be a cause. Since energy can be sufficiently obtained around light, any one of nodes near the light may be a cause. In such a case, the system shown in FIG. 15 selects a path to which the system shown in FIG. 15 reaches first in setting up a plan for a cause node. In this way, the system shown in FIG. 15 can select an appropriate cause node and the path. Specifically, first, the system shown in FIG. 15 selects one of cause modals. Subsequently, the system shown in FIG. 15 sets all cause nodes to be candidates in the cause modal as goal nodes and plans paths from the present state node to the goal nodes. This planning is basically realized by execution of the planning processing shown in FIG. 13. However, in the goal node reaching determination processing in step S45, the determination is applied to all goal nodes. With this method, it is possible to select a goal node reached first and a path to the goal node.

The causal estimation is explained in detail below with reference to a specific task example First, as shown in FIG. 19, when a certain state on the HMM for distance is designated as a coal node, it is highly likely that this means for this agent (the system shown in FIG. 15) that the agent moves to a specific location on the simulator shown in FIG. 16. In that case, it is highly likely that a change in a location is caused by an action of the agent. Therefore, under the path shown in FIG. 19, the respective transitions are associated with a moving action corresponding to a direction of a node. In other words, causality of the transitions can be attributed to an action.

Figure 23:
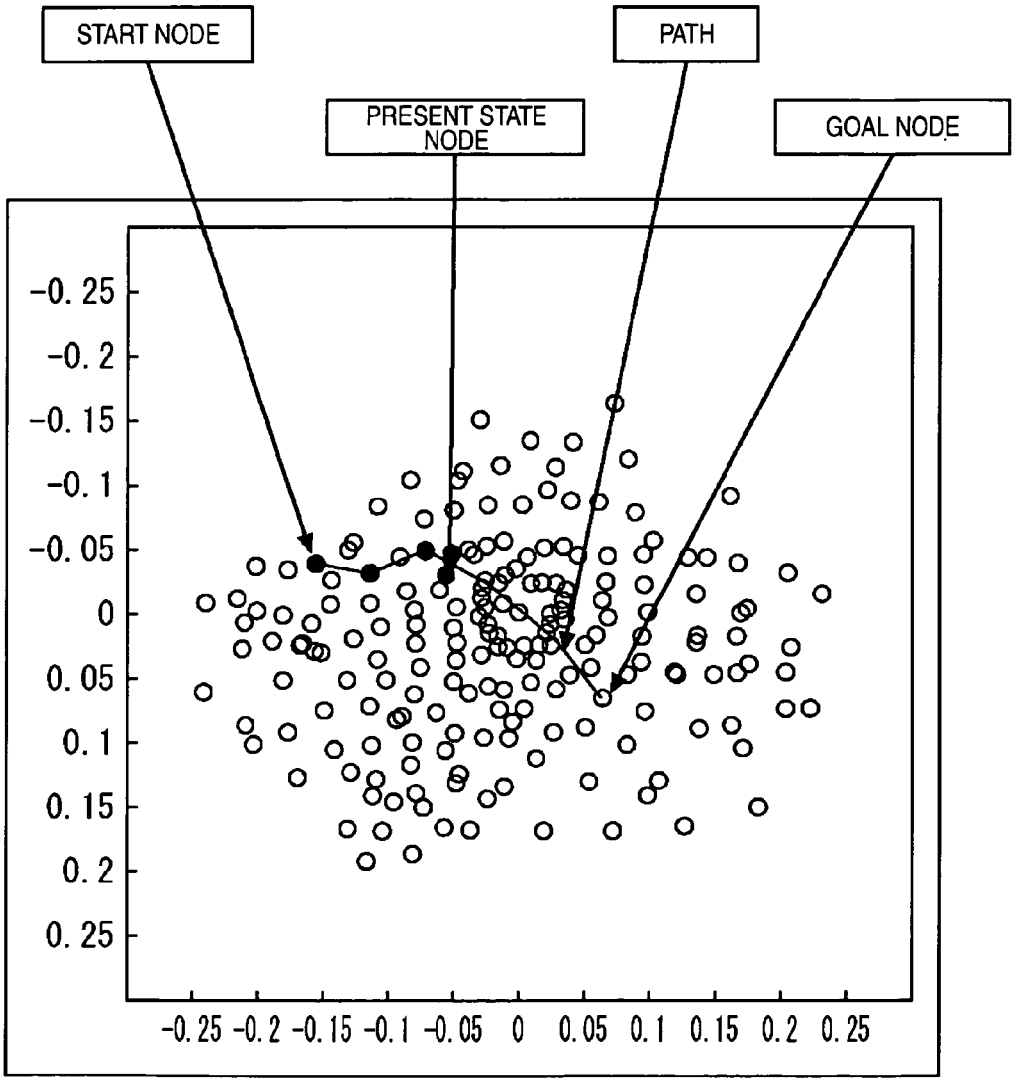
FIG. 23 is a diagram for explaining an example of a path and control of an HMM for light.

As shown in FIG. 23, a state near a certain light source (in the example shown in FIG. 16, the point 87) on the HMM for light is set as a goal. In this case, when the system shown in FIG. 15 performs path search (planning processing), if a present state node is near light and brightness is sensed, it is known in which direction brightness of the light changes. Therefore, transition to nodes around the light is associated with an action as in the case of the HMM for distance. However, if a present position is in a state in which light is unseen, it is unknown for the robot 85 as the agent in which direction the robot 85 should move to see the light.

It is assumed that, when a path is created on the HMM for light, a path approaching light from an S (south) side of the light is formed. Since the three light sources (the points 87) are placed on the simulator shown in FIG. 16, as possibility, three locations are present as locations on the S (south) side of the light to which the robot 85 can move from a location where the robot 85 may be unable to see the light. If causality estimation is performed well, transition on the HMM for light from a node unseen from the robot 85 to a node on an S (south) end side of the light source (in the example shown in FIG. 16, any one of the three points 87) has a high correlation with each of nodes at a south end of the three light sources (in the example shown in FIG. 16, the three points 87) on the HMM for distance. Therefore, the system shown in FIG. 15 sets the nodes on the south end side as cause nodes, respectively, as explained above, executes the planning processing for the HMM for distance, and executes the control processing. In this way, transition occurs in the HMM for light. In executing the planning processing when the plural nodes are present in this way, in step S45 of FIG. 13, the system shown in FIG. 15 can calculate, simply by checking reaching conditions for the plural goal nodes, a path that can reach the plural goal nodes first.

Consequently, first, the robot 85 as the agent can calculate path to an outer edge of light on the HMM for distance and move to a nearest light source (in the example shown in FIG. 16, the point 87). When the robot 85 enters an irradiation range of the light source, the robot 85 can move to a position relative to the light as a target of transition in the HMM for light.

Arbitrary control of a state of the HMM for energy is discussed below. The HMM for energy is not directly related to an action concerning any transition. If the causality estimation is performed well, transition in a direction in which energy rises has high causality with nodes near the light sources (in the example shown in FIG. 16, the points 87) represented by the HMM for light and nodes near positions of the light sources (in the example shown in FIG. 16, the points 87) represented in the HMM for distance. Since there are three light sources, whereas causality is divided into three on the HMM for distance, representation is the same for all lights in the HMM for light. Therefore, the transition has high causality to nodes on the HMM for light.

Therefore, for example, when the causality estimation shown in FIG. 21 explained above is performed, processing shown in FIG. 24 can be executed. In step S81C, a target for increasing energy is given. Then, in step S82C, first, the system shown in FIG. 15 creates a path through which energy sequentially rises in the HMM for energy.

The system shown in FIG. 15 generates, on the basis of causality of transition on the HMM for energy, a path that approaches the light source (in the example shown in FIG. 16, the points 87) on the HMM for light. If necessary, the system shown in FIG. 15 creates a path approaching a nearest light source (in the example shown in FIG. 16, the point 87) using the representation of the HMM for distance even in a place where the light sources (in the example shown in FIG. 16, the points 87) are unseen for the robot 85 as the agent. In other words, processing in steps S83C and S84C explained below is executed. Step S83C is processing for realizing a cause state (in order to cause transition). Step S84C is processing for creating a path.

The system shown in FIG. 15 can perform, on the basis of this path, a behavior for approaching light from a distance and staying in a place near the light until energy reaches a target state. In other words, processing in steps S85C and S86C explained below is executed. Step S85C is processing for realizing a cause state. Step S86C is preparation processing that can be immediately executed. Conversely, when a problem of how to reduce energy is set, the system only has to perform a behavior for moving away from the light sources (in the example shown in FIG. 16, the points 87) and staying in a place away from the light sources.

As explained above, the system shown in FIG. 15 can reduce various problems to the problems of the state transition for each of independent modals (events) and the path control for the state transition, deduce causality among the modals, and recursively control the causality. As a result, it is possible to treat a complicated problem of performance control without relying on premise knowledge for a task.

The series of processing explained above can be executed by hardware or can be executed by software.

Figure 25:
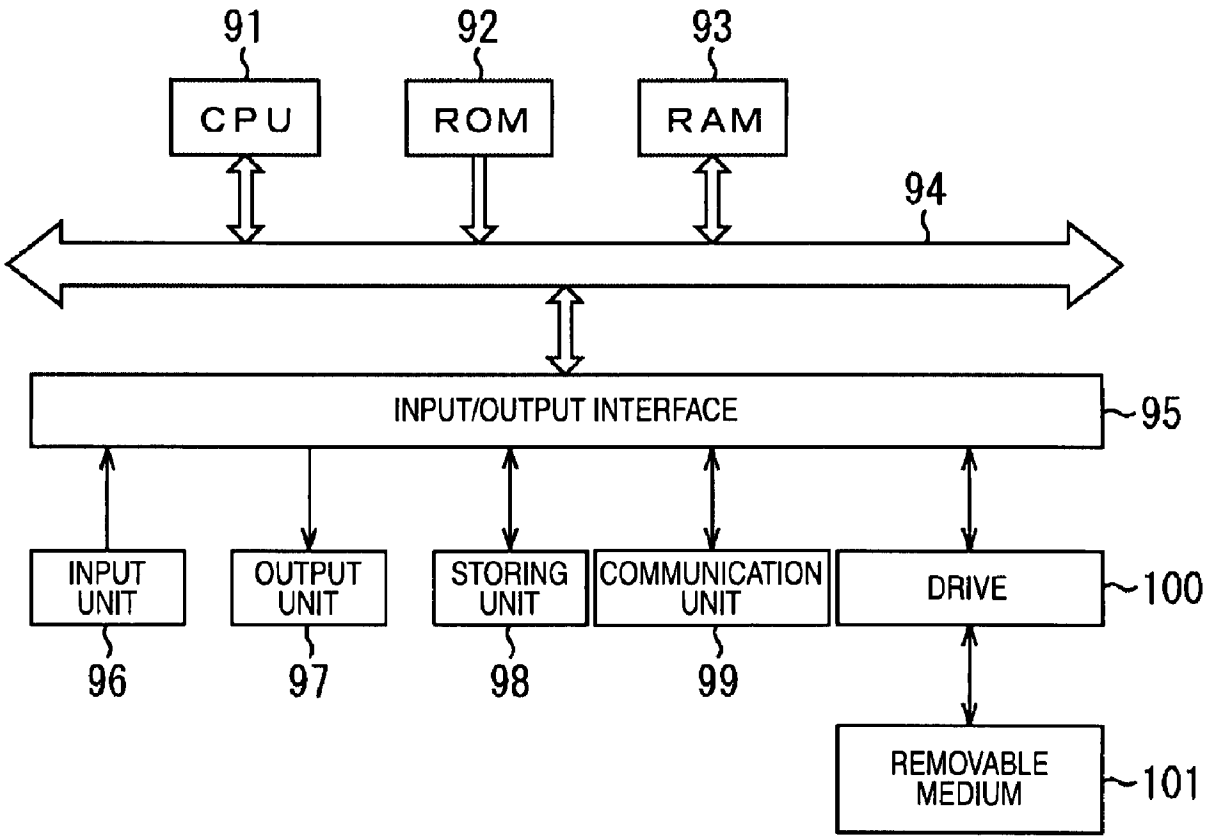
FIG. 25 is a block diagram of a configuration example of a personal computer as an information processing apparatus according to an embodiment of the present invention.

In this case, for example, a personal computer shown in FIG. 25 may be used as at least a part of the system explained above.

In FIG. 25, a CPU (Central Processing Unit) 91 executes various kinds of processing according to programs recorded in a ROM (Read Only Memory) 92 or programs loaded from a storing unit 98 to a RAM (Random Access Memory) 93. Data and the like necessary for the CPU 91 to execute the various kinds of processing are also stored in the RAM 93 as appropriate.

The CPU 91, the ROM 92, and the RAM 93 are connected to one another via a bus 94. An input and output interface 95 is also connected to the bus 94.

An input unit 96 including a keyboard and a mouse, an output unit 97 including a display, the storing unit 98 including a hard disk, and a communication unit 99 including a modem and a terminal adapter are connected to the input and output interface 95. The communication unit 99 controls communication performed with other apparatuses (not shown) via a network including the Internet.

A drive 100 is also connected to the input and output interface 95 according to necessity. A removable medium 101 including a magnetic disk, an optical disk, a magneto-optical disk, or a semiconductor memory is inserted in the drive 100 as appropriate. A computer program read out from the removable medium 101 is installed in the storing unit 98 according to necessity.

When the series of processing is executed by software, a program forming the software is installed in, from a network or a recording medium, a computer incorporated in dedicated software, a general-purpose personal computer that can execute various functions by installing various programs, or the like.

As shown in FIG. 25, the storing medium including such programs is configured by a removable medium 101 distributed to provide a user with the programs separately from an apparatus main body. The removable medium 101 includes a magnetic disk (including a floppy disk), an optical disk (including a CD-ROM (Compact Disk-Read Only Memory), or a DVD (Digital Versatile Disk) in which the programs are recorded or includes a semiconductor memory or the like. Further, the storing medium is configured by the ROM 92 in which the programs are recorded, a hard disk included in the storing unit 98, and the like, which are provided to the user in a state in which the devices are incorporated in the apparatus main body in advance.

Figure 26:
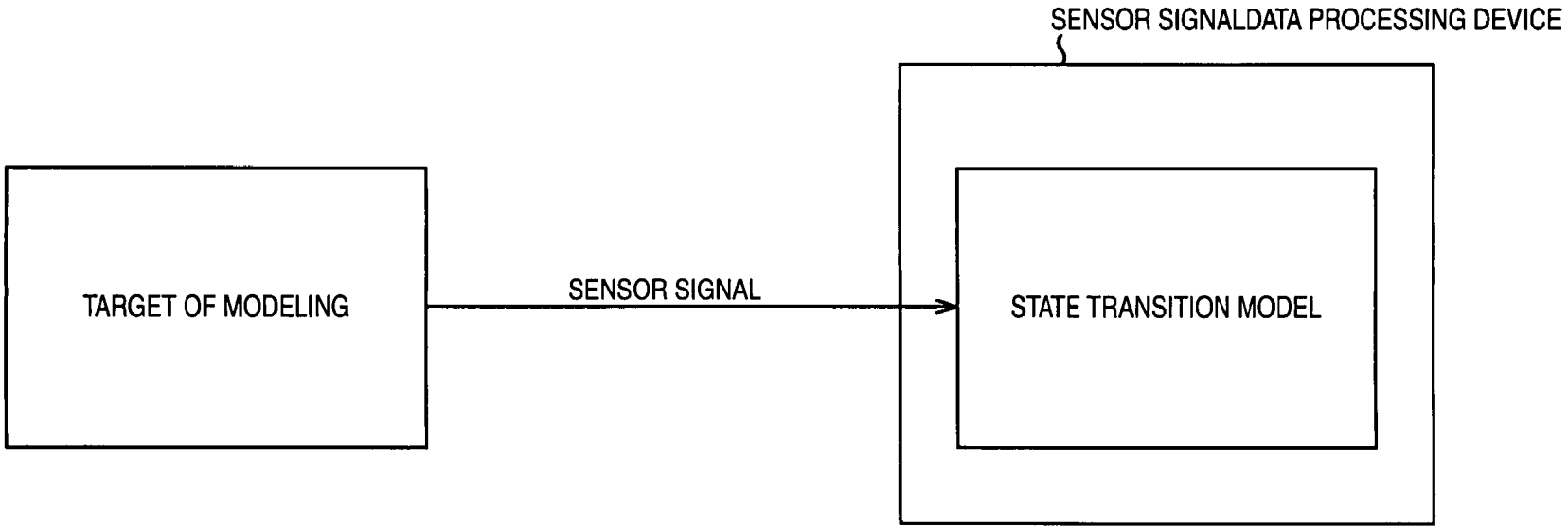
FIG. 26 is a diagram for explaining an overview of a configuration example of a data processing apparatus according to an embodiment of the present invention.

FIG. 26 is a diagram for explaining an overview of a configuration example of a data processing apparatus according to an embodiment of the present invention.

In FIG. 26, the data processing apparatus stores a state transition model having a state and state transition. The data processing apparatus is a type of a learning apparatus that performs learning for modeling a modeling target according to the state transition model, i.e., a learning apparatus that learns, on the basis of a sensor signal observed from the modeling target, a state transition model for giving probabilistic and statistical dynamic characteristics. The data processing apparatus can be applied to the learning unit 31.

A sensor signal obtained by sensing the modeling target is observed from the modeling target, for example, in time series.

The data processing apparatus performs, using a sensor signal observed from the modeling target, learning of a state transition model, i.e., estimation of parameters of the state transition model and determination of structure of the state transition model.

As the state transition model, for example, an HMM, a Bayesian network, a POMDP (Partially Observable Markov Decision Process) and the like can be adopted. In the following explanation, for example, an HMM is adopted as the state transition model.

Figure 27:
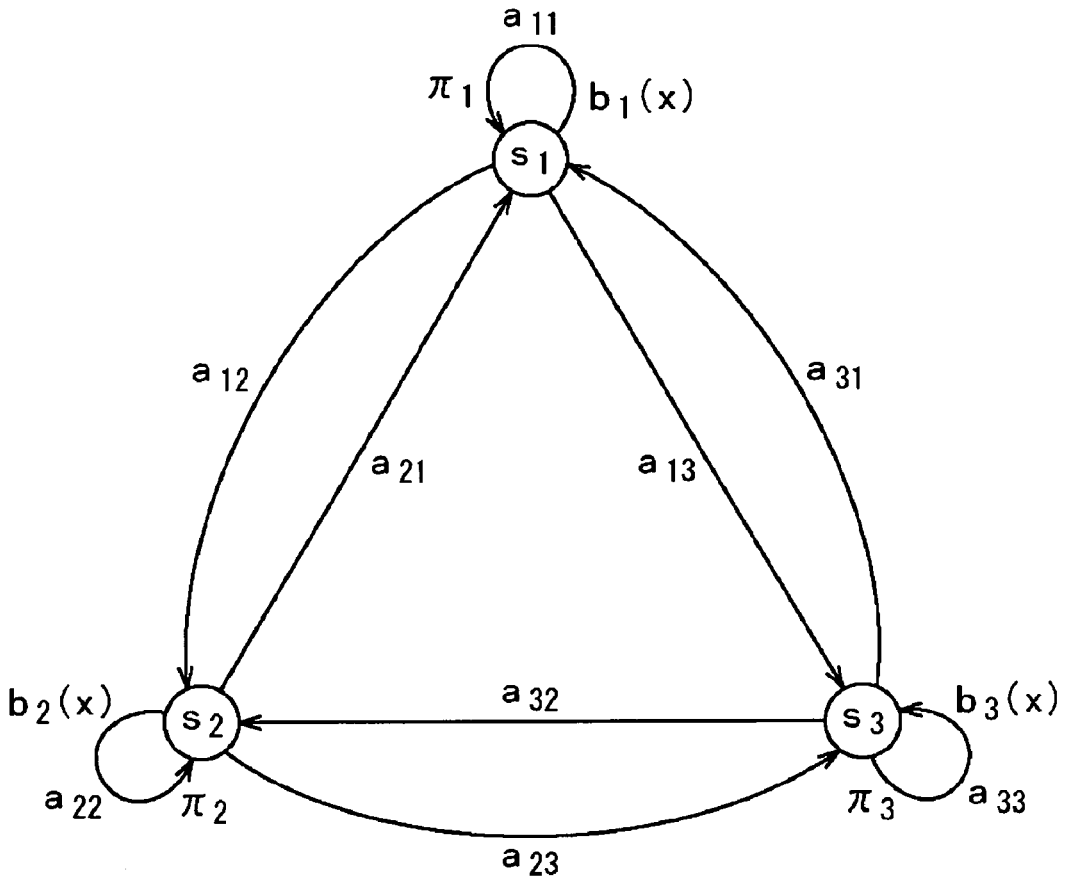
FIG. 27 is a diagram of an example of an Ergodic HMM.

FIG. 27 is a diagram of an example of the HMM.

The HMM is a state transition model having states and an inter-state transition.

In FIG. 27, an example of an HMM in three states is shown.

In FIG. 27, circles represent states and arrows represent state transitions (the same holds true in the following figures).

In FIG. 27, $s_i$ (in FIG. 27, i=1, 2, 3) represents a state and $a_{ij}$ represents a state transition probability from a state $s_i$ to a state $s_j$. Further, $b_j(x)$ represents an output probability density function with which an observation value x is observed during state transition to the state $s_j$. $\pi i$ represents an initial probability of the state $s_i$ being in an initial state.

As the output probability density function $b_j(x)$, for example, a mixed normal probability distribution is used.

An HMM (a continuous HMM) is defined by the state transition probability $a_{ij}$, the output probability density function $b_j(x)$, and the initial probability $\pi_i$. The state transition probability $a_{ij}$, the output probability density function $b_j(x)$, and the initial probability $\pi_i$ are referred to as parameters $\lambda$ for the HMM=$\{a_{ij}, b_j(x), \pi i, i=1, 2, \ldots, N, j=1, 2, \ldots, N\}$. N represents the number of states of the HMM.

As a method of estimating the parameters $\lambda$ of the HMM, as explained above, a Baum-Welch re-estimation method is widely used. The Baum-Welch re-estimation method is a method of estimating parameters based on an EM (Expectation-Maximization) algorithm.

With the Baum-Welch re-estimation method, estimation of the parameters $\lambda$ of the HMM is performed on the basis of observed time series data $x=x_1, x_2, \ldots, x_T$ such that likelihood calculated from an occurrence probability, which is a probability that the time series data is observed (caused), is maximized.

$x_t$ represents a signal (a sample value) observed at time t. T represents the length of the time series data (the number of samples).

The Baum-Welch re-estimation method is a parameter estimating method based on likelihood maximization. However, optimality is not guaranteed. An HMM may converge into a local solution depending on the structure of the HMM or initial values of the parameters $\lambda$. Details of the HMM and the Baum-Welch re-estimation method are described in, for example, Laurence Rabiner and Biing-Hwang Juang, "Basics of Sound Recognition (two volumes)", NTT Advanced Technology Corporation (hereinafter also referred to as document A).

HMMs are widely used in sound recognition. However, in the HMMs used for sound recognition, in general, the number of states, a method of state transition, and the like are determined in advance.

Figure 28:
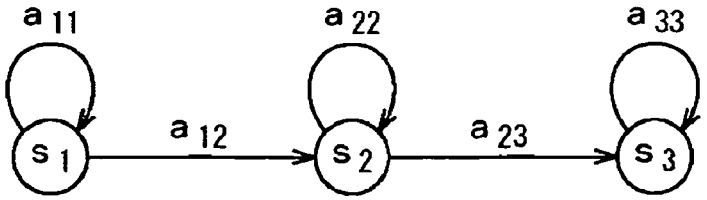
FIG. 28 is a diagram of an HMM of a left-to-right type.

FIG. 28 is a diagram of an example of an HMM used in sound recognition.

The HMM shown in FIG. 28 is called left-to-right type.

In FIG. 28, the number of states is three. State transition is limited to structure for allowing only self-transition (state transition from the state $s_i$ to the state $s_i$) and state transition from the left to a state on the right.

As opposed to an HMM with limitation on state transition like the HMM shown in FIG. 28, the HMM without limitation on state transition shown in FIG. 27, i.e., an HMM that allows state transition from an arbitrary state $s_i$ to an arbitrary state $s_j$ is called Ergodic HMM.

The Ergodic HMM is an HMM with a highest degree of freedom in terms of structure. However, when the number of states is large, it is difficult to estimate the parameters $\lambda$.

For example, when the number of states of the Ergodic HMM is 1000, the number of state transitions is one million (=1000×1000).

Therefore, in this case, for example, concerning the state transition probability aij of the parameters $\lambda$, it is necessary to estimate one million state transition probabilities aij.

Limited state transitions may be sufficient as necessary state transitions depending on a modeling target. However, when it is not known in advance how state transitions should be limited, it is extremely difficult to appropriately estimate such an enormous number of parameters $\lambda$. When an appropriate number of states is not known in advance and information for determining the structure of an HMM is not known in advance either, it is more difficult to calculate appropriate parameters $\lambda$.

The data processing apparatus shown in FIG. 26 determines the structure of an HMM appropriate for a modeling target and performs learning for estimating parameters λ of the HMM even if limitation is not given in advance concerning the structure of the HMM, i.e., the number of states of the HMM and state transitions.

Figure 29:
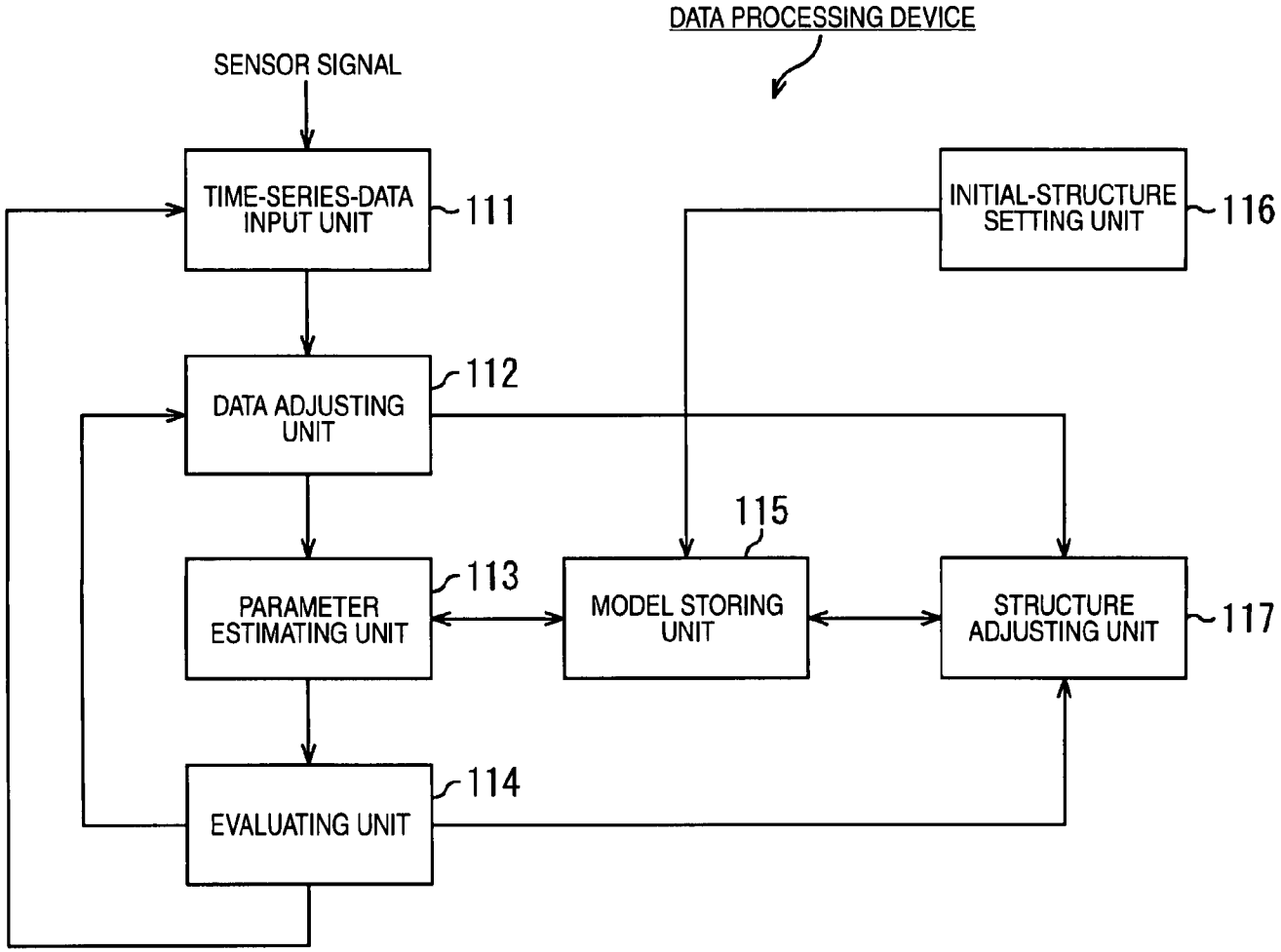
FIG. 29 is a block diagram of a detailed configuration example of the data processing apparatus.

FIG. 29 is a block diagram of a configuration example of the data processing apparatus shown in FIG. 26.

In FIG. 29, the data processing apparatus includes a time-series-data input unit 111, a data adjusting unit 112, a parameter estimating unit 113, an evaluating unit 114, a model storing unit 115, an initial-structure setting unit 116, and a structure adjusting unit 117.

A sensor signal observed from a modeling target is inputted to the time-series-data input unit 111. The time-series-data input unit 111 outputs, on the basis of the sensor signal observed from the modeling target, time series data observed from the modeling target (hereinafter also referred to as observed time series data) $x=x_1, x_2, \ldots, x_T$ to the data adjusting unit 112.

The time-series-data input unit 111 directly supplies, for example, a sensor signal in time series observed from the modeling target to the data adjusting unit 112 as observed time series data x.

The time-series-data input unit 111 supplies the observed time series data x to the data adjusting unit 112 in response to a request from the evaluating unit 114.

The data adjusting unit 112 adjusts, according to progress of learning of an HMM stored in the model storing unit 115 explained later, time series data used for the learning of the HMM, i.e., the observed time series data x supplied from the time-series-data input unit 111 and outputs time series data after the adjustment (hereinafter also referred to as adjusted time series data) $x'=x_1', x_2', \ldots, x_T'$.

The data adjusting unit 112 applies, for example, processing for down-sampling (down-sampling processing) to the observed time series data $x=x_1, x_2, \ldots, x_T$ supplied from the time-series-data input unit 111 and outputs the adjusted time series data $x'=x_1', x_2', \ldots, x_T'$ obtained by the down-sampling processing.

For example, when the observed time series data x is time series data sampled at 1000 Hz, the data adjusting time 112 converts, with the down-sampling processing, the observed time series data x sampled at 1000 Hz into the adjusted time series data x' sampled at 100 Hz.

With the down-sampling processing, high-frequency components included in the observed time series data x are removed. The adjusted time series data x' is changed to time series data including only macro characteristics of the observed time series data x, i.e., low frequency components of the observed time series data x.

Learning of the HMM as the state transition model stored in the model storing unit 115 is performed by using such adjusted time series data x' including only the macro characteristics of the observed time series data x. Consequently, in the HMM, the macro characteristics of the observed time series data x are acquired.

In the data adjusting unit 112, it is an important problem in performing learning for appropriately acquire characteristics of the observed time series data x to determine how the observed time series data x should be adjusted, i.e., in the present case, into the adjusted time series data x' of which sampling frequency the observed time series data x should be converted.

As explained above, the data adjusting unit 112 adjusts the observed time series data x according to progress of learning of an HMM. The adjustment is performed such that, as the learning of the HMM progresses, the adjusted time series data x' changes from time series data including only macro characteristics of the observed time series data x to time series data including micro characteristics, i.e., high-frequency components of the observed time series data x as well.

For example, the data adjusting unit 112 gradually changes a sampling frequency of the adjusted time series data x' from a small value to a large value as the learning of the HMM progresses.

Specifically, for example, in an initial period of learning, the data adjusting unit 112 sets the sampling frequency of the adjusted time series data x' to 10 Hz. Thereafter, as the learning progresses, the data adjusting unit 112 sequentially changes the sampling frequency of the adjusted time series data x' to 50 Hz, 100 Hz, 500 Hz, and 1000 Hz.

In this case, the HMM acquires the macro characteristics of the observed time series data x in the initial period of the learning and acquires the micro characteristics of the observed time series data x as the learning progresses.

Progress state information indicating a state of the progress of the learning is supplied to the data adjusting unit 112 from the evaluating unit 114. The data adjusting unit 112 recognizes the state of the progress of the learning on the basis of the progress state information from the evaluating unit 114 and changes the sampling frequency of the adjusted time series data x'.

In the data adjusting unit 112, as processing for adjusting the observed time series data x from the adjusted time series data x' including the macro characteristics to the adjusted time series data x' including the micro characteristics according to the progress of the learning, filter bank processing can be adopted besides the down-sampling processing (processing for curtailing the observed time series data x in a time direction).

In the data adjusting unit 112, when the filter bank processing is adopted, the observed time series data x is filtered by using a predetermined division number of filter banks. Consequently, the observed time series data x is divided into the predetermined division number of frequency components. The predetermined division number of frequency components are outputted as the adjusted time series data x'.

In this case, in the data adjusting unit 112, the number of divisions of the filter banks is gradually changed to a larger number as the learning progresses.

As explained above, the data adjusting unit 112 adjusts the observed time series data x and outputs the adjusted time series data $x'=x_1', x_2', \ldots, x_{T'}'$. T' represents the length of the adjusted time series data x'.

The adjusted time series data x' outputted by the data adjusting unit 112 is supplied to the parameter estimating unit 113 and the structure adjusting unit 117.

The parameter estimating unit 113 estimates the parameters k of the HMM stored in the model storing unit 115 using the adjusted time series data x' supplied from the data adjusting unit 112.

The parameter estimating unit 113 estimates, for example, with the Baum-Welch re-estimation method, the parameters λ of the HMM stored in the model storing unit 115 using the adjusted time series data x' from the data adjusting unit 112.

The parameter estimating unit 113 supplies new parameters λ obtained by the estimation of the parameters k of the HMM to the model storing unit 115 and causes the model storing unit 115 to store the new parameters λ in a form of overwriting.

In estimating the parameters λ of the HMM, the parameter estimating unit 113 uses values stored in the model storing unit 115 as initial values of the parameters λ.

In the parameter estimating unit 113, when processing for estimating the new parameters λ is performed, the number of times of learning is counted once.

The parameter estimating unit 113 increments the number of times of learning by 1 every time the processing for estimating the new parameters λ is performed and supplies the number of times of learning to the evaluating unit 114.

Further, the parameter estimating unit 113 calculates, from the HMM defined by the new parameters λ, likelihood that the adjusted time series data x' supplied from the data adjusting unit 112 is observed and supplies the likelihood to the evaluating unit 114.

The likelihood supplied to the evaluating unit 114 by the parameter estimating unit 113 can be calculated by using the observed time series data x rather than the adjusted time series data x'.

The evaluating unit 114 evaluates, on the basis of the likelihood and the number of times of learning supplied from the parameter estimating unit 113, the learned HMM, i.e., the HMM, the parameters λ of which are estimated by the parameter estimating unit 113. The evaluating unit 114 determines, on the basis of a result of the evaluation of the HMM, whether the learning of the HMM should be finished.

For example, until the number of times of learning supplied from the parameter estimating unit 113 reaches a predetermined number of times, the evaluating unit 114 evaluates that the acquisition of characteristics (time series patterns) of the observed time series data x by the HMM is insufficient and determines to continue the learning of the HMM.

When the number of times of learning supplied from the parameter estimating unit 113 reaches the predetermined number of times, the evaluating unit 114 evaluates that the acquisition of characteristics of the observed time series data x by the HMM is sufficient and determines to finish the learning of the HMM.

Until the likelihood supplied from the parameter estimating unit 113 reaches a predetermined value, the evaluating unit 114 evaluates that the acquisition of characteristics (time series patterns) of the observed time series data x by the HMM is insufficient and determines to continue the learning of the HMM.

When the likelihood supplied from the parameter estimating unit 113 reaches the predetermined value, the evaluating unit 114 evaluates that the acquisition of characteristics of the observed time series data x by the HMM is sufficient and determines to finish the learning of the HMM.

When the evaluating unit 114 determines to continue the learning of the HMM, the evaluating unit 114 requests the time-series-data input unit 111, the data adjusting unit 112, and the structure adjusting unit 117 to perform predetermined processing.

The evaluating unit 114 requests the time-series-data input unit 111 to supply observed time series data.

Further, the evaluating unit 114 supplies the number of times of learning and the likelihood to the data adjusting unit 112 as progress state information representing a state of progress of the learning to request the data adjusting unit 112 to perform down-sampling processing corresponding to the progress of the learning.

The evaluating unit 114 requests, according to the progress of the learning, the structure adjusting unit 117 to adjust the structure of the HMM stored in the model storing unit 115.

The model storing unit 115 stores, for example, the HMM as the state transition model.

When new parameters of the HMM are supplied from the parameter estimating unit 113, the model storing unit 115 updates (overwrites) stored values (stored parameters of the HMM) with the new parameters.

Before the learning of the HMM is started, the model storing unit 115 stores the structure of the HMM initialized by the initial-structure setting unit 116 (initial structure), i.e., initial values of parameters of the HMM determined on the basis of limitation concerning the number of states and state transitions of the HMM.

The parameters of the HMM by the parameter estimating unit 113 are estimated from the initial values determined by the initial-structure setting unit 116.

The structure of the HMM stored in the model storing unit 115 is adjusted by the structure adjusting unit 117 according to the progress of the learning. The update of the stored values in the model storing unit 115 is also performed according to parameters of the HMM obtained by the adjustment of the structure of the HMM by the structure adjusting unit 117.

The initial-structure setting unit 116 initializes the structure of the HMM before the learning of the HMM is started and sets parameters of the HMM having the initialized structure (initial structure) (initial parameters).

The initial-structure setting unit 116 sets the initial structure of the HMM, i.e., the number of states and state transitions of the HMM.

Predetermined limitation can be applied to the number of states and the state transitions of the HMM as the initial structure.

For example, the initial-structure setting unit 116 sets the number of states of the HMM to be equal to or smaller than a predetermined number set as the predetermined limitation.

Specifically, for example, the initial-structure setting unit 116 sets the number of states of the HMM to a relatively small number such as sixteen or one hundred.

Further, the initial-structure setting unit 116 appropriately arranges states in the number of states set as the initial structure in an L-dimensional space (L is a positive integer) equal to or larger than one dimension.

For example, when the number of states set as the initial structure is sixteen and the sixteen states are arranged in a two-dimensional space, the initial-structure setting unit 116 arranges the sixteen states in the two-dimensional space in, for example, a lattice shape.

Thereafter, the initial-structure setting unit 116 sets, with respect to the sixteen states arranged in the two-dimensional space, state transitions, i.e., self-transition and state transition to other states.

Predetermined limitations such as limitation that the structure should be sparse structure can be applied to the state transitions set with respect to the sixteen states.

The sparse structure is, rather than dense state transition structure like the Ergodic HMM in which state transition from an arbitrary state to an arbitrary state is possible, structure in which states to which state transition is possible from a certain state are extremely limited.

Even in the sparse structure, at least one state transition to other states is present and self-transition is present.

The initial-structure setting unit 116 obtains the initial structure by, for example, as explained above, applying the predetermined limitation to initialize the structure of the HMM into the sparse structure. Then, the initial-structure setting unit 116 sets initial parameters, i.e., initial values of the state transition probability $a_{ij}$, the output probability density function $b_j(x)$, and the initial probability $\pi_i$ in the HMM having the initial structure.

The initial-structure setting unit 116 sets, for example, with respect to each of the states, the state transition probability $a_{ij}$ of (valid) state transition, which is possible from the state, to a uniform value (when the number of possible state transitions is M, 1/M). The initial-structure setting unit 116 sets the state transition probability $a_{ij}$ of difficult state transition state, i.e., transition other than the state transition set as the sparse state transition to 0.

When, for example, a normal distribution is used as the output probability density function $b_j(x)$, the initial-structure setting unit 116 calculates, according to the following formula, an average μ and dispersion $\sigma^2$ of the observed time series data $x=x_1, x_2, \ldots, X_T$ obtained by the time-series-data input unit 111. The initial-structure setting unit 116 sets the normal distribution defined by the average μ and the dispersion $\sigma^2$ in the output probability density function $b_j(x)$ of the respective states $s_j$.

$$\mu=(1/T)\Sigma x_t$$

$$\sigma^2=(1/T)\Sigma(x_t-\mu)^2$$

In the above formula, Σ means summation with time t changed from 1 to length T of the observed time series data x.

Further, the initial-structure setting unit 116 sets initial probabilities $\pi_i$ of the respective states $s_i$ to a uniform value. When the number of states of the HMM having the initial structure is set to N, the initial-structure setting unit 116 sets the initial probabilities $\pi_i$ of the respective N states $s_i$ to 1/N.

The HMM with the initial structure and the initial parameters X={aij, bj(x), πi, i=1, 2, . . . , n, j=1, 2, . . . , N} set by the initial-structure setting unit 116 is supplied to and stored in the model storing unit 115. The (initial) structure and the (initial) parameters stored in the model storing unit 115 are updated by learning.

The structure-adjusting unit 117 adjusts, in response to a request from the evaluating unit 114, the structure of the HMM stored in the model storing unit 115 using the adjusted time series data x' supplied from the data adjusting unit 112. The adjustment of the structure of the HMM performed by the structure adjusting unit 117 includes adjustment of parameters of the HMM necessary for the adjustment of the structure.

As types of the adjustment of the structure of the HMM Performed by the structure adjusting unit 117, there are six types, i.e., division of a state, merging of a state, addition of a state, addition of state transition, deletion of a state, and deletion of state transition.

The processing by the initial-structure setting unit 116 shown in FIG. 29 is further explained with reference to FIGS. 30A and 30B.

The initial-structure setting unit 116 can set Ergodic structure as the initial structure of the HMM or can set sparse structure by applying predetermined limitation to the initial structure.

Figure 30B:
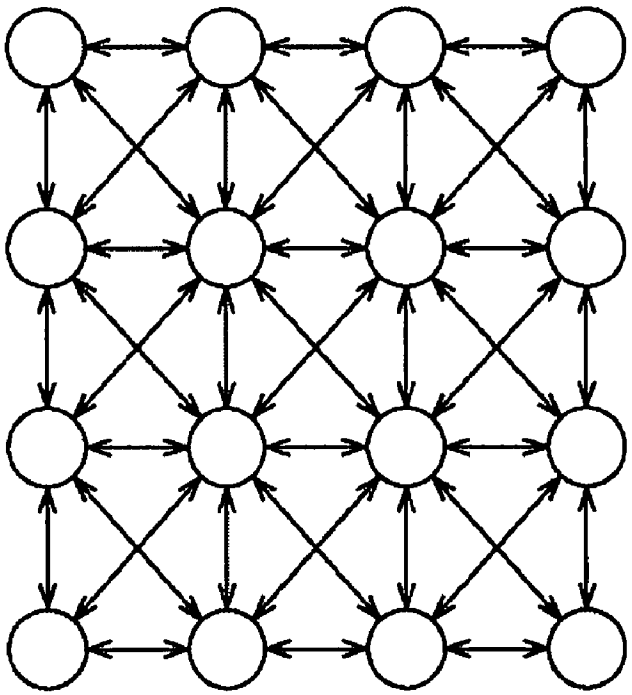
FIGS. 30A and 30B are diagrams of an example of an initial structure of an HMM set by an initial-structure setting unit 116.
Figure 30A:
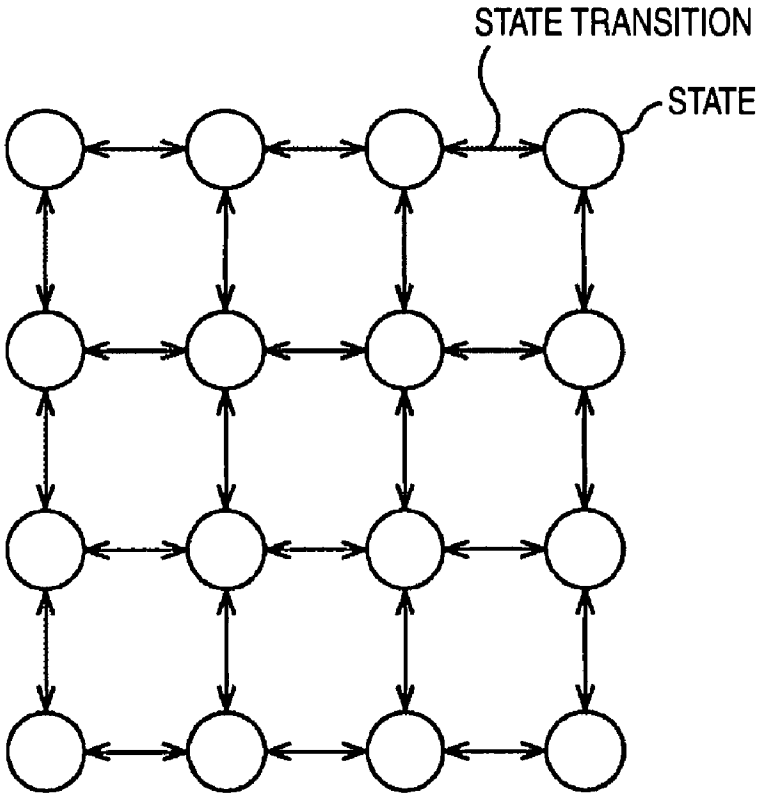

FIGS. 30A and 30B are diagrams of an HMM having sparse initial structure (state transitions).

In FIGS. 30A and 30B, circles represent states and arrows represent state transitions (the same holds true in the following figures). Further, in FIGS. 30A and 30B, a bidirectional arrow connecting two states represents state transition from one to the other of the two states and state transition from the other to one of the two states (the same holds true in the following figures). In FIGS. 30A and 30B, the respective states in which self-transition can be performed. An arrow representing the self-transition is not shown in the figures (the same holds true in the following figures).

In FIGS. 30A and 30B, sixteen states are arranged in a lattice shape on a two-dimensional space. In FIGS. 30A and 30B, four states are arranged in the horizontal direction and four states are also arranged in the vertical direction.

It is assumed that a distance between states adjacent to each other in the horizontal direction and a distance between states adjacent to each other in the vertical direction are 1. In FIG. 30A, limitation that state transitions to states with a distance equal to or smaller than 1 are allowed and state transitions to other states are not allowed is applied to the structure of the HMM.

In FIG. 30B, limitation that state transitions to states with a distance equal to or smaller than √2 are allowed and state transitions to other states are not allowed is applied to the structure of the HMM.

A method of setting the sparse initial structure is not limited to a method of applying limitation to states arranged on the L-dimensional space to allow only state transitions (including self-transition) to states located in the neighborhood according to a distance between states.

AS the method of setting the sparse initial state, besides the methods explained above, for example, it is possible to adopt a method of selecting, when attention is directed to a certain state, a random number of the states out of all the states and limiting state transitions to only state transitions (including self-transition) to the states selected at random.

As the method of setting the sparse initial structure, it is also possible to adopt the structures of the HMMs shown in FIGS. 10A to 10C. The HMM shown in FIG. 10A indicates an HMM by three-dimensional grid limitation. The HMM shown in FIG. 10B indicates an HMM by two-dimensional random arrangement limitation. The HMM shown in FIG. 10C indicates an HMM by a small world network.

Division of a state performed by the structure adjusting unit 117 as adjustment of the structure of an HMM is explained with reference to FIGS. 31A and 31B.

As explained above, in the figure, circles represent states. In the following explanation, circles affixed with a number "i" are described as state $s_i$.

Figure 31B:
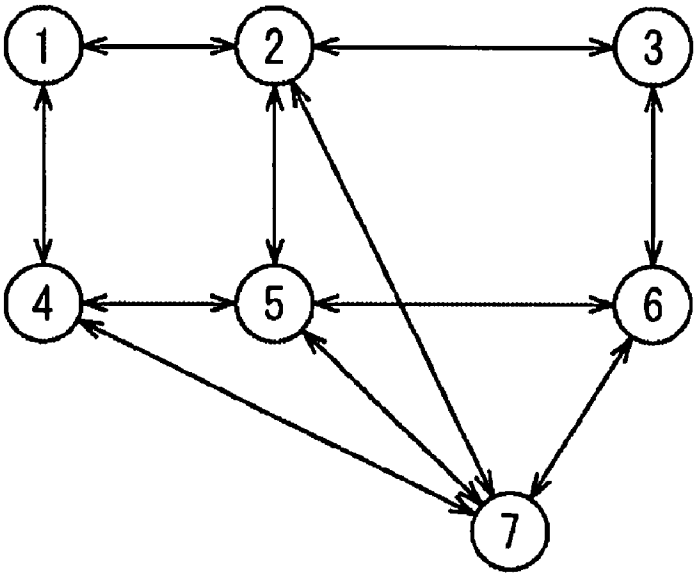
FIGS. 31A and 31B are diagrams for explaining division of a state.
Figure 31A:
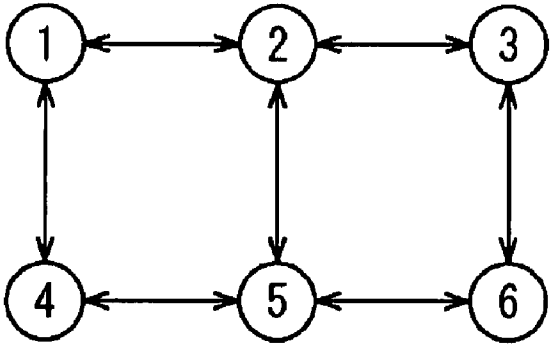

FIG. 31A is a diagram of an HMM before the division of a state is performed.

In FIG. 31A, the HMM has six states $s_1$, $s_2$, $s_3$, $s_4$, $s_5$, and $s_6$. Bidirectional state transitions between the states $s_1$ and $s_2$, between the states $s_1$ and $s_4$, between the states $s_2$ and $s_3$, between the states $s_2$ and $s_5$, between the states $s_3$ and $s_6$, between the states $s_4$ and $s_5$, and between the states $s_5$ and $s_6$ and self-transition are possible.

FIG. 31B is a diagram of an HMM after the division of a state is performed with the HMM shown in FIG. 31A set as a target.

The division of a state is performed in order to increase the size of the HMM.

In FIG. 31B, for example, the state $S_5$ is divided among the states $S_1$ to $S_6$ of the HMM shown in FIG. 31A.

The division of the state S5 is performed by adding a new state $s_7$, in which state transitions same as those for the state $s_5$ as a division target can be performed and bidirectional state transition to and from the state $s_5$ can be performed.

In FIG. 31A, in the state $s_5$, state transitions between the state $s_5$ and the states $s_2$, $s_4$, and $s_6$ and self-transition are possible. Therefore, the structure adjusting unit 117 sets, concerning the new state $s_7$, as in the state $s_5$, state transitions between the state $s_7$ and the states $s_2$, $s_4$, and $s_6$ and self-transition as valid (possible) state transitions.

Further, the structure adjusting unit 117 sets, concerning the new state $s_7$, state transition between the state $s_7$ and the state $s_5$ as valid state transition as well.

In the division of a state, for example, the structure adjusting unit 117 state sets parameters of the new state $s_7$ to, so to speak, succeed parameters of the division target state $s_5$.

The structure adjusting unit 117 sets initial probability $\pi_7$ state of the new state $s_7$ as initial probability $\pi_5$ of the division target state $s_5(\pi_7=\pi_5)$ and sets an output probability density function $b_7(x)$ of the new state $s_7$ as an output probability density function $b_5(x)$ of the division target state $s_5$ $(b_7(x)=b_5(x))$.

Further, the structure-adjusting unit 117 sets a state transition probability $a_{i7}$ of state transition from the state $s_i$ (in FIGS. 31A and 31B, i=1, 2, 3, 4, 6) to the new state $s_7$ as a state transition probability $a_{i5}$ from the state $s_i$ to the division target state 5 $(a_{i7}=a_{i5})$.

The structure adjusting unit 117 sets a state transition probability $a_{7i}$ of state transition from the new state $s_7$ to the state $s_i$ as a state transition probability $a_{5i}$ from the division target state $s_5$ to the state $s_i$ $(a_{7i}=a_{5i})$.

The structure adjusting unit 117 sets a state transition probability $a_{57}$ of state transition from the state $s_5$ as the division target to the new state $s_7$ and a state transition probability $a_{75}$ of state transition from the new state $s_7$ to the division target state $s_5$ to an appropriate value, for example, $a_{57}=a_{75}=0.5$.

Further, the structure adjusting unit 117 applies normalization processing to necessary parameters of the HMM after the division of a state and finishes processing for dividing a state.

The structure adjusting unit 117 applies normalization processing, which satisfies the following formula, to the initial probability $\pi_i$ and the state transition probability $a_{ij}$ of the HMM after the division of a state.

$$\Sigma\pi_j=1$$

$$\Sigma a_{ij}=1(i=1, 2, \ldots N)$$

In the above formula, Σ means summation with the variable "j" representing a state changed from 1 to the number of states N of the HMM after the division of a state. In FIGS. 31A and 31B, the number of states N of the HMM after the division of a state is seven.

As a method of the normalization processing, which satisfies the above formula, for example, there is a method of dividing the initial probability $\pi_j$ before the normalization processing by a sum $\Sigma\pi_j=\pi_1+\pi_2+\ldots+\pi_N$ of the initial probability $\pi_j$ before the normalization processing. The same holds true for normalization processing for the state transition probability $a_{ij}$.

In the division of a state, a state as a division target is not limited to one state.

As the state as the division target, a predetermined number "n" of states (n is equal to or larger than 1 and equal to or smaller than N) can be selected, for example, at random out of N states $s_1$ to $S_N$ of the HMM before the division of a state.

As the division target state, for example, higher order "n" states having large dispersion $\sigma^2$ defining the output probability density function $b_j(x)$, i.e., higher order "n" states with relatively large fluctuation in an observation value observed from the states can be selected out of the N states $s_1$ to $S_N$ of the HMM before the division of a state.

The number "n" of states as division targets can be set at random or can be set to a fixed value. In both the cases, by the division of a state, the structure of the HMM is updated to a structure in which the number of states increase by "n" from the number of states before the division.

Merging of a state performed by the structure adjusting unit 117 as adjustment of the structure of the HMM is explained with reference to FIGS. 32A and 32B.

FIG. 32A is a diagram of an HMM before the merging of a state is performed. The HMM is the same as the HMM shown in FIG. 31A.

FIG. 32B is a diagram of an HMM after the merging of a state is performed with the HMM shown in FIG. 32A set as a target.

The merging of a state is performed in order to degenerate redundantly-allocated states.

In FIG. 32B, among states $s_1$ to $s_6$ of the HMM shown in FIG. 32A, for example, the state $s_5$ is set as a merging target and the merging target state $s_5$ is merged into the state $s_6$ as a merged target.

The merging of the state $s_5$ into the state $s_6$ is performed by deleting state transition between the merging target state $s_5$ and the merged target state $s_6$ and deleting the merging target state $s_5$ such that the merged target state $s_6$, so to speak, succeeds state transitions (hereinafter also referred to as peculiar state transitions) between the merging target state $s_5$ and other states excluding the merging target state $s_5$ and the merged target state $s_6$.

Therefore, the structure adjusting unit 117 deletes (invalidates) state transition between the merging target state $s_5$ and the merged target state $s_6$.

Further, in FIG. 32A, the peculiar state transitions of the state $S_5$ are state transitions between the state $s_5$ and the states $s_2$ and $s_4$. Therefore, the structure adjusting unit 117 adds (sets) the state transitions between the merged target state $s_6$ and the states $s_2$ and $s_4$ are valid state transitions.

The structure adjusting unit 117 deletes the merging target state $s_5$.

Further, in the merging of a state, for example concerning state transitions succeeded from the merging target state $s_5$ among state transitions of the merged target state $s_6$, the structure adjusting unit 117 sets state transition probabilities $a_{i6}$ and $a_{6i}$ to succeed state transition probabilities $a_{i5}$ and $a_{5j}$ of the merging target state $s_5$.

In FIGS. 32A and 32B, the state transitions succeeded from the merging target state $s_5$ by the merged target state $s_6$ are state transitions between the merging target state $s_5$ and the states $S_2$ and $S_4$. Therefore, the structure adjusting unit 117 sets a state transition probability $a_{62}$ of state transition from the merged target state $s_6$ to the state $s_2$ as a state transition probability $a_{52}$ of state transition from the merging target state $s_5$ to the state $s_2$ $(a_{62}=a_{52})$.

Further, the structure adjusting unit 117 sets a state transition probability $a_{26}$ of state transition from the state $s_2$ to the merged target state $s_6$ as a state transition probability $a_{25}$ of state transition from the state $s_2$ to the merging target state $s_5$ $(a_{26}=a_{25})$.

Similarly, the structure adjusting unit 117 sets a state transition probability $a_{64}$ of state transition from the merged target state $s_6$ to the state $s_4$ as a state transition probability $a_{54}$ of state transition from the merging target state $s_5$ to the state $s_4$ $(a_{64}=a_{54})$.

Further, the state adjusting unit 117 sets a state transition probability $a_{46}$ of state transition from the state $s_4$ to the merged target state $s_6$ as a state transition probability $a_{45}$ of state transition from the state $s_4$ to the merging target state $s_5$ $(a_{46}=a_{45})$.

The structure adjusting unit 117 applies normalization processing to necessary parameters of the HMM after the merging of a state and finishes the merging of a state.

The structure adjusting unit 117 applies normalization processing same as that in the case of the division of a state to the initial probability $\pi_i$ of the HMM after the merging of a state and the state transition probability $a_{ij}$.

In the merging of a state, a set of a state to be set as a merging target and a state to be set as a merged target (hereinafter also referred to as merge set) is not limited to one set.

As a pair of states to be set as the merge set, for example, a pair of higher order "n" (n is a value equal to or larger than 1) states with larger correlation among the states out of pairs of states, in which bidirectional state transitions can be performed, in the N states $s_1$ to $s_N$ of the HMM before the merging of a state.

The number "n" of pairs of state to be set as the merge set can be set at random or can be set to a fixed value. In both the cases, by the merging of a state, the structure of the HMM is updated to structure in which the number of states decreases by "n" from the number of states before the merging.

A correlation among states used in selecting pairs of states to be set as a merge set is explained.

The correlation among states represents a degree of similarity of state transitions (including self-transition) to the other states, state transitions from the other states, and observation values observed from states. For example, the correlation among states is calculated as explained below.

As explained with reference to FIG. 29, the adjusted time series data x' used for estimation of parameters of the HMM in the parameter estimating unit 113 is supplied to the structure adjusting unit 117 from the data adjusting unit 112.

The structure adjusting unit 117 calculates a correlation among states of the HMM stored in the model storing unit 115 using the adjusted time series data x' supplied from the data adjusting unit 112.

The structure adjusting unit 117 applies a forward-backward algorithm to the HMM stored in the model storing unit 115 and calculates a forward-backward probability $p_i(t)$, which is a probability of being present in the state $s_i$ at every time t (a probability that a state at time t is the state $s_i$) of the adjusted time series data $x'=x_1', x_2', \ldots, x_{T'}'$ supplied from the data adjusting unit 112.

The forward-backward algorithm is an algorithm for calculating a probability value as an integrated value of a forward probability $\alpha_i(t)$ calculated by propagating a probability of reaching the respective states $s_i$ forward in a time direction and a backward probability $\beta_i(t)$ calculated by propagating the probability of reaching the respective states $s_i$ backward in the time direction.

The forward-backward algorithm is described in Document explained above.

The structure adjusting unit 117 calculates, concerning the HMM stored in the model storing unit 115, the forward probability $\alpha_i(t)$ of observing the data $x_1', x_2', \ldots, x_t'$ of the adjusted time series data x' and being present in the state $s_i$ at time t. Further, the structure adjusting unit 117 calculates, concerning the HMM stored in the model storing unit 115, the backward probability $\beta_i(t)$ of being present in the state $s_i$ at time t and thereafter observing data $x_t', x_{t+1}', \ldots, x_{T'}'$ of the adjusted time series data x'(being present in the state $s_i$ at time t when the data $x_t', x_{t+1}', \ldots, x_{T'}'$ is observed after time t).

The structure adjusting unit 117 calculates the forward-backward probability $p_i(t)$ of being present in the state $s_i$ at time t using the forward probability $\alpha_i(t)$ and the backward probability $\beta_i(t)$.

The structure adjusting unit 117 calculates the forward-backward probability $p_i(t)$ of being present in the respective states $s_i$ at every time t=1, 2, . . . , T' of the adjusted time series data x'.

Forward-backward probabilities $p_i(1), p_i(2), \ldots, p_i(T')$ of a certain state $s_i$ are time series data with the length T'. This time series data is represented as $p_i(=p_i(1), p_i(2), \ldots, p_i(T'))$ as well.

A correlation between the certain state $s_i$ and the other states $s_j$ is represented as $p_i*p_j$. The structure adjusting unit 117 calculates, according to the following formula, the correlation $P_i*p_j$ between the certain state $s_i$ and the other states $s_j$ using, for example, forward-backward probabilities $p_i=p_i(1), P_i(2), \ldots, p_i(T')$ of the state $s_i$ and forward-backward probabilities $p_j=p_j(1), p_j(2), \ldots, p_j(T')$.

$$p_i*p_j=\Sigma p_i(t)p_j(t)$$

In the above formula, Σ means summation with the time t changed from 1 to the length T' of the adjusted time series data x'.

The correlation $p_i*p_j$ between the states $s_i$ and $s_j$ is high when time change patterns of the forward-backward probability $p_i$ of the state $s_i$ and the forward-backward probability $p_j$ of the state $s_i$ are similar, i.e., when, besides one of the states $s_i$ and $s_j$, the other is redundantly present.

In this case, if bidirectional state transition is present between the states $s_i$ and $s_j$, a pair of the states $s_i$ and $s_j$ is selected as a merge set. With one of the redundant states $s_i$ and $s_j$ set as a merging target and the other set as a merged target, a state of the merging target is merged into a state of the merged target.

The structure adjusting unit 117 can also calculate a correlation between states of the HMM stored in the model storing unit 115 using the observed time series data x rather than the adjusted time series data x'.

It is possible to select, for example, at random which of two states selected as a merge set should be set as a merging target or a merged target.

Addition of a state performed by the structure adjusting unit 117 as adjustment of the structure of an HMM is explained with reference to FIGS. 33A and 33B.

FIG. 33A is a diagram of an HMM before the addition of a state is performed. The HMM is the same as that shown in FIG. 31A.

FIG. 33B is a diagram of an HMM after the addition of a state is performed with the HMM shown in FIG. 33A set as a target.

Like the division of a state explained with reference to FIGS. 31A and 31B, the addition of a state is performed to increase the size of the HMM.

In FIG. 33B, for example, a state $s_5$ among states $s_1$ to $s_6$ of the HMM shown in FIG. 33A is set as a target to which a state is added. A new state $s_7$ is added to the state $S_5$.

The addition of a state is performed by adding the new state $s_7$, in which bidirectional state transition to and from the state $s_5$ as the target to which a state is added can be performed.

Therefore, the structure adjusting unit 117 sets, concerning the new state $s_7$, the self-transition and the state transition to and from the state $s_5$ as valid state transitions.

For example, the structure adjusting unit 117 sets, in the addition of a state, parameters of the new state $s_7$ to, so to speak, succeed parameters of the state $s_5$ as the target to which a state is added.

The structure adjusting unit 117 sets an initial probability $\pi_7$ of the new state $s_7$ as an initial probability $\pi_5$ of the state $s_5$ as the target to which a state is added ($\pi_7=\pi_5$). The structure adjusting unit 117 sets an output probability density function $b_7(x)$ of the new state $s_7$ as an output probability density function $b_5(x)$ of the state $s_5$ to which a state is added ($b_7(x)=b_5(x)$).

The structure adjusting unit 117 sets a state transition probability $a_{57}$ of state transition from the state $s_5$ as the target to which a state is added to the new state $s_7$ and a state transition probability $a_{75}$ of state transition from the new state $s_7$ to the state $s_5$ as the target to which a state is added to an appropriate value, for example, $a_{57}=a_{75}=0.5$.

Further, the structure adjusting unit 117 applies normalization processing to necessary parameters of the HMM after the addition of a state and finishes processing for adding a state.

The structure adjusting unit 117 applies normalization processing same as that in the case of the division of a state to the initial probability $\pi_i$ and the state transition probability $a_{ij}$ of the HMM after the addition of a state.

In the addition of a state, a state as the target to which a state is added is not limited to one state.

As the state as a target to which a state is added, an arbitrary number "n" of states (n is equal to or larger than 1 and equal to or smaller than N) can be selected, for example, at random, out of the N states $s_1$ to $s_N$ of the HMM before the addition of a state.

As the state as the target to which a state is added, for example, higher order "n" states having large dispersion $\sigma^2$ defining the output probability density function bj(x), i.e., higher order "n" states with relatively large fluctuation in an observation value observed from the states can be selected out of the N states $s_1$ to $s_N$ of the HMM before the addition of a state.

The number "n" of states as targets to which a state is added can be set at random or can be set to a fixed value. In both the cases, by the addition of a state, the structure of the HMM is updated to a structure in which the number of states increases by "n" from the number of states before the addition.

The addition of a state and the division of a state explained with reference to FIGS. 31A and 31B are the same in that the number of states of the HMM increases. However, the addition of a state is different from the division of a state in that, whereas, in the addition of a state, a new state does not succeed state transitions of a state as a target to which a state is added, in the division of a state, a new state succeeds state transitions of a state as a division target.

Therefore, concerning state transition, in the HMM after the division of a state shown in FIGS. 31A and 31B, the new state is directly affected by, besides state transition to and from the state as the division target, other state transitions of the state as the division target. However, in the HMM after the addition of a state, the new state is directly affected by only state transition to and from the state as the target to which a state is added.

As a result, in the addition of a state, independency of the new state is high compared with that in the case of the division of a state.

Addition of state transition performed by the structure adjusting unit 117 as adjustment of the structure of an HMM is explained with reference to FIGS. 34A and 34B.

FIG. 34A is a diagram of an HMM before the addition of state transition is performed. The HMM is the same as that shown in FIG. 31A.

FIG. 34B is a diagram of an HMM after the addition of state transition is performed with the HMM shown in FIG. 34A set as a target.

The addition of state transition is performed to solve a problem in that state transitions are insufficient for appropriately representing a modeling target in the structure of the HMM stored in the model storing unit 115. In particular, when sparse state transition is set as an initial structure of the HMM by the initial-structure setting unit 116, it is important to add state transition necessary for appropriate representation of the modeling target.

In FIG. 34B, among states $s_1$ to $s_6$ of the HMM shown in FIG. 34A, for example, the states $s_4$ and $s_6$ are set as targets of addition of state transition. Bidirectional state transition is added between the states $s_4$ and $s_6$ as the targets of addition of state transition.

In the addition of state transition, the structure adjusting unit 117 sets valid state transition between the states $s_4$ and $s_6$ as the targets of addition of state transition. Further, the structure adjusting unit 117 sets a state transition probability $a_{46}$ from one of the states $s_4$ and $s_6$ as the targets of addition of state transition, for example, the state $s_4$ to the other, for example, the state $s_6$ and a state transition probability from the other state $s_6$ to one state $s_4$ to an appropriate value, for example, $a_{46}=a_{64}=0.5$.

The structure adjusting unit 117 applies normalization processing to necessary parameters of the HMM after the addition of state transition and finishes processing for the addition of state transition.

The structure adjusting unit 117 applies normalization processing same as that in the case of the division of a state to a state transition probability aij after the addition of state transition.

In the addition of state transition, a set of two states as targets of addition of state transition (hereinafter also referred to as addition target set) is not limited to one set.

As a pair of states to be set as the addition target set, for example, a pair of higher order "n" (n is a value equal to or larger than 1) states having a large correlation between the states can be selected out of pairs of states, in which bidirectional state transition is not possible, in N states $s_1$ to $s_N$ of the HMM before the addition of state transition.

As explained above, a pair of states having a large correlation are selected as the addition target set among the states in which bidirectional state transition is not possible. In this case, for example, when one of two states without state transition (in which it is difficult to perform direct state transition) is a redundant presence for the other, the two states are mechanically connected by state transition.

The number "n" of pairs of states to be set as the addition target set can be set at random or can be set to a fixed value. In both the cases, the structure of the HMM is updated to a slightly complicated structure in which the number of states does not change but state transitions increases by "n".

Deletion of a state performed by the structure adjusting unit 117 as adjustment of the structure of an HMM is explained with reference to FIGS. 35A and 35B.

Figure 35B:
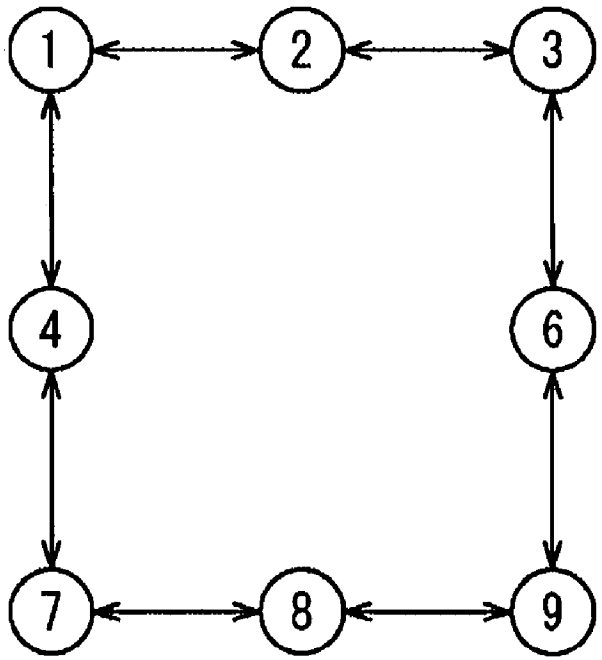
FIGS. 35A and 35B are diagrams for explaining deletion of a state.
Figure 35A:
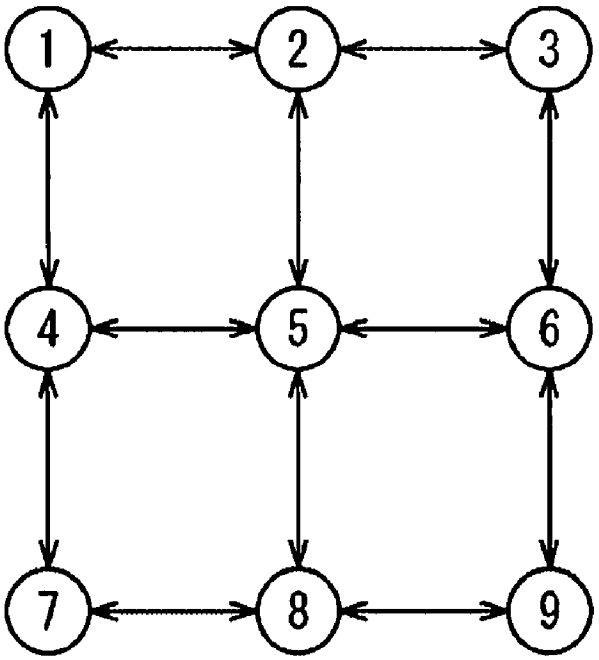

FIG. 35A is a diagram of an HMM before the deletion of a state is performed.

In FIG. 35A, the HMM has nine states $s_1$, $s_2$, $s_3$, $s_4$, $s_5$, $s_6$, $s_7$, $s_8$, and $s_9$. Bidirectional state transitions between the states $s_1$ and $s_2$, between the states $s_1$ and $s_4$, between the states $s_2$ and $s_3$, between the states $s_2$ and $s_5$, between the states $s_3$ and $s_6$, between the states $s_4$ and $s_5$, between the states $s_4$ and $s_7$, between the states $s_5$ and $s_6$, between the states $s_5$ and $s_8$, between the states $s_6$ and $s_9$, between the states $s_7$ and $s_8$, and between the states $s_8$ and $s_9$ and self-transition are possible.

FIG. 35B is a diagram of an HMM after the deletion of a state is performed with the HMM shown in FIG. 35A set as a target.

The deletion of a state is performed to delete a state unnecessary for appropriately representing a modeling target.

In FIG. 35B, for example, the state $s_5$ among the states $s_1$ to $s_9$ of the HMM shown in FIG. 35A is deleted.

The deletion of a state is performed by deleting the state $s_5$ as the target of deletion and state transitions possible from the state $s_5$ (including state transitions to the state $s_5$).

In FIG. 35A, state transitions to and from the states $s_2$, $s_4$, $s_6$, and $s_8$ and self-transition are possible in the state $s_5$. Therefore, the structure adjusting unit 117 deletes, concerning the state $s_5$ as the target of deletion, the state $s_5$, state transitions between the state $s_5$ and the states $s_2$, $s_4$, $s_6$, and $s_8$ and the self-transition of the state $s_5$.

Further, the state adjusting unit 117 applies normalization processing to necessary parameters of the HMM after the deletion of a state and finishes processing for the deletion of a state.

The structure adjusting unit 117 applies normalization processing same as that in the case of the division of a state to an initial probability $\pi_i$ after the deletion of a state and a state transition probability $a_{ij}$.

The structure adjusting unit 117 selects a state to be set as a target of deletion, for example, as explained below.

As explained with reference to FIG. 29, the adjusted time series data x' used for estimation of parameters of the HMM in the parameter estimating unit 113 is supplied to the structure adjusting unit 117 from the data adjusting unit 112.

The structure adjusting unit 117 applies a Viterbi method to the HMM stored in the model storing unit 115 and calculates a process of state transition (a sequence of states) (a path) that maximizes likelihood that the adjusted time series data $x'=x_1', x_2', \ldots, x_{T'}'$ from the data adjusting unit 112 is observed (hereinafter also referred to as maximum likelihood path).

The Viterbi method is an algorithm for determining, among paths of state transitions starting from the respective states $s_i$, a path (a maximum likelihood path) for maximizing a value (an occurrence probability) obtained by accumulating, over the length T' of the adjusted time series data x', a state transition probability a of state-transitioning from the state $s_i$ to the state $s_j$ at time t and a probability of a sample value $x'_t$ at time t of the adjusted time series data $x'=x_1', x_2', \ldots, x_{T'}'$ being observed in the state transition (an output probability calculated from an output probability density function $b_j(x)$).

The Viterbi method is described in Document A explained above.

The structure adjusting unit 117 determines, concerning the adjusted time series data x', a sequence of states $s_1', s_2', \ldots, s_{T'}'$ and then detects a state not forming the maximum likelihood path (a state not included in the maximum likelihood path) among the states of the HMM.

The state not forming the maximum likelihood path can be regarded as a state not always necessary for representing characteristics (time series patterns) of the adjusted time series data $x'=x_1', x_2', \ldots, x_{T'}'$. Therefore, the structure adjusting unit 117 selects the state not forming the maximum likelihood path as a state to be set as a target of deletion.

For example, in the HMM having the states $s_1$ to $s_9$ shown in FIG. 35A, when a sequence of states $s_1$, $s_2$, $s_3$, $s_6$, $s_9$, $s_8$, $s_7$, $s_4$, $s_1$, $s_7$, $s_8$, $s_9$, $s_6$, $s_3$, $s_2$, and $s_1$ is determined as a maximum likelihood path concerning the adjusted time series data x', the length T' of which is 16, the structure adjusting unit 117 selects the state $s_5$ not forming the maximum likelihood path among the states $s_1$ to $s_9$ forming the HMM as a state to be set as a target of deletion.

As explained above, the structure adjusting unit 117 deletes the state s5 selected as the target of deletion. Consequently, adjustment of the structure for changing the HMM shown in FIG. 35A to the HMM shown in FIG. 35B is performed.

The structure adjusting unit 117 performs, as the adjustment of the structure of the HMM, deletion of state transition besides the division of a state, the merging of a state, the addition of a state, the addition of state transition, and the deletion of a state explained with reference to FIGS. 31A to 35B.

The deletion of state transition is performed in the same manner as the deletion of a state.

As explained above, the structure adjusting unit 117 determines, concerning the adjusted time series data x', a sequence of states $s_1', s_2', \ldots, s_{T'}'$ as a maximum likelihood path and selects state transition not forming the maximum likelihood path as state transition to be set as a target of deletion.

Further, the structure adjusting unit 117 deletes the state transition selected as the state transition to be set as a target of deletion, applies normalization processing same as that in the case of the division of a state to the state transition probability $a_{ij}$ of the HMM after the deletion of state transition, and finishes processing for the deletion of state transition.

Figure 36:
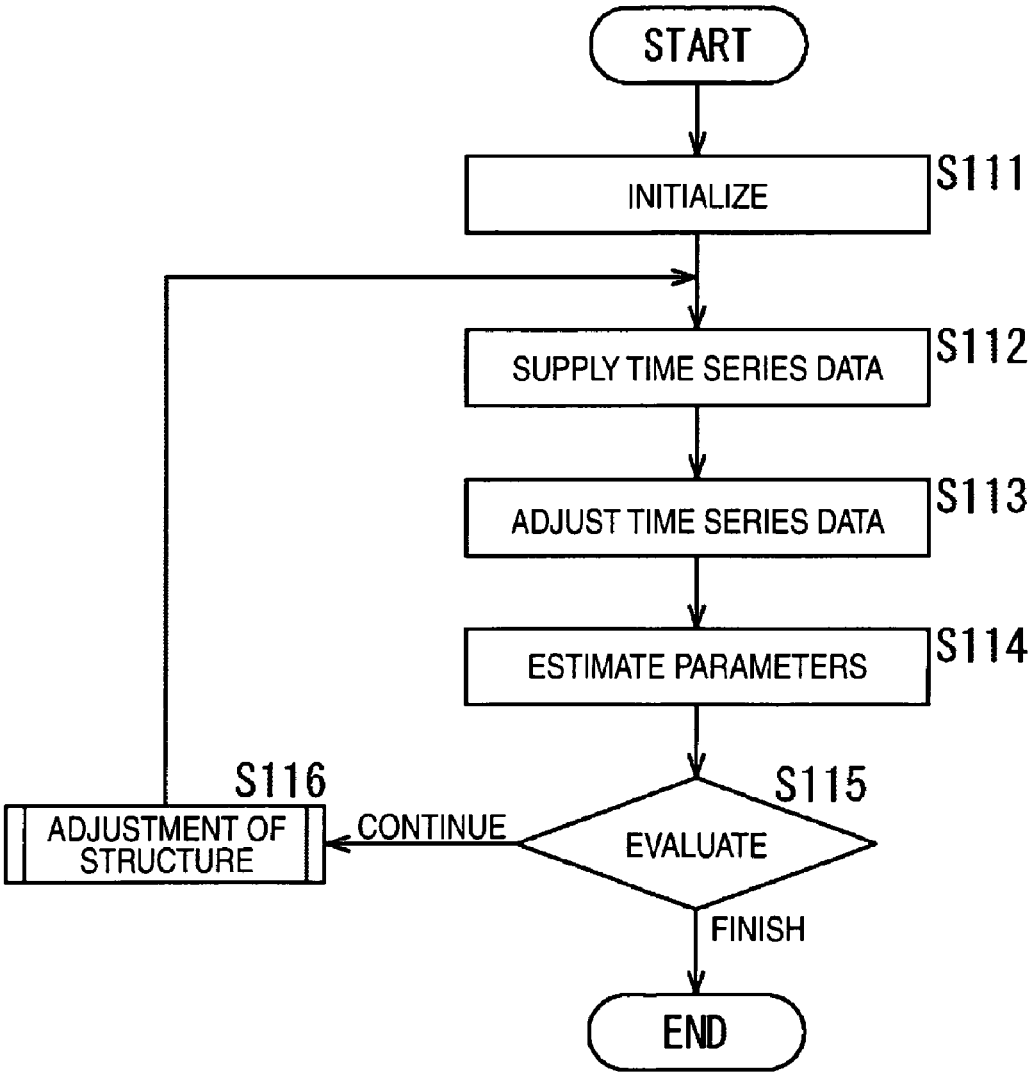
FIG. 36 is a flowchart for explaining learning processing by the data processing apparatus.

FIG. 36 is a flowchart for explaining processing (learning processing) by the data processing apparatus shown in FIG. 29.

A sensor signal from a modeling target is supplied to the time-series-data input unit 111. The time-series-data input unit 111 directly sets, for example, the sensor signal observed from the modeling target as observed time series data x.

As explained above, the observed time series data x is supplied from the time-series-data input unit 111 to the data adjusting unit 112. Besides, the observed time series data x is supplied to the initial-structure setting unit 116 as well and, as explained above, used for setting of the output probability density function $b_j(x)$ in the initial-structure setting unit 116.

In step S111, the initial-structure setting unit 116 performs initialization of an HMM.

The initial-structure setting unit 116 initializes the structure of the HMM to an initial structure and sets parameters of the HMM having the initial structure (initial parameters).

Specifically, the initial-structure setting unit 116 sets, as the initial structure of the HMM, the number of states of the HMM and sets sparse state transition in the HMM having the number of states.

Further, the initial-structure setting unit 116 sets, in the HMM having the initial structure, initial values of the state transition probability $a_{ij}$, the output probability density function $b_j(x)$, and the initial probability $\pi_i$ as the initial parameters.

As explained above, the HMM in which the initial structure and initial parameters $\lambda=\{a_{ij}, b_j(x), \pi_i, i=1, 2, \ldots, N, j=1, 2, \ldots, N\}$ are set by the initial-structure setting unit 116 is supplied to and stored in the model storing unit 115.

Thereafter, the processing proceeds from step S111 to step S112. The time-series-data input unit 111 supplies the observed time series data x to the data adjusting unit 112. The processing proceeds to step S113.

In step S113, the data adjusting unit 112 performs, as explained with reference to FIG. 29, adjustment of the observed time series data x supplied from the time-series-data input unit 111 to obtain the adjusted time series data x' and supplies the adjusted time series data x' to the parameter estimating unit 113. The processing proceeds to step S114.

Besides being supplied from the data adjusting unit 112 to the parameter estimating unit 113, the adjusted time series data x' is supplied to the structure adjusting unit 117 as well.

In step S114, the parameter estimating unit 113 estimates, with the parameters of the HMM stored in the model storing unit 115 set as initial values, new parameters of the HMM with the Baum-Welch re-estimation method using the adjusted time series data x' supplied from the data adjusting unit 112.

The parameter estimating unit 113 supplies the new parameters of the HMM to the model storing unit 115 and causes the model storing unit 115 to store the new parameters in a form of overwriting.

The parameter estimating unit 113 increments the number of times of learning, which is reset to 0 during the start of the learning processing in FIG. 36, by 1 and supplies the number of times of learning to the evaluating unit 114.

Further, the parameter estimating unit 113 calculates likelihood of observation of the adjusted time series data x' from the HMM defined by the new parameters λ and supplies the likelihood to the evaluating unit 114. The processing proceeds from step S114 to step S115.

In step S115, the evaluating unit 114 evaluates, on the basis of the likelihood and the number of times of learning supplied from the parameter estimating unit 113, the HMM for which learning is performed i.e., the HMM for which the parameters λ are estimated by the parameter estimating unit 113 and determines, on the basis of a result of the evaluation of the HMM, whether the learning of the HMM should be finished.

When it is determined in step S115 that the learning of the HMM is not finished, the evaluating unit 114 requests the time-series-data input unit 111, the data adjusting unit 112, and the structure adjusting unit 117 to perform predetermined processing. The processing proceeds to step S116.

In step S116, the structure adjusting unit 117 performs, in response to a request from the evaluating unit 114, processing for adjusting the structure of the HMM stored in the model storing unit 115 using the adjusted time series data x' supplied from the data adjusting unit 112. The processing returns to step S112.

In step S112, the time-series-data input unit 111 supplies the observed time series data x to the data adjusting unit 112 in response to a request from the evaluating unit 114. The processing proceeds to step S113.

In step S113, the data adjusting unit 112 performs, in response to a request from the evaluating unit 114, adjustment of the observed time series data x supplied from the time-series-data input unit 111 as explained with reference to FIG. 29 to obtain the adjusted time series data x'. Thereafter, the processing explained above is repeated.

The parameter estimating unit 113 estimates parameters of the HMM. The structure adjusting unit 117 adjusts the structure of the HMM defined by the parameters after the estimation. This processing is repeated.

The data adjusting unit 112 performs down-sampling processing with the observed time series data x set as a target, for example, as explained with reference to FIG. 29, to obtain the adjusted time series data x'. In the down-sampling processing, a sampling frequency for the adjusted time series data x' is gradually changed from a small value to a large value as learning of the HMM proceeds.

On the other hand, when it is determined in step S115 that the learning of the HMM is finished, the learning processing is finished.

As explained above, in the data processing apparatus shown in FIG. 29, the structure of the HMM is initialized to sparse structure. Thereafter, the observed time series data x used for learning is adjusted according to the progress of learning, the adjusted time series data x' is outputted, parameters of the HMM are estimated by using the adjusted time series data x', and the structure of the HMM is adjusted. This processing is repeated.

As a result, even if a modeling target is complicated, an HMM that appropriately models the modeling target can be obtained.

In general, an HMM having a large number of states and a large number of state transitions is necessary for modeling of a complicated modeling target. However, it is difficult to use, from the beginning, the HMM having a large number of states and a large number of state transitions and correctly estimate parameters of the HMM.

In the data processing apparatus shown in FIG. 29, the structure of the HMM is initialized to sparse structure, the observed time series data x is adjusted according to progress of learning, and the structure of the HMM is adjusted. Consequently, even if an HMM that appropriately represents a complicated modeling target is a large HMM, it is possible to correctly estimate parameters of the large HMM (estimate parameters estimated as correct).

Further, in the data processing apparatus shown in FIG. 29, even when a modeling target is an unknown target and it is difficult to determined (predict) initial structure of an HMM and initial values of parameters (initial parameters) in advance, an HMM that appropriately represents the modeling target (an HMM having appropriate structure and appropriate parameters) can be calculated.

Figure 37:
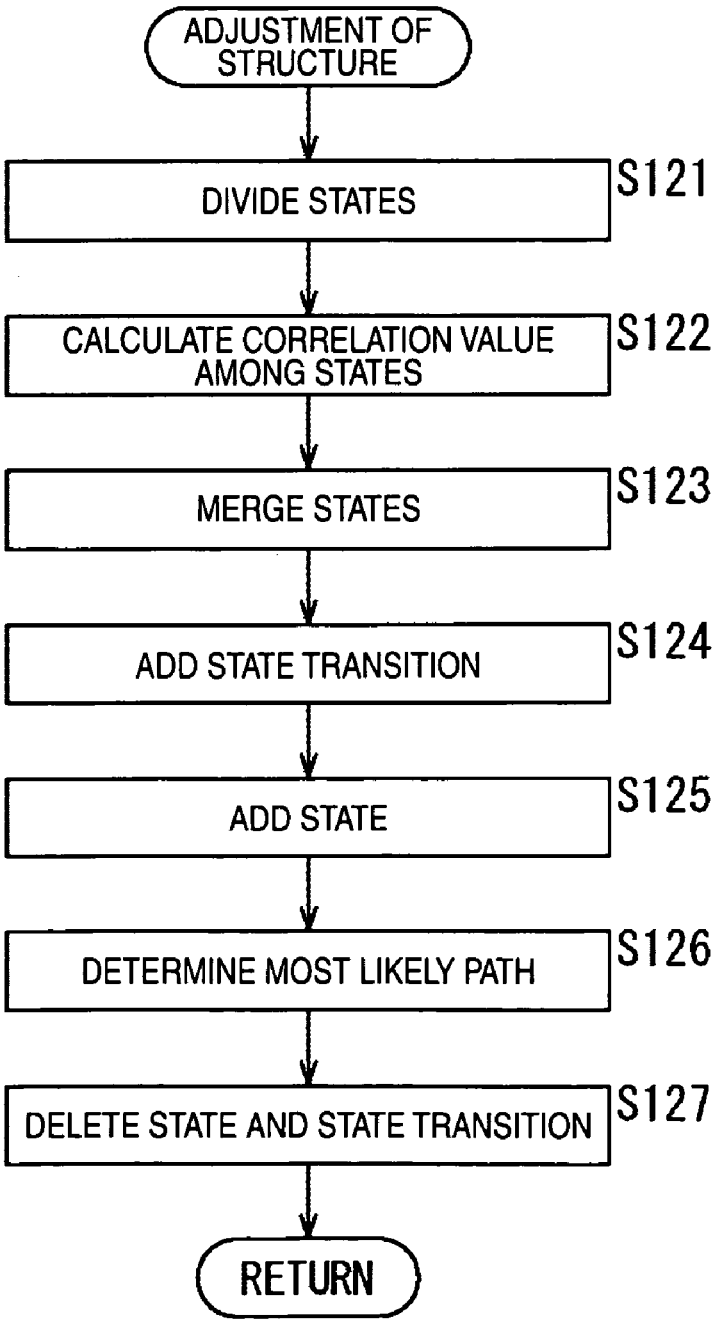
FIG. 37 is a flowchart for explaining processing by a structure adjusting unit 117.

FIG. 37 is a flowchart for explaining details of processing performed by the structure adjusting unit 117 in step S116 in FIG. 36.

In step S121, the structure adjusting unit 117 applies the division of a state explained with reference to FIGS. 31A and 31B to the HMM stored in the model storing unit 115. The processing proceeds to step S122.

In step S122, the structure adjusting unit 117 calculates a correlation among states forming the HMM after the division of a state using the adjusted time series data x' supplied from the data adjusting unit 112. The processing proceeds to step S123.

In step S123, the structure adjusting unit 117 applies the merging of a state explained with reference to FIGS. 32A and 32B to the HMM after the division of a state on the basis of the correlation calculated in step S122. The processing proceeds to step S124.

In step S124, the structure adjusting unit 117 applies the addition of state transition explained with reference to FIGS. 34A and 34B to the HMM after the merging of a state on the basis of the correlation calculated in step S122. The processing proceeds to step S125.

In step S125, the structure adjusting unit 117 applies the addition of a state explained with reference to FIGS. 33A and 33B to the HMM after the addition of state transition. The processing proceeds to step S126.

In step S126, the structure adjusting unit 117 calculates, concerning the adjusted time series data x' supplied from the data adjusting unit 112, a maximum likelihood path using the HMM after the addition of a state. The processing proceeds to step S127.

In step S127, the structure adjusting unit 117 detects a state and state transition not forming the maximum likelihood path. Further, in step S127, the structure adjusting unit 117 deletes the state and the state transition not forming the maximum likelihood path as explained with reference to FIGS. 35A and 35B.

The structure adjusting unit 117 updates the stored values in the model storing unit 115 with parameters of the HMM after the deletion of the state and the state transition. The processing returns to step S121.

As explained above, the structure adjusting unit 117 performs, concerning the HMM stored in the model storing unit 115, six kinds of adjustment of the structure, i.e., the division of a state, the merging of a state, the addition of a state, the addition of state transition, the deletion of a state, and the deletion of state transition.

In FIGS. 36 and 37, the evaluating unit 114 requests the structure adjusting unit 117 to adjust the structure every time the number of times of learning increases by one.

Therefore, the structure adjusting unit 117 performs the adjustment of the structure of the HMM every time the number of times of learning increases by one. However, the adjustment of the structure of the HMM can be performed according to progress of the learning other than the increase in the number of times of learning by one.

The evaluating unit 114 supplies the number of times of learning and the likelihood to the data adjusting unit 112 as progress state information representing a state of programs of the learning. The progress state information can be supplied to the structure adjusting unit 117 as well.

In this case, the structure adjusting unit 117 performs the adjustment of the structure of the HMM according to the progress state information supplied from the evaluating unit 114.

For example, it is possible to cause the structure adjusting unit 117 to perform the adjustment of the structure when the number of times of learning as the progress state information increases by a predetermined number of times from the number of times at the time of the last adjustment of the structure.

It is also possible to cause the structure adjusting unit 117 to perform the adjustment of the structure, for example, when the likelihood as the progress state information falls from a value at the time of the last adjustment of the structure or when a ratio of an increase in the likelihood falls to be equal to or lower than a predetermined value.

The adjustment of the structure of the HMM by the structure adjusting unit 117 does not guarantee that the structure of the HMM converges to an optimum structure that represents the modeling target.

However, according to the adjustment of the structure of the HMM by the structure adjusting unit 117, a state and state transition estimated as being appropriate for representing the modeling target are added and, on the other hand, a state and state transition estimated as being unnecessary for representing the modeling target are deleted. Therefore, even if a modeling target is a complicated modeling target, it is possible to obtain a large HMM that appropriately models the modeling target.

In FIG. 37, the adjustment of the structure is performed in order of the division of a state, the merging of a state, the addition of state transition, the addition of a state, the deletion of a state, and the deletion of state transition. However, order of the adjustment of the structure is not limited to this.

Simulation performed for the data processing apparatus shown in FIG. 29 is explained with reference to FIGS. 38A and 38B to FIG. 40.

In the simulation, a sequence of coordinates (x,y) of a moving locus of a robot that moves at random in a two-dimensional space was used as the observed time series data x.

A range of the coordinates (x,y) of the two-dimensional space in which the robot could move was set in a range excluding areas of four blocks #1, #2, #3, and #4 indicated by areas of the following formula in a range represented by $$-100<x<+100 \text{ and } -100<y<+100.$$

Block #1: $-70<x<-20$, $-70<y<-20$
Block #2: $-70<x<-20$, $+20<y<+70$
Block #3: $+20<x<+70$, $-70<y<-20$
Block #4: $+20<x<+70$, $+20<y<+70$ The robot was moved 10000 steps (times) in a movable range with an origin (0,0) set as a start position while a very small moving amount ($\Delta x$,$\Delta y$) was sequentially determined at random.

Figure 38B:
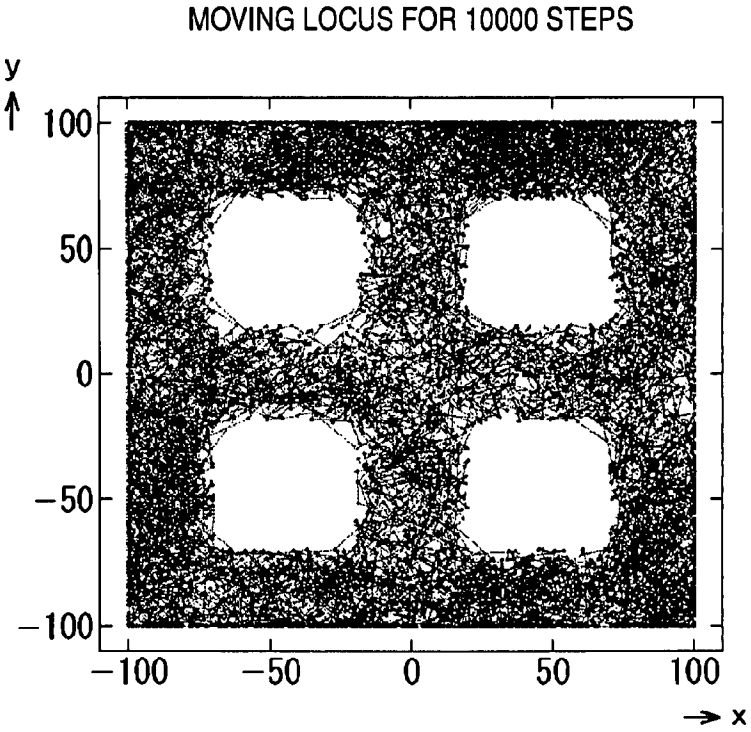
FIGS. 38A and 38B are diagrams of moving loci used in simulation.
Figure 38A:
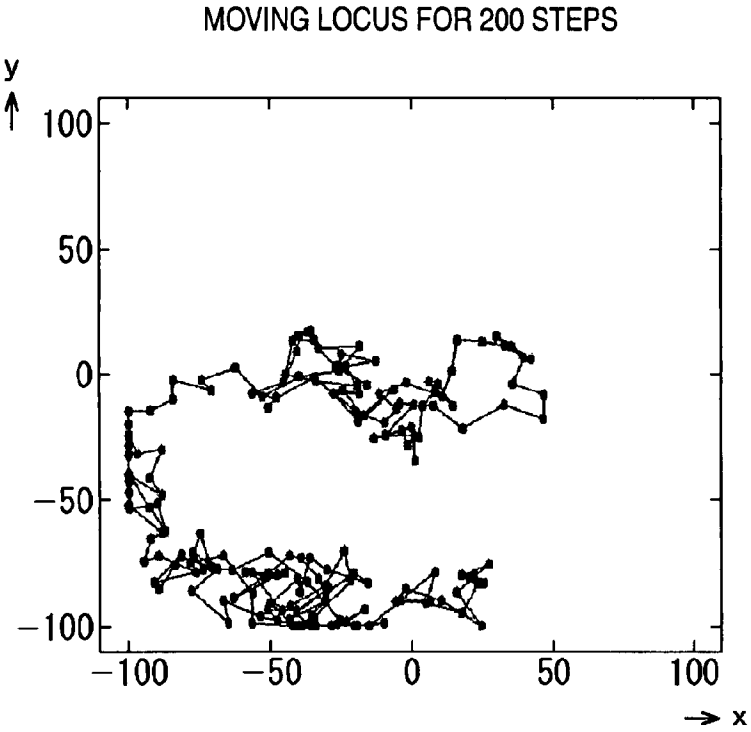

FIGS. 38A and 38B are diagrams of a moving locus of the robot.

FIG. 38A is a diagram of a moving locus until the robot moved 200 steps from the start position (the origin). FIG. 38B is a diagram of a moving locus until the robot moved 10000 steps from the start position.

In FIGS. 38A and 38B, black circles represent coordinates after the robot moved by the very small moving amount ($\Delta x$,$\Delta y$). In FIGS. 38A and 38B, a moving locus is shown by connecting the black circles with straight lines in time order.

According to FIGS. 38A and 38B, it is seen that the robot moved at random in the entire movable range.

In the simulation, the sequence of the coordinates (x,y) for 10000 steps was used as the observed time series data x. However, it was assumed unknown that the movable range of the robot and the observed time series data x were the coordinates (x,y) in the two-dimensional space.

In the simulation, it was assumed that information concerning the robot, the coordinates (x,y) (moving locus) as the observed time series data x of which were observed, was not given in advance and it was known in advance that the two-dimensional observed time series data x was measured.

In the simulation, the HMM having the sixteen states shown in FIG. 30A was adopted as the HMM having the initial structure. A normal distribution was adopted as the output probability density function $b_j(x)$ of the respective states $s_j$ of the HMM.

In the simulation, the learning of the HMM was finished at a stage when the number of times of learning reached thirty-six.

In the simulation, as explained above, the observed time series data as the sequence of the coordinates (x,y) for 10000 steps, i.e., the observed time series data including 10000 samples was used for the learning. In the first learning of the thirty-six times of learning, the down-sampling processing was applied to the observed time series data including 10000 samples such that a sampling frequency fell to 1/10 of an original sampling frequency. Adjusted time series data including 1000 samples obtained as a result of the down-sampling processing was used for, for example, estimation of parameters of the HMM.

Thereafter, the sampling frequency of the adjusted time series data was gradually increased such that the sampling frequency fell to 1/9, 1/8, 1/7, . . . and 1/1 of the original sampling frequency every time the number of times of learning increased by three. In this case, when the number of times of learning reached twenty-eight or more, the adjusted time series data was the observed time series data itself.

Figure 39A:
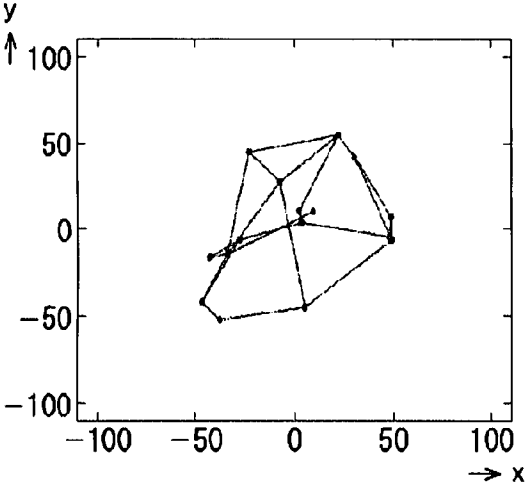
FIGS. 39A to 39C are diagrams of HMMs obtained as a result of learning.
Figure 39B:
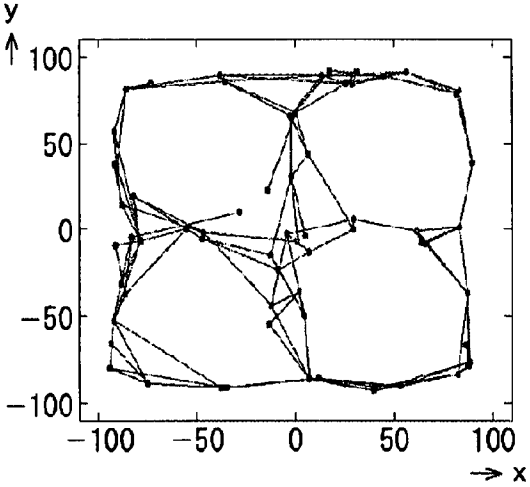
Figure 39C:
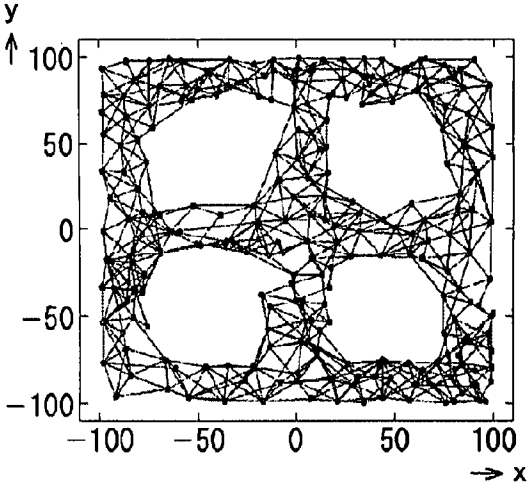

FIGS. 39A to 39C are diagrams of HMM obtained as a result of the learning.

FIG. 39A is a diagram of an HMM at a point right after the learning is started (a learning initial period). FIG. 39B is a diagram of an HMM at a point when the learning progresses to some extent (a learning intermediate period). FIG. 39C is a diagram of an HMM after the learning is performed a sufficient number of times (after the learning ends).

In FIGS. 39A to 39C, black circles represent coordinates (x,y) indicated by average vectors of the output probability density function $b_j(\ )$ of the states $s_j$ of the HMM and correspond to the states $s_j$.

In FIGS. 39A to 39C, when the state transition probability aij of state transition from the state $s_i$ to the state $s_j$ is larger than 0 (when state transition from the state $s_i$ to the state $s_j$ is valid state transition), the black circle corresponding to the state $s_i$ and the black circle corresponding to the state $s_j$ are connected by a straight line (a segment). Therefore, in FIGS. 39A to 39C, a straight line connecting the black circles corresponds to (valid) state transition.

In FIGS. 39A to 39C, an arrow representing the direction of state transition is not shown.

In FIGS. 39A to 39C, states are arranged all over a movable range. State transition is present between states corresponding to two positions (coordinates), between which the system can move in a single (a constant) method of movement. Therefore, it is seen that an HMM that appropriately represents properties (characteristics) of a moving method of moving in a movable range of a two-dimensional space can be obtained.

Figure 40:
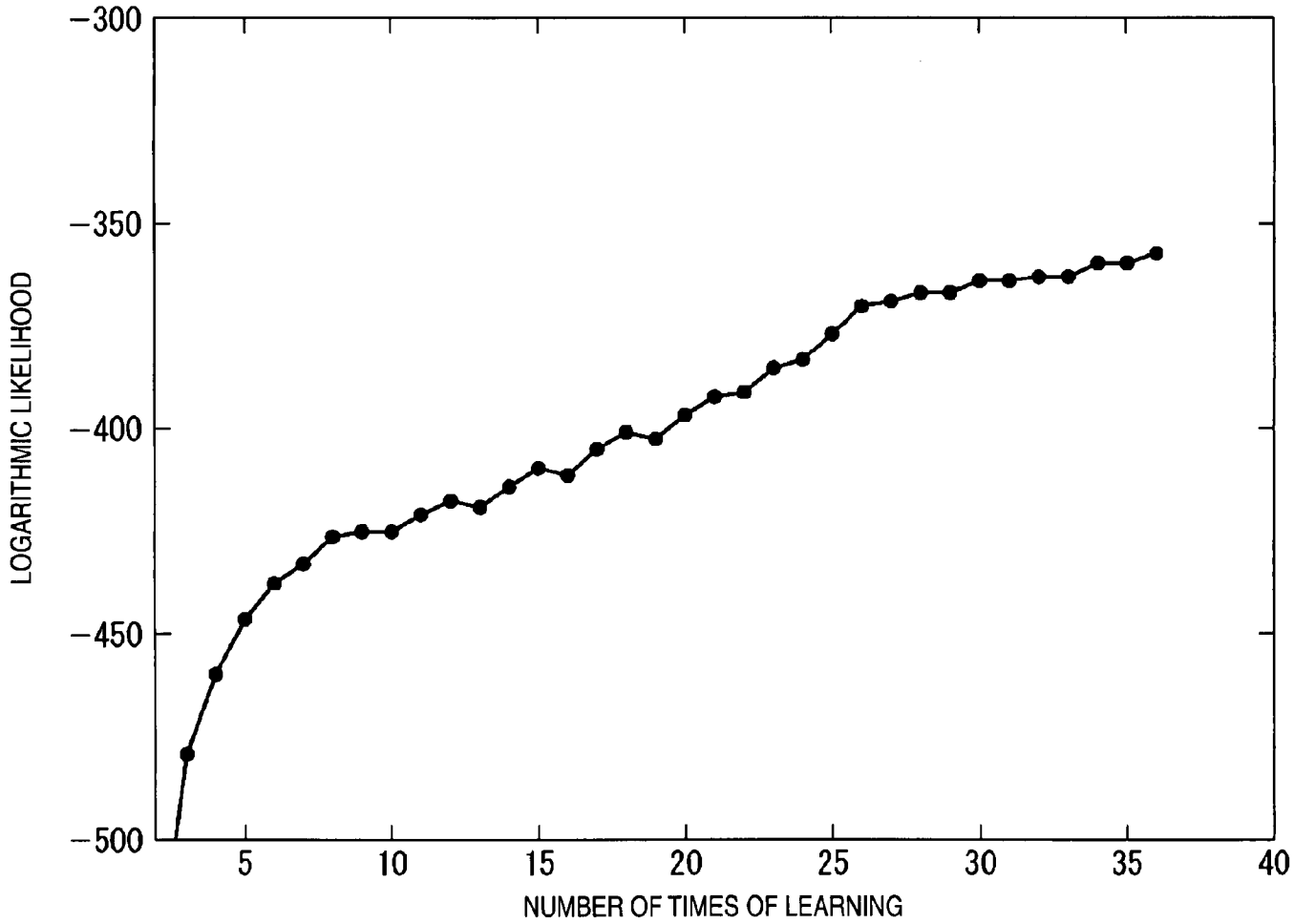
FIG. 40 is a graph of logarithmic likelihood calculated from an HMM obtained as a result of learning.

FIG. 40 is a graph of logarithmic likelihood (a logarithmic value of likelihood) calculated for the adjusted time series data from the HMM obtained as a result of the learning.

According to FIG. 40, it is seen that there is a tendency that the logarithmic likelihood calculated from the HMM is improved as the number of times of learning increases.

In other words, according to FIG. 40, it is seen that an HMM that appropriately represents characteristics of a moving locus is obtained as the learning progresses.

As explained above, in the data processing apparatus shown in FIG. 29, learning is started from a rough HMM formed by sparse state transition given by the initial-structure setting unit 116 and the HMM is gradually detailed by the structure adjusting unit 117 according to progress of the learning. In parallel, learning is started from macro characteristics of observed time series data and adjustment is performed by the data adjusting unit 112 to adjust the learning to gradually include micro characteristics according to the progress of the learning.

As explained above, functions of the setting of the sparse initial structure of the HMM by the initial-structure setting unit 116, the adjustment of the structure of the HMM by the structure adjusting unit 117, and the adjustment of the observed time series data by the data adjusting unit 112 act. Therefore, it is possible to perform determination of the structure of a large HMM and estimation of parameters, which are difficult to treat in the past.

The data processing apparatus shown in FIG. 29 can be applied to identification and control of a system (the system is one apparatus or a logical set of plural apparatuses; apparatuses of respective configurations do not always have to be present in the same housing) and learning of a state transition model used for artificial intelligence and the like. In particular, the data processing apparatus can be applied to, for example, learning for an autonomous agent or the like such as an autonomous robot to cognize (recognize) an environment and a state of the agent and perform a behavior corresponding to a result of the cognition. Further, the data processing apparatus shown in FIG. 29 can be applied to learning of networks for a social system such as transportation, finance, and information, a physical system and a chemical system for physical phenomena and chemical reactions, a biological system related to living beings, and the like.

In the case explained above, the initial-structure setting unit 116 initializes the structure of the HMM to the sparse structure. However, besides, the initial-structure setting unit 116 can initialize the structure of the HMM to, for example, Ergodic structure.

In the case explained above, the data adjusting unit 112 adjusts the observed time series data according to the progress of the learning. However, the adjustment of the observed time series data does not have to be performed. In this case, in the data processing apparatus shown in FIG. 29, it is unnecessary to provide the data adjusting unit 112.

It is possible to determine, for example, according to likelihood itself or a degree of a change in the likelihood, whether the adjustment of the structure by the structure adjusting unit 117 should be performed.

The series of processing explained above can be performed by hardware or can be performed by software. When the series of processing is performed by software, a program configuring the software is installed in a general-purpose computer or the like.

Figure 41:
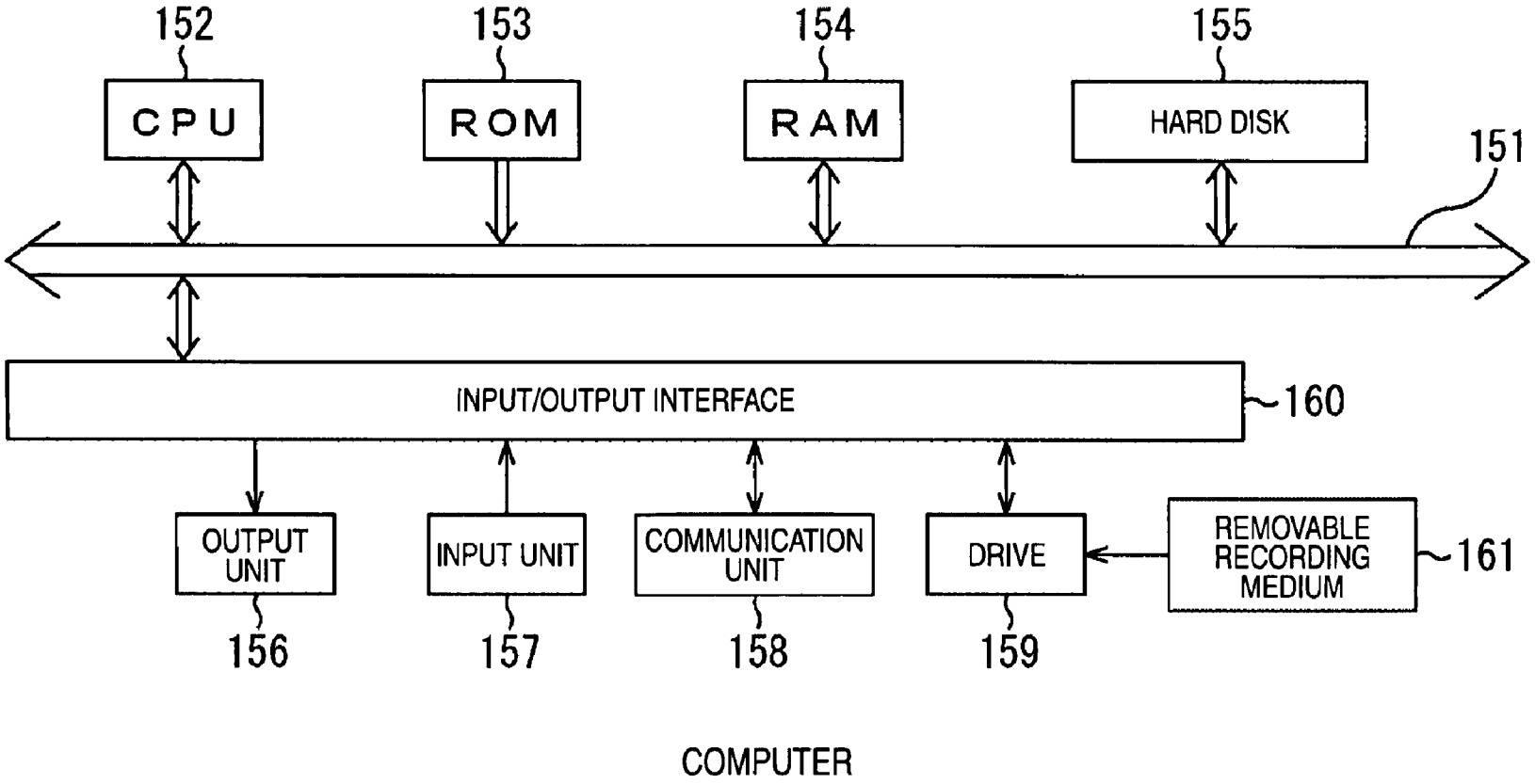
FIG. 41 is a block diagram of a configuration example of a computer according to an embodiment of the present invention.

FIG. 41 is a diagram of a configuration example of a computer according to an embodiment of the present invention in which the program for executing the series of processing is installed.

The program can be recorded in advance in a hard disk 155 or a ROM 153 as a recording medium incorporated in the computer.

Alternatively, the program can be temporarily or permanently stored (recorded) in a removable recording medium 161 such as a flexible disk, a CD-ROM (Compact Disc Read Only Memory), an MO (Magneto Optical) disk, a DVD (Digital Versatile Disc), a magnetic disk, or a semiconductor memory. Such a removable recording medium 161 can be provided as so-called package software.

Besides being installed in the computer from the removable recording medium 161, the program can be transferred by radio from a download site to the computer via an artificial satellite for digital satellite broadcast or transferred by wire from the download site to the computer via a network such as a LAN (Local Area Network) or the Internet. The computer can receive the program transferred in that way in a communication unit 158 and install the program in the hard disk 155 incorporated therein.

The computer incorporates a CPU (Central Processing Unit) 152. An input and output interface 160 is connected to the CPU 152 via a bus 151. A command is inputted to the CPU 152 by a user via the input and output interface 160 according to, for example, operation of an input unit 157 including a keyboard, a mouse, and a microphone. The CPU 152 executes the program stored in the ROM (Read Only Memory) 153 according to the command. Alternatively, the CPU 152 loads the program stored in the hard disk 155, the program transferred from the satellite or the network, received by the communication unit 158, and installed in the hard disk 155, or the program read out from the removable recording medium 161 inserted in a drive 159 and installed in the hard disk 155 onto a RAM (Random Access Memory) 154 and executes the program. Consequently, the CPU 152 performs processing conforming to the flowcharts explained above or processing performed by the configurations shown in the block diagrams explained above. For example, the CPU 152 outputs a result of the processing from an output unit 156 including an LCD (Liquid Crystal Display) and a speaker, transmits the processing result from the communication unit 158, or records the processing result in the hard disk 155 via the input and output interface 160 according to necessity.

Figure 42:
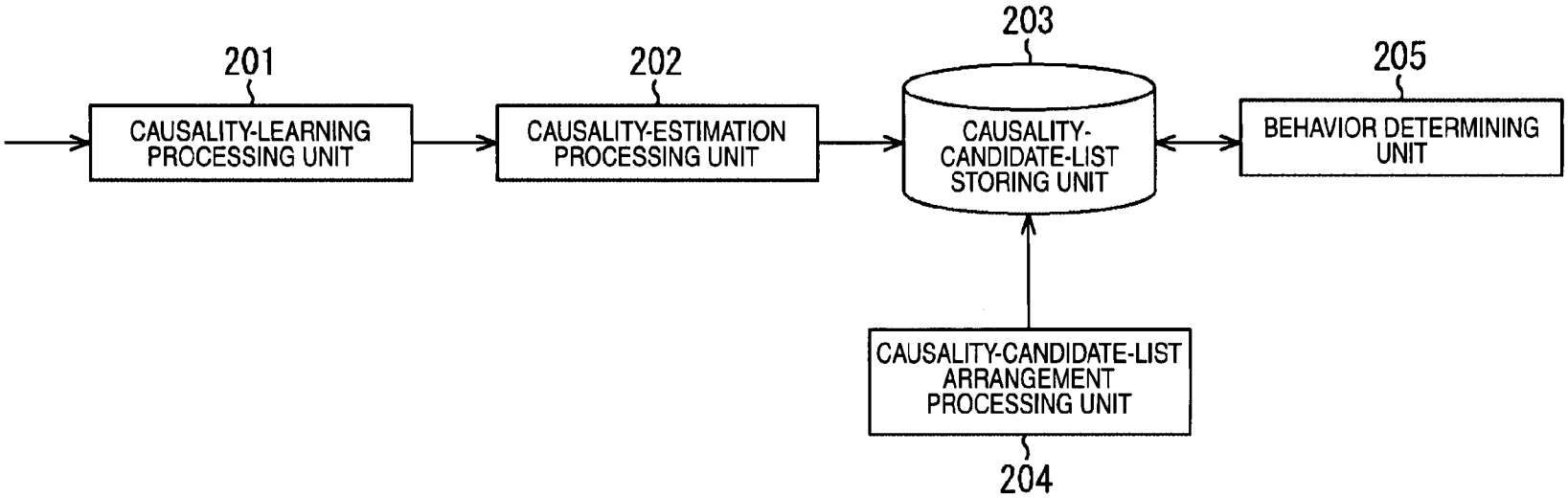
FIG. 42 is a diagram of a functional configuration example of an information processing apparatus.

FIG. 42 is a diagram of a functional configuration example of an information processing apparatus.

The information processing apparatus shown in FIG. 42 includes a configuration concerning causality perception and a configuration for determining a behavior of a robot (an agent) on the basis of causality. A configuration concerning causality perception corresponds to the configuration of the causality unit 63 shown in FIG. 15. The configuration for determining a behavior of a robot on the basis of causality corresponds to the configuration of the behavior control unit 64 shown in FIG. 15.

As shown in FIG. 42, the information processing apparatus includes a causality-learning processing unit 201 a causality-estimation processing unit 202, a causality-candidate-list storing unit 203, a causality-candidate-list arrangement processing unit 204, and a behavior determining unit 205.

The causality-learning processing unit 201 acquires HMMs of plural modals such as the distance HMM, the light HMM, and the energy HMM generated as explained above and performs causality learning. The causality-learning processing unit 201 outputs data obtained by performing the causality learning to the causality-estimation processing unit 202.

Only one node of nodes (states) of an HMM is typically ignited in the same HMM. Therefore, events of the nodes are a set of events that are exclusive to one another and mutually exclusive and collectively exhaustive (MECE). Therefore, it is possible to associate node transition in a certain HMM with node ignition in single or plural other HMMs. For example, changes with time of respective ignition nodes of N types of HMMs are recorded and used for causality learning.

The causality-estimation processing unit 202 performs causality estimation using data supplied from the causality-learning processing unit 201. The causality-estimation processing unit 202 causes the causality-candidate-list storing unit 203 to store a list representing causality obtained by performing the causality estimation.

The causality among the events is represented by a conditional probability as explained later. Acquiring data used for calculating the conditional probability is referred to as causality learning. Calculating a conditional probability using the data acquired by the causality learning and estimating causality is referred to as causality estimation. Causality perception represents a state in which the causality among the events is perceived by the causality estimation.

The causality-candidate-list arrangement processing unit 204 appropriately arranges a causality candidate list stored in the causality-candidate-list storing unit 203.

When a target value is given, the behavior determining unit 205 determines a behavior with reference to the causality candidate list stored in the causality-candidate-list storing unit 203. A behavior of the robot is controlled on the basis of a command representing the behavior determined by the behavior determining unit 205.

In the causality-estimation processing unit 202, basically, causality estimation is performed as explained below. Details of the causality estimation are explained later.

In performing causality estimation for a certain event a1, events that could occur are classified into, at least in a range of experiences of the robot, a set A including events a1, a2, a3, and the like including the event a1 exclusive to one another and mutually exclusive and collectively exhaustive (MECE) and a set B as a set of the other events.

The causality is represented by a conditional probability P (T: ak→al|ak,b) calculated for all events b that have occurred simultaneously with an event ak in the past. T: ak→al represents transition from the event ak to the event al. In the following explanation, T: ak→al is simply represented as T.

Since the conditional probability P(T|ak,b) is represented by the following formula, a conditional probability is calculated from values of N(T,ak,b) and N(ak,b).

$$P(T\backslash ak,b)=P(T,ak,b)/P(ak,b)=\equiv N(T,ak,b)/N(ak,b)$$

N(T,ak,b) represents the number of times the event ak and the event b simultaneously occur and the event al occurs at the next time. N(ak,b) represents the number of times the event ak and the event b simultaneously occur.

The conditional probability calculated in this way has an error. The magnitude of the error is expected to be inversely proportional to $\sqrt{N(T,ak,b)}$. Therefore, if the event b is controlled by, for example, changing granularity to keep N(T,ak, b) at a value in an appropriate range, the error can be reduced.

Specifically, when the number of experiences of the robot is small, rough representation such as "when it is bright" is used as a method of representing the event b. As the number of experiences increase, representation of finer granularity such as "when illuminance is 700 to 800 x", "when bright light comes in from the behind", or "when the robot is picked out by bright light simultaneously with warning sound" included in "when it is bright" is used. This makes it possible to perform finer control and causality estimation while keeping an error corresponding to the number of experiences small.

When the causality temporally fluctuates, it is possible to cause the conditional probability to follow the temporal fluctuation in the causality by attenuating the numbers of times of simultaneous occurrence of events N(T,ak,b) and N(ak,b) with time.

For example, it is assumed that trials were performed 1000 times in the past (N(ak,b)=1000) and successful 500 times (N(T,ak,b)=500) and P(T|ak,b)=500/1000=0.5. It is now assumed that trials are performed ten times and successful eight times now. When there is no attenuation with time, if the 10 times of the trials are included, P(T|ak,b)=508/1010=0.503. Therefore, even if the trials are successful at a high probability of eight times in ten times compared with the trials in the past, there is almost no influence on a value of P(T|ak,b).

On the other hand, when there is attenuation with time, the conditional probability is calculated by multiplying the numerator and the denominator with an attenuation ratio and evaluated. Therefore, when the attenuation ratio is set to 0.1, P(T|ak,b) calculated according to the trials in the past is in a state of P(T|ak,b)=50/100=0.5. When a latest trial result is reflected on this state, P(T|ak,b)=58/110=0.527 is obtained. If the trials in the past are much older and further attenuated, for example, P(T|ak,b) calculated according to the trials in the past is in a state of P(T|ak,b)=5/10=0.5. When the latest trial result is reflected on this state, P(T|ak,b)=13/20=0.65 is obtained.

In other words, it is possible to impart followability to the latest trial result to P(T|ak,b) (cause a value of P(T|ak,b) to be substantially affected by the latest trial result). Even when the latest trial result is not present, it is possible to directly use a probability estimation value based on experiences in the past by attenuating the numbers of times simultaneous occurrence N(T,ak,b) and N(ak,b) at the same attenuation ratio. Since a value of N(T,ak,b) affecting the calculation of the estimation error decreases according to the elapse of time, the estimation error gradually increases. It is possible to automatically represent a characteristic that the experiences in the past are indefinite compared with recent experiences.

From the viewpoint of model application, the conditional probability P(T|ak,b) is a formula that gives likelihood of a model that "if (ak,b), T:ak→al occurs" under observation T:ak→al (transition T from the event ak to the event al).

On the other hand, when the conditional probability P(T|ak,b) is set as a posterior probability, the conditional probability P(T|ak,b) can also be regarded as a probability that transition T:ak→al occurs when (ak,b) simultaneously occurs. This makes it possible to use the conditional probability P(T|ak,b) for control for causing the transition T. Specifically, if an event b with maximum P(T|ak,b) among all events b can be attained together with the event ak, a probability of occurrence of the transition T is the highest. Therefore, in order to cause the transition T, such an event b only has to be found to determine a behavior.

A disadvantage of this method of determining a behavior is that the method tends to be affected by the estimation error due to the fluctuation in experiences. For example, it is examined which of an event that has been successful five times out of ten times and an event that has been successful 501 times out of 1000 times should be executed. It is possible that, although an actual rate of success of the former event is 0.55, the rate of success looks 0.5 because the event has been successful only five times in the trials performed ten times. If the event is tried once more, the rate of success may rise to 6/11=0.545 or may fall to 5/11=0.455. Under such circumstances, the behavior determination is not successful if the event b with maximum P(T|ak,b) is simply selected. It can be said that there is a disadvantage in this point. This is because a choice unfortunate only in the beginning is totally disadvantageous and has no chance of recovery.

Therefore, in order to solve such disadvantages, an expected value of an error is calculated by using the number of trials in the past and a conditional probability at the present point and the behavior determination is performed optimistically because of the expected value, i.e., a conditional probability is increased by the expected value and used for the behavior determination. In the example explained above, this is close to the idea that a rate of success obtained when the former event is successful in one trial is 6/11=0.545 and, since this is higher than a rate of success of 502/1001=0.501 obtained when the latter event is successful in one trial, the former event is selected. As a result, since the number of trials of the former event increases and the estimation error decreases, accuracy of the behavior determination is improved.

Figure 43:
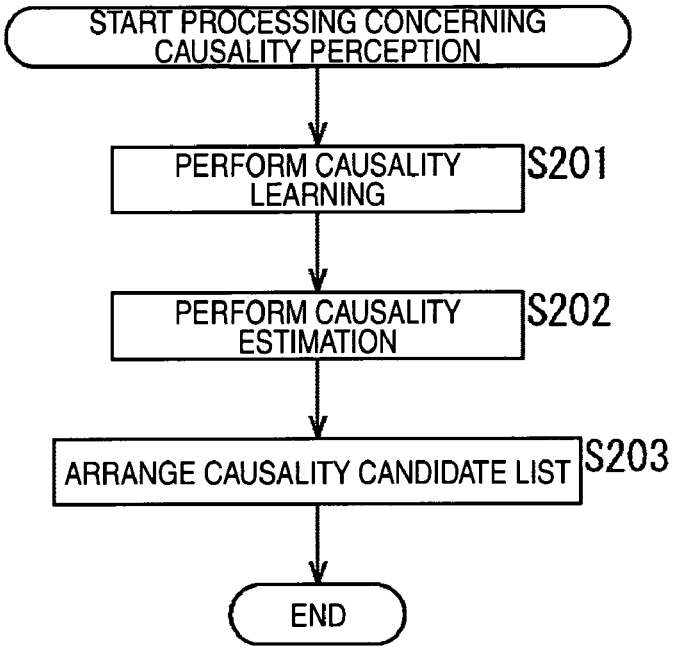
FIG. 43 is a flowchart for explaining processing concerning causality perception of the information processing apparatus.

Processing concerning causality perception performed by the information processing apparatus shown in FIG. 42 is explained with reference to a flowchart of FIG. 43.

In step S201, the causality-learning processing unit 201 acquires HMMs of plural modals and performs causality learning. The causality-learning processing unit 201 outputs data obtained by performing the causality learning to the causality-estimation processing unit 202.

In step S202, the causality-estimation processing unit 202 performs causality estimation using the data supplied from the causality-learning processing unit 201. The causality-estimation processing unit 202 causes the causality-candidate list storing unit 203 to store a causality candidate list representing causality obtained by performing the causality estimation.

In step S203, the causality-candidate-list arrangement processing unit 204 arranges the causality candidate list stored in the causality-candidate-list storing unit 203 and finishes the processing.

The respective kinds of processing are explained below in order.

In the following explanation, it is assumed that M modals in total are present as modals to be set as targets and ith (i=1, 2, . . . , M) modal has $n_m$ states. A state j (j=1, 2, . . . , $n_m$) of the ith modal is represented as $s^i_j$ as appropriate. For example, $S^2_5$ represents that a second modal is in a state 5. A state of the entire system at time t is represented by M-dimensional state vector $S_t=(S^1_{j1},S^2_{j2}, \ldots , S^M_{jM})$.

When it is evident which elements of the respective dimensions indicate which state numbers of the modals, to simplify the explanation, a state of the system is represented by a state vector having the state numbers as elements. For example, when states of the modals 1, 2, and 3 are 5, 7, and 11, respectively, a state vector of the entire system including the modals 1, 2, and 3 is represented by $S=(S^1_5,S^2_7,S^3_{11})=(5,7, 11)$. For example, when attention is directed to the modals 2 and 3, the state vector is represented by $S^{(2,3)}=(S^2_7,S^3_{11})=(7, 11)$.

Figure 44:
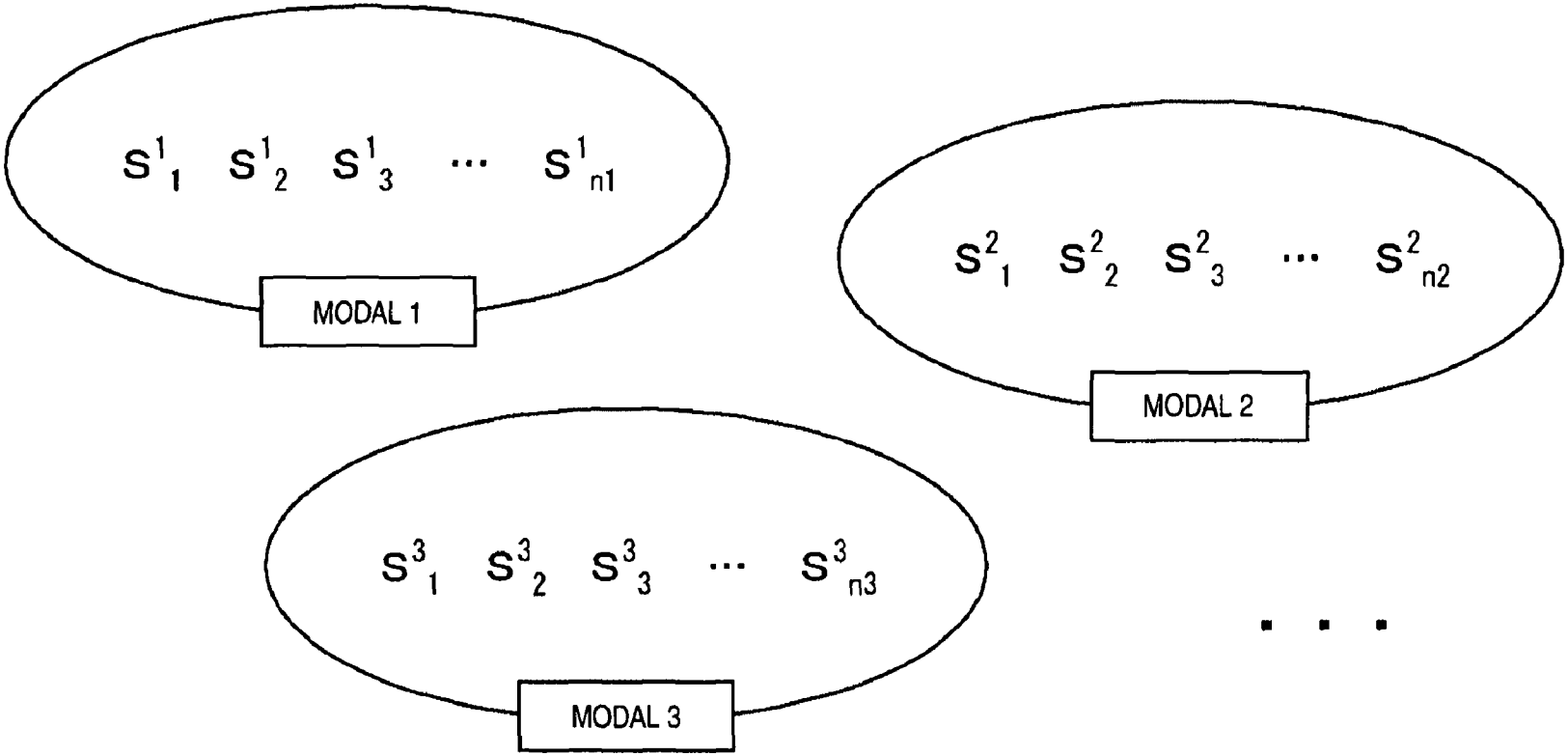
FIG. 44 is a diagram of an example of modals.

FIG. 44 is a diagram of an example of modals.

In the example shown in FIG. 44, three modals, i.e., modals 1 to 3 are shown. A value of M is 3. For example, the modal 1 corresponds to the energy HMM, the modal 2 corresponds to the light HMM, and the modal 3 corresponds to the distance HMM. $S^i_j$ corresponds to nodes of the HMMs.

First, causality learning performed by the causality-learning processing unit 201 is explained.

At time t=0, 0 is set as values of all counters and the counters are initialized. In the causality learning, two counters, i.e., an event occurrence counter and a transition occurrence counter are used. In the following explanation, t is equal to or larger than 1 (t≥1).

The values of all the counters are attenuated according to an attenuation ratio γ decided in advance such as γ=0.999 every time predetermined time elapses.

A state $S_t$ of the entire system at time t and a state $s_{t-1}$, at the immediately preceding time are compared. Modals, states of which change, are listed.

Processing explained below is performed with attention directed to values of L in L=1, 2, . . . , min(M−1,MaxCombi). MaxCombi is a parameter for specifying complication of combinations of modals to be taken into account. An arbitrary natural number can be set as MaxCombi min(M−1,MaxCombi) represents a smaller one of values of M−1 and MaxCombi.

Arbitrary one combination among ${}_MC_{L+1}$ combinations of modals at the time when L+1 modals are selected out of M modals is represented by cM(L+1;). State vectors representing states of respective modals of the arbitrary one combination at time t−1 are represented by $S^{cM(L+1;)}_{t-1}$.

Concerning cM(L+1;) of the respective combinations, the event occurrence counter corresponding to $S^{cM(L+1;)}_{t-1}$ is counted up by 1. The event occurrence counter is a counter for counting the number of times of occurrence of an event represented by a state vector corresponding thereto.

When modals, states of which change, are represented as modals "i", processing explained below is performed with attention directed to the respective modals "i".

Arbitrary one combination among ${}_{M-1}C_L$ combinations of modals at the time when L modals are selected out of M−1 modals other than the modals "i" is represented by cM(L;i). State vectors representing states of respective modals of the arbitrary one combination at time t−1 are represented by $S^{cM(L;i)}_{t-1}$.

Concerning cM(L+1;) of the respective combinations, the event occurrence counter corresponding to $(S^{cM(L;i)}_{t-1}|T^i)$, which is a pair of $S^{CM(L;i)}_{t-1}$ and state transition $T^i_{t-1}=(S^i_{k(t-1)}\rightarrow S^i_{k(t)})$ of the modals "i", is counted up by 1. The transition occurrence counter is a counter for counting the number of times of occurrence of an event represented by a state vector corresponding thereto at timing immediately before occurrence of state transition for calculating causality.

A specific example of the causality learning is explained.

Figure 45:
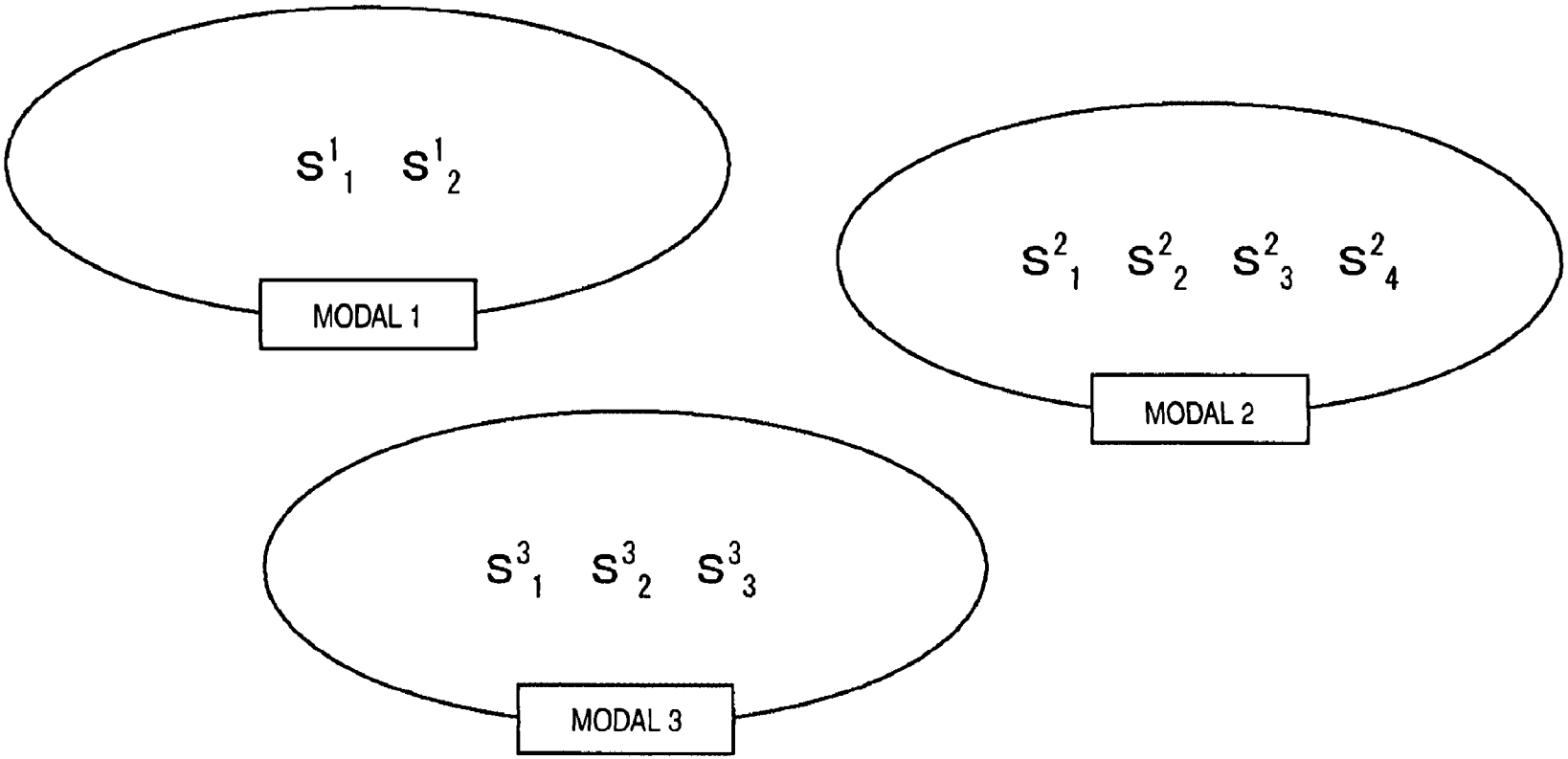
FIG. 45 is a diagram of a specific example of the modals.

As shown in FIG. 45, there are states of the modal 1, i.e., 1 and 2($S^1_1$, $S^1_2$). There are four states of the modal 2, i.e., states 1, 2, 3, 4($S^2_1$,$S^2_2$,$S^2_3$,$S^2_4$). There are three states of the modal 3, i.e., 1, 2, 3($S^3_1$,$S^3_2$,$S^3_3$).

A state of the system changes with time as shown in FIG. 46.

In FIG. 46, state vectors representing states of the respective modals 1 to 3 observed between t=0 and t=5 are shown. A number 1 at the top of the state vector at the left end representing a state at t=0 represents that a state of the modal 1 is the state 1. A number 1 in the middle represents that a state of the modal 2 is the state 1. A number 1 at the bottom represents that a state of the modal 3 is the state 1.

FIGS. 47A to 47D are diagrams of examples of event occurrence counters.

When a value of L is set to 1 or 2, ${}_MC_{L+1}$, combinations of modals at the time when L+1 modals are selected out of the three modals are {1, 2}, {1, 3}, {2, 3}, and {1, 2, 3} as shown on the left side. The combinations of modals {1, 2}, {1, 3}, {2, 3}, {1, 2, 3} correspond to cM(L+1;) explained above.

When attention is directed to the combinations of modals {1, 2}, if elements of the modal 3 not included in the combination of attention are represented by "−" as shown in FIG. 47A, there are eight state vectors that could be taken, i.e., [1 1 −], [1 2 −], [1 3 −], [1 4 −], [2 1 −], [2 2 −], [2 3 −] and [2 4 −]. The elements are arranged horizontally to indicate the state vectors.

Similarly, the number of state vectors that could be taken is a number obtained by multiplying the number of elements with the number of states of the modals included in the combination of attention. Therefore, when attention is directed to modals {1, 3}, the number of state vectors that could be taken is six as shown in FIG. 47B. When attention is directed to the combination of the modals {2, 3}, the number of state vectors that could be taken is twelve as shown in FIG. 47C. When attention is directed to the combination of the modals {1, 2, 3}, the number of state vectors that can be taken is twenty-four as shown in FIG. 47D.

Event occurrence counters are prepared in association with the respective state vectors. Therefore, in the case of this example, fifty event occurrence counters are prepared in total.

FIGS. 48A to 48C are diagrams of examples of transition generation occurrence counters prepared in association with respective state transitions of the modal 1.

As shown in FIG. 49, the transition occurrence counters shown in FIGS. 48A to 48C are prepared in association with, 60 for example, bidirectional state transition between the states 1 and 2 of the modal 1.

When a value of L is set to 1 or 2, arbitrary one combination among ${}_{M-1}C_L$ combinations of modals at the time when L modals are selected out of modals other than the modal 1 is each of {2}, {3}, and {2, 3} as shown on the left side of FIGS. 48A to 48C. The respective combinations of modals correspond to cM(L;i) explained above.

When attention is directed to the combination of the modal {2}, if elements of the modal 1 excluded from the combination of the modals are represented by "*" and elements of the modal 3 not included in the combination of attention are represented by "−", as shown in FIG. 48A, there are four state vectors that could be taken, i.e., [* 1 −], [* 2 −], [* 3 −], and [* 4 −].

Similarly, when attention is directed to the combination of the modal {3}, as shown in FIG. 48B, there are three state vectors that could be taken. When attention is directed to the combination of the modals {2, 3}, as shown in FIG. 48C, there are twelve state vectors that could be taken.

In the case of this example, nineteen transition occurrence counters are prepared in total in association with respective state transitions of the modal 1.

FIGS. 50A to 50C are diagrams of examples of transition occurrence counters prepared in association with respective state transitions of the modal 2.

Figure 51:
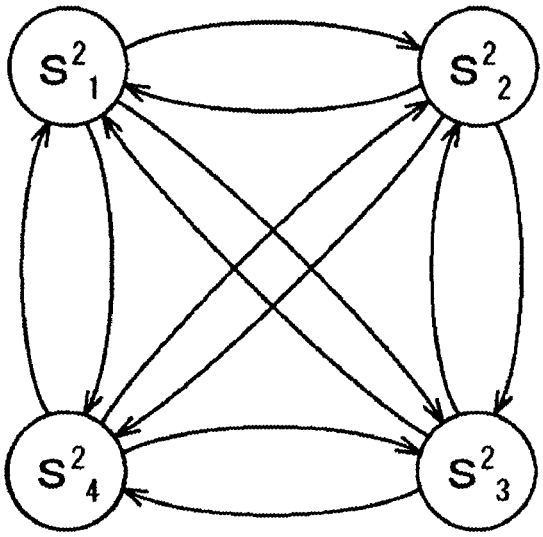
FIG. 51 is a diagram of an example of state transitions of the modal 2.

As shown in FIG. 51, the transition occurrence counters shown in FIGS. 50A to 50C are prepared in association with bidirectional state transitions between the states 1 and 2, between the states 2 and 3, between the states 3 and 4, between the states 4 and 1, between the states 1 and 3, and between the states 2 and 4 of the modal 2.

When a value of L is set to 1 or 2, arbitrary one combination among ${}_{M-1}C_L$ combinations of modals at the time when L modals are selected out of modals other than the modal 2 is each of {1}, {3}, and {1, 3} as shown on the left side of FIGS. 50A to 50C.

When attention is directed to the combination of the modal {1}, if elements of the modal 2 excluded from the combination of the modals are represented by "*" and elements of the modal 3 not included in the combination of attention are represented by "−", as shown in FIG. 50A, there are two state vectors that could be taken, i.e., [1 * −] and [2 * −].

Similarly, when attention is directed to the combination of the modal {3}, as shown in FIG. 50B, there are three state vectors that could be taken. When attention is directed to the combination of the modals {1, 3}, as shown in FIG. 50C, there are six state vectors that could be taken.

In the case of this example, eleven transition occurrence counters are prepared in total in association with respective state transitions of the modal 2.

FIGS. 52A to 52C are diagrams of examples of transition occurrence counters prepared in association with respective state transitions of the modal 3.

As shown in FIG. 53, the transition occurrence counters shown in FIGS. 52A to 52C are prepared in association with bidirectional state transitions between the states 1 and 2, between the states 2 and 3, and between the states 3 and 1 of the modal 3.

When a value of L is set to 1 or 2, arbitrary one combination among ${}_{M-1}C_L$ combinations of modals at the time when L modals are selected out of modals other than the modal 3 is each of {1}, {2}, and {1, 2} as shown on the left side of FIGS. 52A to 52C.

When attention is directed to the combination of the modal {1}, if elements of the modal 3 excluded from the combination of the modals are represented by "*" and elements of the modal 2 not included in the combination of attention are represented by "–", as shown in FIG. 52A, there are two state vectors that could be taken, i.e., [1 –*] and [2 –*].

Similarly, when attention is directed to the combination of the modal {2}, as shown in FIG. 52B, there are four state vectors that could be taken. When attention is directed to the combination of the modals {1, 2}, as shown in FIG. 52C, there are eight state vectors that could be taken.

In the case of this example, fourteen transition occurrence counters are prepared in total in association with respective state transitions of the modal 3.

In this way, the transition occurrence counter is prepared to associate respective state transitions of a certain modal and all combinations of states of the other modals.

In a state in which such event occurrence counters and transition occurrence counters are prepared, when the time t reaches 1 and the state of the system transitions from [1 1 1] to [1 2 1] as shown in FIG. 46, a state at t=1 and a state at t=0 immediately preceding the time t are compared. The modal 2, a state of which changes, is listed.

The event occurrence counters are counted up.

Attention is directed to each of {1, 2}, {1, 3}, {2, 3}, and {1, 2, 3}, which is arbitrary one combination, among ${}_{M}C_{L+1}$ combinations of modals. Even occurrence counters corresponding to state vectors representing states at the immediately preceding time of modals included in the combination of attention are counted up by 1. The state vectors representing the states at the immediately preceding time of the modals included in the combination of attention correspond to $S^{cM(L+1;)}_{t-1}$ explained above.

When attention is directed to the combination of the modals {1, 2}, states of the modals 1 and 2 at the immediately preceding time t=0 are 1. Therefore, the event occurrence counter corresponding to [1 1 –] among the eight state vectors shown in FIG. 47A is counted up by 1.

When attention is directed to the combination of the modals {1, 3}, states of the modals 1 and 3 at the immediately preceding time t=0 are 1. Therefore, the event occurrence counter corresponding to [1 – 1] among the six state vectors shown in FIG. 47B is counted up by 1.

When attention is directed to the combination of the modals {2, 3}, states of the modals 2 and 3 at the immediately preceding time t=0 are 1. Therefore, the event occurrence counter corresponding to [–1 1] among the twelve state vectors shown in FIG. 47C is counted up by 1.

When attention is directed to the combination of the modals {1, 2, 3}, states of the modals 1, 2, and 3 at the immediately preceding time t=0 are 1. Therefore, the event occurrence counter corresponding to [1 1 1] among the twenty-four state vectors shown in FIG. 47D is counted up by 1.

In this way, when the state of the system transitions from [1 1 1] to [1 2 1], as shown in FIG. 54A, the event occurrence counters corresponding to [1 1 –], [1 – 1], [– 1 1], and [1 1 1] are counted up by 1.

Further, the transition occurrence counters are counted up.

First, attention is directed to each of {1}, {3}, and {1, 3}, which is arbitrary one combination, among ${}_{M-1}C_L$ combinations of modals at the time when L modals are selected out of the modals other than the modal 2, a state of which changes. Pairs of state vectors representing states at the immediately preceding time of the modals included in the combination of attention and state transition (1→2) of the modal 2 are calculated.

The calculated pairs represent state vectors representing states at the immediately preceding time of the modals included in the combination of attention associated with the state transition (1→2) of the modal 2. As explained with reference to FIGS. 50A to 50C, state vectors are associated with the respective state transitions of the modal 2. State vectors representing states at the immediately preceding time of the modals included in the combination of attention correspond to $S^{cM(L;i)}_{t-1}$ and the pairs correspond to $(S^{cM(L;i)}_{t-1}|T^i)$.

The transition occurrence counters (FIGS. 50A to 50C) associated with the state vectors representing the states at the immediately preceding time of the modals included in the combination of attention associated with the state transition (1→2) of the modal 2 are counted up by 1.

When attention is directed to the combination of the modal {1}, a state of the modal 1 at the immediately preceding time t=0 is 1. Therefore, the transition occurrence counter corresponding to [1 * –] of the two transition occurrence counters associated with the state transition (1→2) of the modal 2 shown in FIG. 50A is counted up by 1.

When attention is directed to the combination of the modal {3}, a state of the modal 3 at the immediately preceding time t=0 is 1. Therefore, the transition occurrence counter corresponding to [– * 1] among the three transition occurrence counters associated with the state transition (1→2) of the modal 2 shown in FIG. 50B is counted up by 1.

When attention is directed to the combination of the modals {1, 3}, states of the modals 1 and 3 at the immediately preceding time t=0 are 1. Therefore, the transition occurrence counter corresponding to [1 * 1] of the six transition occurrence counter associated with the state transition (1→2) of the modal 2 shown in FIG. 50C is counted up by 1.

In this way, when the state of the system transitions from [1 1 1] to [1 2 1], as shown in FIG. 54B, the transition occurrence counters corresponding to [1 * –], [– * 1], and [1 * 1] associated with the state transition (1→2) of the modal 2 are counted up by 1.

Similarly, when the time t reaches 2, a state at t=2 and a state at the immediately preceding time t=1 are compared. A modal, a state of which changes, is determined as not present. As shown in FIG. 46, a state of the system at t=2 is [1 2 1], which is the same as a state of the system at t=1.

The event occurrence counters are counted up.

Attention is directed to each of {1, 2}, {1, 3}, {2, 3}, and {1, 2, 3}, which is arbitrary one combination, among ${}_{M}C_{L+1}$ combinations of modals at the time when L+1 modals are selected out of three modals. The event occurrence counters corresponding to state vectors representing states at the immediately preceding time of the modals included in the combination of attention are counted up by 1.

When attention is directed to the combination of the modals {1, 2}, a state of the modal 1 at the immediately preceding time t=1 is 1 and a state of the modal 2 at t=1 is 2. Therefore, the event occurrence counter corresponding to [1 2 −] among the eight state vectors shown in FIG. 47A is counted up by 1.

When attention is directed to the combination of the modals {1, 3}, states of the modals 1 and 3 at the immediately preceding time t=1 are 1. Therefore, the event occurrence counter corresponding to [1 − 1] among the six state vectors shown in FIG. 47B is counted up by 1.

When attention is directed to the combination of the modals {2, 3}, a state of the modal 2 at the immediately preceding time t=1 is 2 and a state of the modal 3 at t=1 is 1. Therefore, the event occurrence counter corresponding to [− 2 1] among the twelve state vectors shown in FIG. 47C is counted up by 1.

When attention is directed to the combination of the modals {1, 2, 3}, a state of the modal 1 at the immediately preceding time t=1 is 1, a state of the modal 2 at t=1 is 2, and a state of the modal 3 at t=1 is 3. Therefore, the event occurrence counter corresponding to [1 2 1] among the twenty-four state vectors shown in FIG. 47D is counted up by 1.

In this way, when the state of the system stays in [1 2 1], as shown in FIG. 55, the event occurrence counters of [1 2 −], [1 − 1], [−2 1], and [1 2 1] are counted up by one.

When the time t reaches 3 and the state of the system transitions from [1 2 1] to [2 2 1] as shown in FIG. 46, a state at t=3 and a state at t=2 immediately preceding the time t=3 are compared. The modal 1, a state of which changes, is listed.

The event occurrence counters are counted up.

Attention is directed to each of {1, 2}, {1, 3}, {2, 3}, and {1, 2, 3}, which is arbitrary one combination, among ${}_{M}C_{L+1}$ combinations of modals at the time when L+1 modals are selected out of the three modals. Even occurrence counters corresponding to state vectors representing states at the immediately preceding time of modals included in the combination of attention are counted up by 1.

When attention is directed to the combination of the modals {1, 2}, a state of the modal 1 at the immediately preceding time t=2 are 1 and a state of the modal 2 at t=2 is 2. Therefore, the event occurrence counter corresponding to [1 2 −] among the eight state vectors shown in FIG. 47A is counted up by 1.

When attention is directed to the combination of the modals {1, 3}, states of the modals 1 and 3 at the immediately preceding time t=2 are 1. Therefore, the event occurrence counter corresponding to [1 − 1] among the six state vectors shown in FIG. 47B is counted up by 1.

When attention is directed to the combination of the modals {2, 3}, a state of the modal 2 at the immediately preceding time t=2 is 2 and a state of the modal 3 at t=2 is 1. Therefore, the event occurrence counter corresponding to [− 2 1] among the twelve state vectors shown in FIG. 47C is counted up by 1.

When attention is directed to the combination of the modals {1, 2, 3}, a state of the modal 1 at the immediately preceding time t=2 is 1, a state of the modal 2 at t=2 is 2, and a state of the modal 3 at t=2 is 1. Therefore, the event occurrence counter corresponding to [1 2 1] among the twenty-four state vectors shown in FIG. 47D is counted up by 1.

In this way, when the state of the system transitions from [1 2 1] to [2 2 1], as shown in FIG. 56A, the event occurrence counters of [1 2 −], [1 − 1], [− 2 1], and [1 2 1] are counted up by 1.

Further, the transition occurrence counters are counted up.

First, attention is directed to each of {2}, {3}, and {2, 3}, which is arbitrary one combination, among ${}_{M-1}C_{L}$ combinations of modals at the time when L modals are selected out of the modals other than the modal 1, a state of which changes. Pairs of state vectors representing states at the immediately preceding time of the modals included in the combination of attention and state transition (1→2) of the modal 1 are calculated.

The transition occurrence counters (FIGS. 48A to 48C) associated with the state vectors representing the states at the immediately preceding time of the modals included in the combination of attention associated with the state transition (1→2) of the modal 1 are counted up by 1.

When attention is directed to the combination of the modal {2}, a state of the modal 2 at the immediately preceding time t=2 is 2. Therefore, the transition occurrence counter corresponding to [* 2 −] among the four transition occurrence counters associated with the state transition (1→2) of the modal 1 shown in FIG. 48A is counted up by 1.

When attention is directed to the combination of the modal {3}, a state of the modal 3 at the immediately preceding time t=2 is 1. Therefore, the transition occurrence counter corresponding to [*− 1] among the three transition occurrence counters associated with the state transition (1→2) of the modal 1 shown in FIG. 48B is counted up by 1.

When attention is directed to the combination of the modals {2, 3}, a state of the modal 2 at the immediately preceding time t=2 is 2 and a state of the modal 3 at t=2 is 1. Therefore, the transition occurrence counter corresponding to [*2 1] among the twelve transition occurrence counters associated with the state transition (1→2) of the modal 1 shown in FIG. 48C is counted up by 1.

In this way, when the state of the system transitions from [1 2 1] to [2 2 1], as shown in FIG. 56B, the transition occurrence counters corresponding to [*2 −], [* −1], and [* 2 1] are counted up by 1.

When the time t reaches 4 and the state of the system transition from [2 2 1] to [2 4 3] as shown in FIG. 46, a state at t=4 and a state at t=3 immediately preceding the time t=4 are compared. The modals 2 and 3, states of which change, are listed.

The event occurrence counters are counted up.

Attention is directed to each of {1, 2}, {1, 3}, {2, 3}, and {1, 2, 3}, which is arbitrary one combination, among ${}_{M}C_{L+1}$ combinations of modals at the time when L+1 modals are selected out of the three modals. Even occurrence counters corresponding to state vectors representing states at the immediately preceding time of modals included in the combination of attention are counted up by 1.

When attention is directed to the combination of the modals {1, 2}, states of the modals 1 and 2 at the immediately preceding time t=3 are 2. Therefore, the event occurrence counter corresponding to [2 2 −] among the eight state vectors shown in FIG. 47A is counted up by 1.

When attention is directed to the combination of the modals {1, 3}, a state of the modal 1 at the immediately preceding time t=3 is 2 and a state of the modal 3 at t=3 is 1. Therefore, the event occurrence counter corresponding to [2 − 1] among the six state vectors shown in FIG. 47B is counted up by 1.

When attention is directed to the combination of the modals {2, 3}, a state of the modal 2 at the immediately preceding time t=3 is 2 and a state of the modal 3 at t=3 is 1. Therefore, the event occurrence counter corresponding to [−2 1] among the twelve state vectors shown in FIG. 47C is counted up by 1.

When attention is directed to the combination of the modals {1, 2, 3}, a state of the modal 1 at the immediately preceding time t=3 is 2, a state of the modal 2 at t=3 is 2, and a state of the modal 3 at t=3 is 1. Therefore, the event occurrence counter corresponding to [2 2 1] among the twenty-four state vectors shown in FIG. 47D is counted up by 1.

In this way, when the state of the system transitions from [2 2 1] to [2 4 3], as shown in FIG. 57A, the event occurrence counters corresponding to [2 2 −], [2 −1], [− 2 1], and [2 2 1] are counted up by 1.

Further, the transition occurrence counters are counted up. When two modals are listed, the same processing is repeated for the respective modals.

First, attention is directed to each of {1}, {3}, and {1, 3}, which is arbitrary one combination, among ${}_{M-1}C_L$ combinations of modals at the time when L modals are selected out of the modals other than the modal 2, a state of which changes. Pairs of state vectors representing states at the immediately preceding time of the modals included in the combination of attention and state transition (2→4) of the modal 2 are calculated.

The transition occurrence counters (FIGS. 50A to 50C) associated with the state vectors representing the states at the immediately preceding time of the modals included in the combination of attention associated with the state transition (2→4) of the modal 2 are counted up by 1.

When attention is directed to the combination of the modal {1}, a state of the modal 1 at the immediately preceding time t=3 is 2. Therefore, the transition occurrence counter corresponding to [2 * −] of the two transition occurrence counters associated with the state transition (2→4) of the modal 2 shown in FIG. 50A is counted up by 1.

When attention is directed to the combination of the modal {3}, a state of the modal 3 at the immediately preceding time t=3 is 1. Therefore, the transition occurrence counter corresponding to [− * 1] among the three transition occurrence counters associated with the state transition (2→4) of the modal 2 shown in FIG. 50B is counted up by 1.

When attention is directed to the combination of the modals {1, 3}, a state of the modal 1 at the immediately preceding time t=3 is 2 and a state of the modal 3 at t=3 is 1. Therefore, the transition occurrence counter corresponding to [2 * 1] of the six transition occurrence counters associated with the state transition (2→4) of the modal 2 shown in FIG. 50C is counted up by 1.

Subsequently, attention is directed to each of {1}, {2}, and {1, 2}, which is arbitrary one combination, among ${}_{M-1}C_L$ combinations of modals at the time when L modals are selected out of the modals other than the modal 3, a state of which changes. Pairs of state vectors representing states at the immediately preceding time of the modals included in the combination of attention and state transition (1=3) of the modal 3 are calculated.

The transition occurrence counters (FIGS. 52A to 52C) associated with the state vectors representing the states at the immediately preceding time of the modals included in the combination of attention associated with the state transition (1→3) of the modal 3 are counted up by 1.

When attention is directed to the combination of the modal {1}, a state of the modal 1 at the immediately preceding time t=3 is 2. Therefore, the transition occurrence counter corresponding to [2 * −] of the two transition occurrence counters associated with the state transition (1→3) of the modal 3 shown in FIG. 52A is counted up by 1.

When attention is directed to the combination of the modal {2}, a state of the modal 2 at the immediately preceding time t=3 is 2. Therefore, the transition occurrence counter corresponding to [*2 −] among the four transition occurrence counters associated with the state transition (1→3) of the modal 3 shown in FIG. 52B is counted up by 1.

When attention is directed to the combination of the modals {1, 2}, states of the modals 1 and 2 at the immediately preceding time t=3 are 2. Therefore, the transition occurrence counter corresponding to [2 2 −] among the eight transition occurrence counters associated with the state transition (1→3) of the modal 3 shown in FIG. 52C is counted up by 1.

In this way, when the state of the system transitions from [2 2 1] to [2 4 3], as shown on the left side of in FIG. 57B, concerning the state transition (2→4) of the modal 2, the event occurrence counters corresponding to [2* −], [− * 1], and [2 * 1] associated with the state transition (2→4) of the modal 2 are counted up by 1. As shown on the right side of FIG. 57B, concerning the state transition (1→3) of the modal 3, the event occurrence counters corresponding to [2 −*], [− 2 *], and [2 2 −] associated with the state transition (1→3) of the modal 3 are counted up by 1.

When the time t reaches 5 and the state of the system transition from [2 4 3] to [3 4 3] as shown in FIG. 46, a state at t=5 and a state at t=4 immediately preceding the time t=5 are compared. The modal 1, a state of which changes, is listed.

The event occurrence counters are counted up.

Attention is directed to each of {1, 2}, {1, 3}, {2, 3}, and {1, 2, 3}, which is arbitrary one combination, among ${}_{M}C_{L+1}$ combinations of modals at the time when L+1 modals are selected out of the three modals. Even occurrence counters corresponding to state vectors representing states at the immediately preceding time of modals included in the combination of attention are counted up by 1.

When attention is directed to the combination of the modals {1, 2}, a state of the modal 1 at the immediately preceding time t=4 is 2 and a state of the modal 2 at t=4 is 4. Therefore, the event occurrence counter corresponding to [2 4 −] among the eight state vectors shown in FIG. 47A is counted up by 1.

When attention is directed to the combination of the modals {1, 3}, a state of the modal 1 at the immediately preceding time t=4 is 2 and a state of the modal 3 at t=4 is 3. Therefore, the event occurrence counter corresponding to [2 − 3] among the six state vectors shown in FIG. 47B is counted up by 1.

When attention is directed to the combination of the modals {2, 3}, a state of the modal 2 at the immediately preceding time t=4 is 4 and a state of the modal 3 at t=4 is 3. Therefore, the event occurrence counter corresponding to [−4 3] among the twelve state vectors shown in FIG. 47C is counted up by 1.

When attention is directed to the combination of the modals {1, 2, 3}, a state of the modal 1 at the immediately preceding time t=4 is 2, a state of the modal 2 at t=4 is 4, and a state of the modal 3 at t=4 is 3. Therefore, the event occurrence counter corresponding to [2 4 3] among the twenty-four state vectors shown in FIG. 47D is counted up by 1.

In this way, when the state of the system transitions from [2 4 3] to [3 4 3], as shown in FIG. 58A, the event occurrence counters corresponding to [2 4 −], [2 − 3], [− 4 3] and [2 4 3] are counted up by 1.

Further, the transition occurrence counters are counted up.

First, attention is directed to each of {2}, {3}, and {2, 3}, which is arbitrary one combination, among ${}_{M-1}C_L$ combinations of modals at the time when L modals are selected out of the modals other than the modal 1, a state of which changes. Pairs of state vectors representing states at the immediately preceding time of the modals included in the combination of attention and state transition (2→3) of the modal 1 are calculated.

The transition occurrence counters (FIGS. 48A to 48C) associated with the state vectors representing the states at the immediately preceding time of the modals included in the combination of attention associated with the state transition (2→3) of the modal 1 are counted up by 1.

When attention is directed to the combination of the modal {2}, a state of the modal 2 at the immediately preceding time t=4 is 4. Therefore, the transition occurrence counter corresponding to [* 4 −] among the four transition occurrence counters associated with the state transition (2→3) of the modal 1 shown in FIG. 48A is counted up by 1.

When attention is directed to the combination of the modal {3}, a state of the modal 3 at the immediately preceding time t=4 is 3. Therefore, the transition occurrence counter corresponding to [* − 3] among the three transition occurrence counters associated with the state transition (2→3) of the modal 1 shown in FIG. 48B is counted up by 1.

When attention is directed to the combination of the modals {2, 3}, a state of the modal 2 at the immediately preceding time t=4 is 4 and a state of the modal 3 at t=4 is 3. Therefore, the transition occurrence counter corresponding to [* 4 3] among the twelve transition occurrence counters associated with the state transition (2→3) of the modal 1 shown in FIG. 48C is counted up by 1.

In this way, when the state of the system transitions from [2 4 3] to [3 4 3], as shown in FIG. 58B, the transition occurrence counters corresponding to [*4 −], [* −3], and [*4 3] are counted up by 1.

The causality learning is advanced by repeating the processing explained above. Information representing values of the event occurrence counters and values of the transition occurrence counters obtained by the causality learning is supplied from the causality-learning processing unit 201 to the causality-estimation processing unit 202.

The causality estimation performed by the causality-estimation processing unit 202 is explained.

When causality of state transition $T^i=(S^i_k \rightarrow S^i_{k'})$ in the modal "i" is estimated, processing explained below is performed with attention directed to values of L in L=1, 2, . . . , min(M−1,MaxCombi).

Arbitrary one combination among ${}_{M-1}C_L$ combinations of modals at the time when L modals are selected out of M−1 modals other than the modal "i" is represented as cM(L;i). A state vector pattern corresponding to cM(L;i) is represented as $S^{cM(L;i)}$.

When respective state vectors of the state vector pattern $S^{cM(L;i)}$ is represented as $S^{cM(L;i)}_j$, a conditional probability $P(T^i|S^{cM(L;i)}_j)$ of the state transition $T^i$ is calculated for the respective state vectors $S^{cM(L;i)}_j$.

Specifically, Specifically, $S^i_k$ as a state of a transition source of the modal "i" is added as an element of the state vector $S^{cM(L;i)}_j$, whereby a state vector $(S^i_k, S^{cM(L;i)}_j)$ is generated and a value $N_S$ of an event occurrence counter corresponding to the generated state vector $(S^i_k, S^{cM(L;i)}_j)$ is acquired.

When the value $N_S$ of the event occurrence counter corresponding to the state vector $(S^i_k, S^{cM(L;i)}_j)$ is 0, a conditional probability $P(T^i|S^{cM(L;i)}_j)$ of a state transition $T_i$ corresponding to the state vector $S^{cM(L;i)}_j$ is set as $\sigma_0$. $\sigma_0$ is a fixed value equal to or larger than 0 and equal to or smaller than 1 that gives a minimum probability.

On the other hand, when the value $N_S$ of the event occurrence counter corresponding to the state vector $(S^i_k, S^{cM(L;i)}_j)$ is equal to or larger than 1, a value $N_T$ of a transition occurrence counter corresponding to $(T^i|S^{cM(L;i)}_j)$ is acquired. $(T^i|S^{cM(L;i)}_j)$ represents a state vector $S^{cM(L;i)}_j$ associated with the state transition $T^i$.

A provisional probability value $p_0=N_T/N_S$ is calculated by dividing the value $N_T$ of the transition occurrence counter by the value $N_S$ of the event occurrence counter.

When a value σ is represented by the following Formula (2) by using the provisional probability value $p_0$ and the value $N_S$ of the event occurrence counter, the conditional probability $P(T^i|S^{cM(L;i)}_j)$ of the state transition $T^i$ with respect to the state vector $S^{cM(L;l)}_j$ is represented by Formula (3) below. In Formula (3), min represents that a smaller value of 1 and $p_0+\sigma$ is set as a conditional probability P.

$$\sigma = \sqrt{\frac{p_0(1-p_0)+\sigma_0^2}{N_S}} \tag{2}$$

$$P = \min\left(1,\ p_0 + \sqrt{\frac{p_0(1-p_0)+\sigma_0^2}{N_S}}\right) \tag{3}$$

Adding the value a to the provisional probability value $p_0$ represents setting a value obtained by optimistically considering an estimation error of a probability based on experiences as a final conditional probability P.

Besides, it is also possible to correct the conditional probability P to 0.5 according to Formula (4) below. Correction for setting $p+\alpha\sigma$ as the conditional probability P is also possible.

$$p=\max(0.5,p-\sigma)\ \ldots\ p>0.5$$

$$p=\min(0.5,p+\sigma)\ \ldots\ \text{otherwise} \tag{4}$$

An event of the state transition as the target of estimation of causality is an event having two values, i.e., whether the event occurs or not. Therefore, the event can be modeled by the Beroulli trial of the occurrence probability p. For example, the occurrence probability p=N(X,T)/N(X) obtained from N(X) times of sampling is considered to have an estimation error of an expected value $\sqrt{p(1-p)/N(X)}$. Therefore, a probability increased by the value σ calculated in the same manner is calculated as the final conditional probability P. However, since an estimation error is 0 at P=0 or P=1, in practice, the value σ as an estimation error is calculated by using an appropriate parameter σ0.

When the conditional probability $P(T^i|S^{cM(L;i)}_j)$ equal to or larger than a threshold is calculated, the state vector $S^{cM(L;i)}_j$ as the target is registered in the causality candidate list together with the conditional probability $P(T^i|S^{cM(L;i)}_j)$. The causality candidate list is a list of the state vector $S^{cM(L;i)}_j$ having causality with the state transitions $T^i$. The state vector $S^{cM(L;i)}_j$ is associated for each of state transitions $T^i$ in order from one having a highest conditional probability $P(T^i|S^{cM}(L;i)_j)$. A state represented by the state vector $S^{cM(L;i)}_j$ is a causality candidate of the state transition T'.

A specific example of the causality estimation is explained.

In the following explanation, a state vector having causality with the state transition (1→2) of the modal 2 is estimated.

The state vector having the causality with the state transition (1→2) of the modal 2 is a state vector representing states of both the modal 1 and the modal 3 or a state vector representing one of the modal 1 and the modal 3. Therefore, when a value of L is set to 1 or 2 and arbitrary one combination of ${}_{M-1}C_L$ combinations of modals at the time when L modals are selected out of the modals other than the modal 2 are considered, the combinations are {1}, {3}, and {1, 3}. The respective combinations of the modals correspond to cM (L;i).

As shown in FIGS. 59A to 59C, patterns of two state vectors corresponding to {1}, patterns of three state vectors corresponding to {3}, and patterns of six state vectors corresponding to {1, 3} correspond to the state vector pattern ScM(L;i) corresponding to cM(L;i). The state vectors shown in FIGS. 59A to 59C are the same as those shown in FIGS. 50A to 50C.

For example, [1 * −] or [2 * −] of patterns of two state vectors [1 * −] and [2 * −] corresponding to {1} corresponds to the state vector $S^{cM(L;i)}_j$. The following processing is performed with respective eleven state vectors $S^{cM(L;i)}_j$ shown in FIGS. 59A to 59C set as targets. A conditional probability representing causality with the state transition (1→2) of the modal 2 is calculated.

For example, in the following explanation, a conditional probability of the state transition (1→2) of the modal 2 with respect to the state vectors [1 * −] and [1 * 1] shown in FIG. 60A among the eleven state vectors shown in FIGS. 59A to 59C is calculated.

When attention is directed to [1 * −], as shown on the left side of FIG. 60B, 1 indicating a state of a transition source of the modal 2 is added as an element of [1 * −], whereby [1 1 −] is generated. [1 1 −] corresponds to $(S^i, S^{cM(L;i)}_j)$.

The value $N_S$ (FIGS. 47A to 47D) of an event occurrence counter corresponding to [1 1 −] is acquired. The value $N_S$ represents the number of times the state 1 of the modal 1 and the state 1 of the modal 2 simultaneously occur. The value $N_S$ is acquired by causality learning.

After the value $N_S$ of the even occurrence counter corresponding to [1 1 −] is acquired, the value $N_T$ (the left side of FIG. 60C and FIG. 50A) of a transition occurrence counter corresponding to [1 * −] prepared in association with the state transition (1→2) of the modal 2 is acquired. The value $N_T$ of the transition occurrence counter represents the number of times the state 1 of the modal 1 and the state 1 of the modal 2 simultaneously occur immediately before time when the state transition (1→2) of the modal 2 occurs. The value $N_T$ is acquired by causality learning.

A conditional probability of the state transition (1→2) of the modal 2 with respect to [1 * −] is calculated on the basis of the value $N_S$ of the event occurrence counter and the value $N_T$ of the transition occurrence counter. When the value $N_S$ of the event occurrence counter is 0, $\sigma_0$ is calculated as the conditional probability. When the value $N_S$ of the event occurrence counter is equal to or larger than 1, the conditional probability is calculated according to Formula (3).

Similarly, when attention is directed to [1 * 1], as shown on the right side of FIG. 60B, 1 indicating a state of a transition source of the modal 2 is added as an element of [1 * 1], whereby [1 1 1] is generated.

The value $N_S$ of an event occurrence counter corresponding to [1 1 1] and the value $N_T$ of a transition occurrence counter corresponding to [1 * 1] (the right side of FIG. 60C and FIG. 50C) prepared in association with the state transition (1→2) of the modal 2 are acquired.

A conditional probability of the state transition (1→2) of the modal 2 with respect to [1 * 1] is calculated on the basis of the value $N_S$ of the event occurrence counter and the value $N_T$ of the transition occurrence counter.

The conditional probability calculated as explained above is registered in the causality candidate list in association with the state vectors as appropriate and stored in the causality-candidate-list storing unit 203.

Arrangement of the causality candidate list performed by the causality-candidate-list arrangement processing unit 204 is explained.

The arrangement of the causality candidate list is merging of the state vectors registered in the causality candidate list. The arrangement of the causality candidate list corresponds to controlling the event b by, for example, changing granularity to keep N(T,ak,b) at a value in an appropriate range. The arrangement of the causality candidate list is performed at predetermined timing.

A state vector $S^{cM(L;)}_k$ defined as a pair of specific states in L modals is discussed below.

Possibility of merging is determined between the state vector $S^{cM(L;)}_k$ and a state vector $(S^{cM(L;)}_k, S^i_j)$ obtained by adding a specific state $S^i_j$ of the modal "i", which is one modal not included in the L modals, to the state vector $S^{cM(L;)}_k$. The state vector $S^{cM(L;)}_k$ and the state vector $(S^{cM(L;)}_k, S^i_j)$ are state vectors registered in the causality candidate list in association with a conditional probability of the same state transition.

The state vector $(S^{cM(L;)}_k, S^i_j)$ is a state vector obtained by adding $S^i_j$ to the state vector $S^{cM(L;)}_k$. Therefore, it can be said that, conceptually, the state vector $S^{cM(L;)}_k$ is a state vector higher in order than the state vector $(S^{cM(L;)}_k, S^i_j)$. The determination of possibility of merging is determination concerning whether the low order state vector is included in the high order state vector and considered the same.

A conditional probability P of target state transition with respect to the state vector $S^{cM(L;)}_k$ is represented by Formula (5). A conditional probability P' of the same state transition with respect to the state vector $(S^{cM(L;)}_k, S^i_j)$ is represented by Formula (6).

$$P = p_0 + \sigma = p_0 + \sqrt{\frac{p_0(1-p_0)+\sigma_0^2}{N_S}} \tag{5}$$

$$P' = p'_0 + \sigma' = p'_0 + \sqrt{\frac{p'_0(1-p'_0)+\sigma_0^2}{N'_S}} \tag{6}$$

In this case, determination of possibility of merging of both the state vectors is performed according to Formula (7). α is an appropriate merging coefficient.

$$|p_0 - p'_0| > \alpha(\sigma+\sigma') \ldots \text{Merging is difficult}$$
$$\text{Otherwise} \ldots \text{Merging is possible} \tag{7}$$

Such determination of possibility of merging is performed between the state vector $S^{cM(L;)}_k$ and all $n_i$ state vectors $(S^{cM(L;)}_k, S^i_j)$ of the modal "i" obtained by adding the specific state $S^i_j$ to the state vector $(S^{cM(L;)}_k$.

If at least one of the $n_i$ state vectors $(S^{cM(L;)}_k, S^i_j)$ can be determined as difficult to be merged, the state vector $S^{cM(L;)}_k$ is deleted from the causality candidate list. State vectors conceptually low in order remain in the causality candidate list.

On the other hand, when a state vector that can be determined as difficult to be merged is not present in the $n_i$ state vectors $(S^{cM(L;)}_k, S^i_j)$, the $n_i$ state vectors $(S^{cM(L;)}_k, S^i_j)$ and all state vectors including the state vectors $(S^{cM(L;)}_k, S^i_j)$ in a part thereof (higher-order state vectors) are deleted. Low-order state vectors are collectively treated by conceptually high-order state vectors.

A specific example of the arrangement of the causality candidate list is explained.

A state vector [1 * −] shown in FIG. 61A is discussed below. [1 * −] is a state vector registered in the causality candidate list as a state vector representing a state of a causality candidate of certain state transition of the modal 2 . [1 * −] corresponds to $S^{cM(L;)}_k$.

In this case, possibility of merging is determined between [1 * −] and state vectors [1 * 1], [1 * 2], and [1 * 3] shown in FIG. 61B obtained by adding states of the modal 3, which is one modal not included in the modal 2, to [1 * −]. [1 * 1], [1 * 2], and [1 * 3] correspond to $(S^{cM(L;)}_k, S^i_j$.

A conditional probability of certain state transition of the modal 2 with respect to [1 * −] is calculated according to Formula (5). A conditional probability of the same state transition of the modal 2 with respect to each of [1 * 1], [1 * 2], and [1 * 3] is calculated according to Formula (6).

It is determined according to Formula (7) whether [1 * −] and [1 * 1], [1 * 2], and [1 * 3] can be merged.

When it is determined that all of [1 * 1], [1 * 2], and [1 * 3] can be merged with [1 * −], [1 * 1], [1 * 2], and [1 * 3] are deleted from the causality list and only [1 * −] is left.

On the other hand, it is determined that it is difficult to merge at least on of [1 * 1], [1 * 2], and [1 * 3], [1 * −] is deleted from the causality list and [1 * 1], [1 * 2], and [1 * 3] are left.

An idea of the arrangement of the causality list is explained with the Simpson's paradox as an example.

The Simpson's paradox is explained below.

There were eighty patients of a certain disease. When a doctor treated a half of the patient (forty of the eighty patients), twenty of the forty patients were cured. When the doctor did not treat another half of the patients (remaining forty of the eighty patients), sixteen of the forty patients were cured. A curing ratio 50 attained when the patients were treated is higher than a natural curing ratio 40 attained when no patients were treated. Therefore, the treatment is considered to be effective.

Among the eighty patients, there were forty males and forty females. Since the number of treated male patients and the number of treated female patients were different, a result is analyzed according to sex.

Thirty males were treated and eighteen of the thirty males were cured. The remaining ten males were not treated. Seven of the ten males were naturally cured. Concerning only the males, a curing ratio 60 attained when the males were treated is lower than a natural curing ratio 70 attained when the males were not treated. It would be considered better not to treat the males.

Only ten females participated in the treatment. Only two of the ten females were cured. Nine of the remaining thirty females were naturally cured. In the case of the females, a curing ratio 20 attained when the females were treated is lower than a natural curing ratio 30 attained when the females were not treated. As in the case of the males, it would be considered better not to treat the females.

It is a question whether this treatment has an effect or rather has a side effect.

As modals that should be taken into account concerning transition, i.e., curing=(disease→health), there are "treatment" and "male and female". A relation among these modals is summarized as follows:

| | |
|---|---|
| P(curing\|treat) = 0.5 | σ = 0.079 |
| P(curing\|not treat) = 0.4 | σ = 0.078 |
| P(curing\|treat, male) = 0.6 | σ = 0.089 |
| P(curing\|treat, female) = 0.2 | σ = 0.13 |
| P(curing\|not treat, male) = 0.7 | σ = 0.14 |
| P(curing\|not treat, female) = 0.3 | σ = 0.084 |
| P(curing\|male) = 0.63 | σ = 0.077 |
| P(curing\|female) = 0.28 | σ = 0.071 |

A question is what causality that should truly be taken into account is. The method of arranging causality (arrangement of the state vectors of the causality candidate list) is applied. In the following explanation, a merging coefficient α is set to 1.

Causality concerning P(curing|treat) is arranged as follows:

$$|P(\text{curing}|\text{treat})-P(\text{curing}|\text{treat,male})|=0.1<(0.079+0.089)=0.17$$

$$|P(\text{curing}|\text{treat})-P(\text{curing}|\text{treat,female})|=0.3>(0.079+0.13)=0.21$$

Therefore, it is difficult to merge P(curing|treat, male) and P(curing|treat, female). P(curing|treat) is deleted.

Similarly, concerning P(curing|not treat), causality is as follows:

$$|P(\text{curing}|\text{not treat})-P(\text{curing}|\text{not treat,male})|=0.3>(0.078+0.14)=0.22$$

$$|P(\text{curing}|\text{not treat})-P(\text{curing}|\text{not treat,female})|=0.1<(0.078+0.084)=0.16$$

Therefore, it is difficult to merge P(curing|not treat, male) and P(curing|not treat, female). P(curing|treat) is deleted.

On the other hand, when P(curing|male) is checked, both P(curing|treat, male) and P(curing|not treat, male) can be merged. Therefore, both P(curing|treat, male) and P(curing|not treat, male) are deleted and only P(curing|male) is left.

$$|P(\text{curing}|\text{male})-P(\text{curing}|\text{treat,male})|=0.03<(0.077+0.089)=0.17$$

$$|P(\text{curing}|\text{male})-P(\text{curing}|\text{not treat,male})|=0.07<(0.077+0.14)=0.22$$

Similarly, when P(curing|female) is checked, P(curing|treat, female) and P(curing|not treat, female) can be merged. Therefore, P(curing|treat, female) and P(curing|not treat, female) are deleted and only P(curing|female) is left.

$$|P(\text{curing}|\text{female})-P(\text{curing}|\text{treat,female})|=0.08<(0.071+0.13)=0.20$$

$$|P(\text{curing}|\text{female})-P(\text{curing}|\text{not treat,female})|=0.02<(0.071+0.084)=0.15$$

Consequently, causality effective at present is only "difference between male and female →presence or absence of curing". It is difficult to conclude whether the curing is effective or has a side effect. In other words, a causality analysis of L=2 that simultaneously takes into account both "difference between male and female" and "presence or absence of curing" is unnecessary. It is considered sufficient to analyze causality within a range of L=1.

Thereafter, experiments were repeated and the number of patients was increased to one hundred times as large as the number of the patients in the experiment explained above. However, as explained below, a paradoxical situation did not change.

There were eight thousand patients of a certain disease. When a doctor treated a half of the patient (four thousand of the eight thousand patients), two thousand of the four thousand patients were cured. When the doctor did not treat another half of the patients (remaining four thousand of the eight thousand patients), one thousand six hundred of the four thousand patients were cured.

Among the eight thousand patients, there were four thousand males and four thousand females. The number of treated male patients and the number of treated female patients were different.

Three thousand males were treated and one thousand and eight hundred of the three thousand males were cured. The remaining one thousand males were not treated. Seven hundred of the one thousand males were naturally cured.

Only one thousand females participated in the treatment. Only two hundred of the one thousand females were cured. Nine hundred of the remaining three thousand females were naturally cured.

Taking into account such a situation, it is examined what is derived from the above experiment result.

Under such a situation, probabilities are the same as those explained above. Since the number of samples N is increased to one hundred times as large as the number in the experiment explained above, only the expected value a of a magnitude of an error is reduced to 1/10 of the in the experiment explained above.

Causality candidates concerning P(curing|treat) are arranged as explained below according to the same calculation. Therefore, it is difficult to merge P(curing|treat, male) and P(curing|treat, female). P(curing|treat) is deleted.

$$|P(\text{curing}|\text{treat})-P(\text{curing}|\text{treat,male})|=0.1<(0.0079+0.0089)=0.017$$

$$|P(\text{curing}|\text{treat})-P(\text{curing}|\text{treat,female})|=0.3>(0.0079+0.013)=0.021$$

Similarly, concerning P(curing|not treat), causality is as follows:

$$|P(\text{curing}|\text{not treat})-P(\text{curing}|\text{not treat,male})|=0.3>(0.0078+0.014)=0.0022$$

$$|P(\text{curing}|\text{not treat})-P(\text{curing}|\text{not treat,female})|=0.1<(0.0078+0.0084)=0.016$$

Therefore, it is difficult to merge P(curing|not treat, male) and P(curing|not treat, female). P(curing|treat) is deleted.

When P(curing|male) is checked, it is difficult to merge P(curing|treat, male) and P(curing|not treat, male). Therefore, P(curing|male) is deleted.

$$|P(\text{curing}|\text{male})-P(\text{curing}|\text{treat,male})|=0.03<(0.0077+0.0089)=0.017$$

$$|P(\text{curing}|\text{male})-P(\text{curing}|\text{not treat,male})|=0.07<(0.0077+0.014)=0.022$$

Similarly, concerning P(curing|female), it is difficult to merge P(curing|treat, female) and P(curing|not treat, female). Therefore, P(curing|female) is deleted.

$$|P(\text{curing}|\text{female})-P(\text{curing}|\text{treat,female})|=0.08>(0.0071+0.013)=0.020$$

$$|P(\text{curing}|\text{female})-P(\text{curing}|\text{not treat,female})|=0.02>(0.0071+0.0084)=0.015$$

Consequently, in this case, the causality analysis of L=2 that simultaneously takes into account "difference between male and female" and "presence or absence of treatment". In other words, causality that should be taken into account is summarized as follows:

| | |
|---|---|
| P(curing\|treat, male) = 0.6 | $\sigma$ = 0.0089 |
| P(curing\|treat, female) = 0.2 | $\sigma$ = 0.013 |
| P(curing\|not treat, male) = 0.7 | $\sigma$ = 0.014 |
| P(curing\|not treat, female) = 0.3 | $\sigma$ = 0.0084 |

If attention is directed to only one factor of "difference between male and female" and "presence or absence of treatment", wrong determination is made. As it is evident from the above, in this case, it can be concluded that curing performance is better when the patients are not treated regardless of male or female. In other words, in this treatment, a side effect is larger than an effect.

The causality estimation of L=2 is necessary rather than the causality estimation of L=1, which directs attention only to the presence of absence of treatment, because the difference between male and female concerning specific numerical values of the curing performance is obviously significant and it is necessary to take into account the difference between male and female in addition to the presence or absence of treatment. Actually, it is this necessity of stratification that solves the paradox.

Since the merging of the state vectors is performed by the causality-candidate-list arrangement processing unit 204 according to necessity, it is possible to leave state vectors that are necessary in terms of representing causality with certain state transition.

Figure 62:
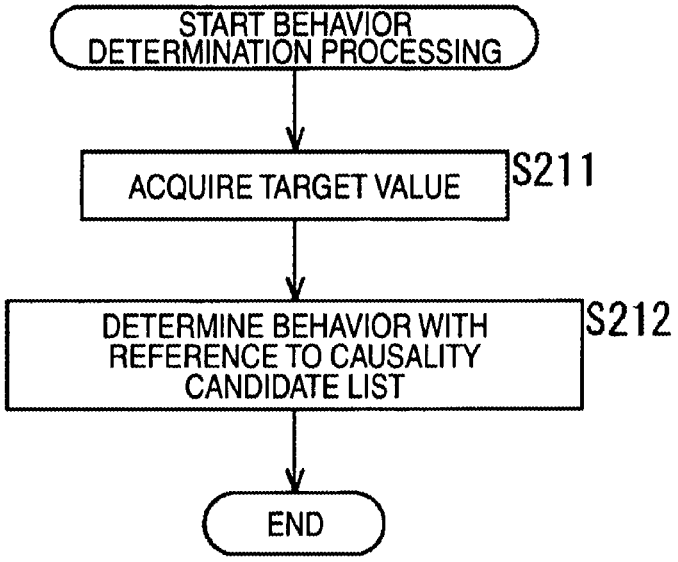
FIG. 62 is a flowchart for explaining behavior determination processing by the information processing apparatus.

Behavior determination processing performed by the behavior determining unit 205 by using the causality candidate list appropriately arranged as explained above and stored in the causality-candidate-list storing unit 203 is explained with reference to a flowchart of FIG. 62.

In step S211, the behavior determining unit 205 acquires a target value. The target value is, for example, a value representing one state of a certain modal to be set as a target.

In step S212, the behavior determining unit 205 reads out the causality candidate list stored in the causality-candidate-list storing unit 203 and determines a behavior for transitioning a state of the modal to the state represented by the target value. For example, the behavior determining unit 205 determines transitions from a present state of the modal to the state of the target value and acquires a predetermined number of causality candidates of the respective transitions out of causality candidates registered in the causality candidate list in order from one with a highest conditional probability. The behavior determining unit 205 causes a robot to perform a behavior for transitioning states of other modals to a state represented by a state vector that is one causality candidate having the highest conditional probability or a conditional probability equal to or higher than a fixed level selected out of the acquired causality candidates.

Figure 63:
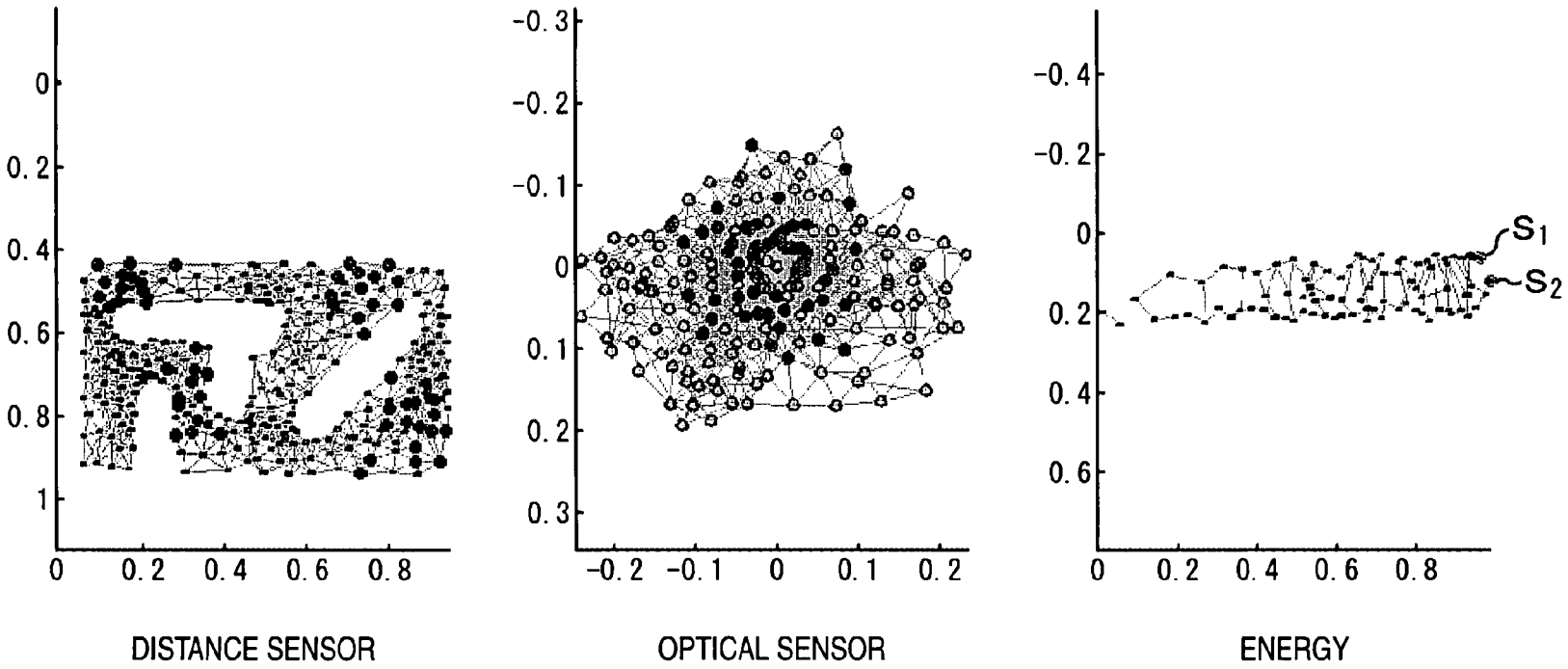
FIG. 63 is a diagram of an example of a behavior based on a causal relation.

When the causality estimation is appropriately performed, as shown in FIG. 63, it is possible to transition a state of energy of the robot from a present state $S_1$ to a state $S_2$ and increase the energy by transitioning a state of the optical sensor and a state of the distance sensor to predetermined states, respectively. In an example shown in FIG. 63, it is understood that the energy can be increased by bringing the state of the optical sensor to a state at the time when the robot is present around light. In a graph of energy shown in FIG. 63, the abscissa indicates the energy.

Figure 64:
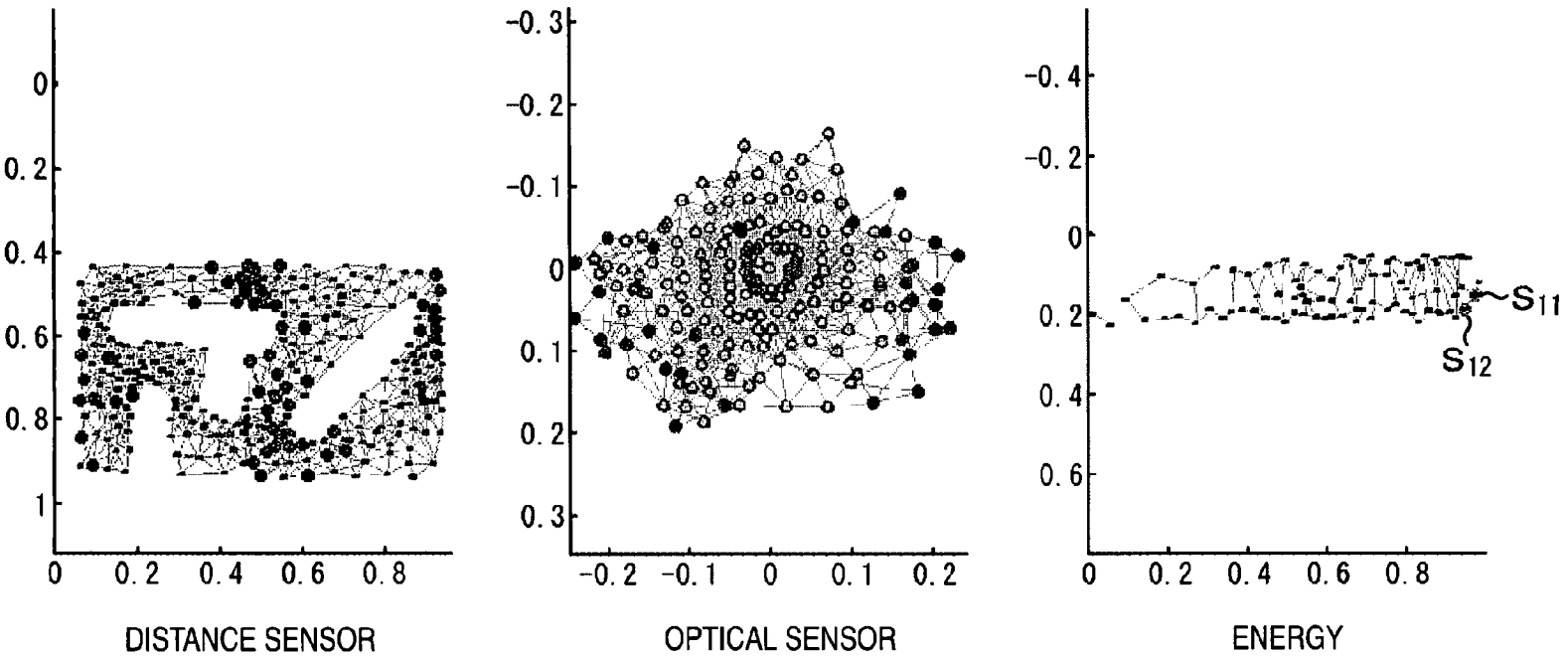
FIG. 64 is a diagram of another example of the behavior based on the causal relation.

As shown in FIG. 64, it is possible to transition a state of energy of the robot from a present state $S_{11}$ to a state $S_{12}$ and reduce the energy by transitioning the state of the optical sensor and the state of the distance sensor to predetermined states, respectively. In an example shown in FIG. 64, it is understood that the energy can be reduced by bringing the state of the optical sensor to a state at the time when the robot is present in a position to which light does not reach.

It is also possible to perform the causality estimation in determining a behavior.

As explained above, it is possible to narrow down candidates of events having causality and stabilize learning by formulating causality such that "occurrence of a certain event b" "causes state transition from an event ak to an event al (the events al and ak are exclusive to each other)" of another modal ai. Since the events al and ak are exclusive to each other, an event causing state transition ak→al is not present in the modal ai. Therefore, it is possible to exclude events in the modal ai.

Plural mechanisms of occurrence of the event al could be present. However, it is possible to ease complexity of a problem by treating the problem as a causality estimation problem of the state transition ak→al .

It is possible to cause a state transition probability representing causality having fluctuation with time to dynamically follow the causality by gently attenuating with time the number of times of simultaneously occurrence of events counted by a counter. Further, it is possible to balance the user and the search of causality taking into account possibility of fluctuation with time.

It is possible to solve tradeoff between the use and the search of causality by formulating causality between the state transition T: ak→al and the event b in a form of a conditional probability P(T|ak,b) such that behavior determination is performed by taking into account the number of times of simultaneous occurrence of the events and the expected value a of estimated error estimated from the conditional probability. In other words, it is possible to realize appropriate behavior regardless of whether the number of data samples is large or small.

Figure 65:
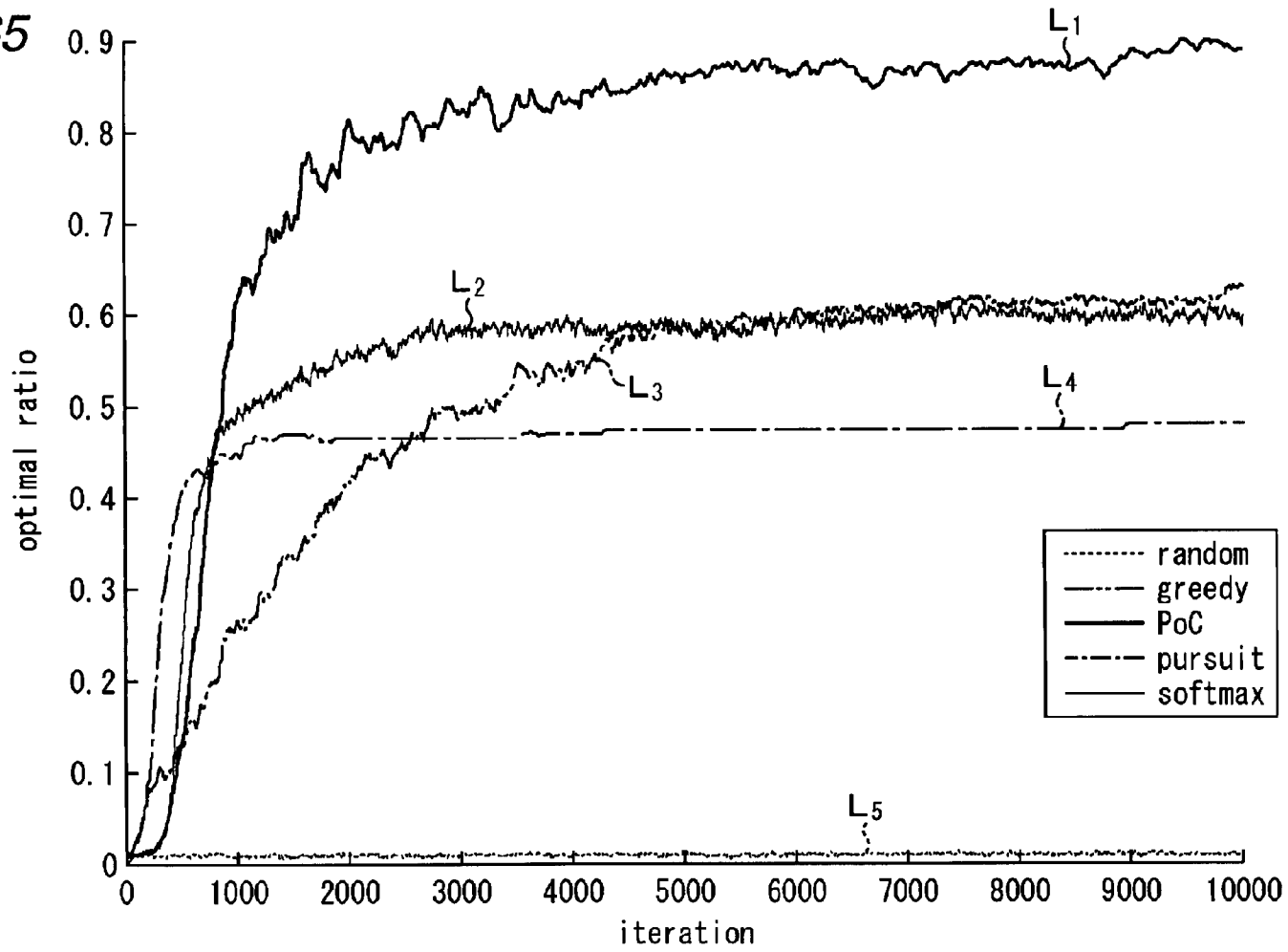
FIG. 65 is a graph of an example of measurement results.

FIG. 65 is a diagram of results obtained by calculating optimality of a behavior of a robot by adopting, as a method for solving the tradeoff between the use and the search of causality, the method of using a conditional probability with a probability increased by the expected value a and the methods in the past, i.e., the random method, the ϵ-greedy method, and the Soft-max method.

In FIG. 65, the abscissa represents the number of experiences and the ordinate represents optimality of a behavior. A curve $L_1$ represents a result obtained by using the method of using the conditional probability with a probability increased by the expected value σ and a curve $L_2$ represents a result obtained by using the Soft-max method. A curve $L_3$ represents a result obtained by using the ϵ-greedy method and a curve $L_4$ represents a result obtained by using subspecies of the ϵ-greedy method for reducing a parameter ϵ as time elapses. A curve $L_5$ represents a result obtained by using the random method. As shown in FIG. 65, according to the method of using the conditional probability with a probability increased by the expected value σ, a result better than results of the other methods can be obtained.

Whereas parameter tuning is necessary in the other methods in the past, parameter tuning is unnecessary in the method of using the conditional probability with a probability increased by the expected value σ. Therefore, it can be said that the method of using the conditional probability with a probability increased by the expected value σ is practical.

The series of processing explained above can be performed by hardware or can be performed by software. When the series of processing is performed by software, a program configuring the software is installed, from a program recording medium, in a computer incorporated in dedicated hardware, a general-purpose personal computer that can execute various functions by installing various programs, or the like.

Figure 66:
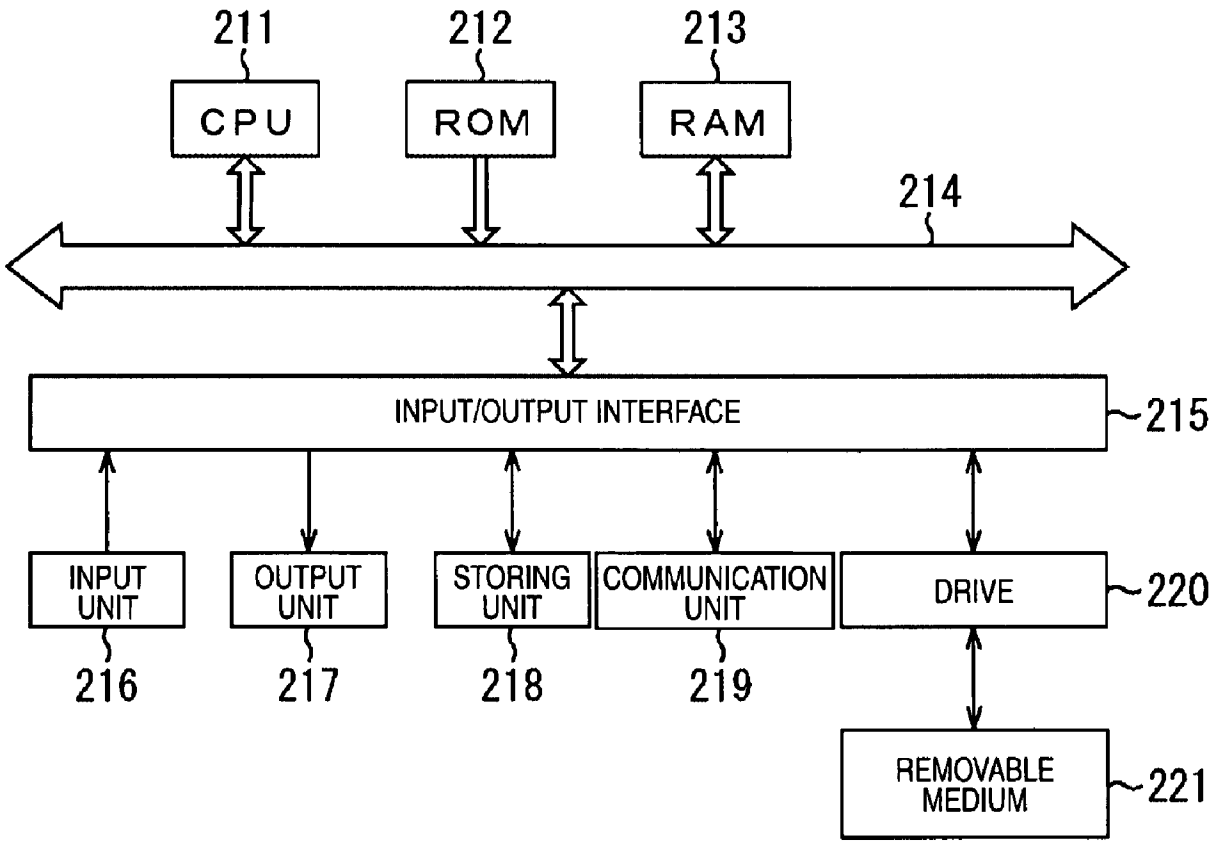
FIG. 66 is a diagram of a configuration example of a computer.

FIG. 66 is a block diagram of a configuration example of hardware of a computer that executes the series of processing according to a program.

A CPU (Central Processing Unit) 211, a ROM (Read Only Memory) 212, and a RAM (Random Access Memory) 213 are connected to one another by a bus 214.

An input and output interface 215 is connected to the bus 214. An input unit 216 including a keyboard, a mouse, and a microphone, an output unit 217 including a display and a speaker, a storing unit 218 including a hard disk and a non-volatile memory, a communication unit 219 including a network interface, and a drive 220 that drives a removable medium 221 such as an optical disk or a semiconductor memory are connected to the input and output interface 215.

In the computer configured as explained above, the CPU 211 loads, for example, a program stored in the storing unit 218 onto the RAM 213 via the input and output interface 215 and the bus 214 and executes the program, whereby the series of processing is performed.

The program executed by the CPU 211 is provided by, for example, being recorded in the removable medium 221 or transmitted via a wired or wireless transmission medium such as a local area network, the Internet, or a digital broadcast and is installed in the storing unit 218.

The program executed by the computer may be a program for performing processing in time series according to the order explained in this specification or may be a program for performing processing in parallel or at necessary timing such as when the program is invoked.

Embodiments of the present invention are not limited to the embodiment explained above. Various modifications are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:

model learning means for self-organizing, on the basis of a state transition model having a state and state transition to be learned by using time series data as data in time series, an internal state from an observation signal obtained by a sensor;

controller learning means for performing learning for allocating a controller, which outputs an action, to each of transitions of a state or each of transition destination states in the state transition model indicating the internal state self-organized by the model learning means;

initial-structure setting means for initializing structure of the state transition model to sparse structure;

data adjusting means for adjusting the time series data used for the learning according to progress of the learning and outputting time series data after the adjustment;

parameter estimating means for estimating a parameter of the state transition model using the time series data after adjustment; and structure adjusting means for adjusting the structure of the state transition model.

2. An information processing apparatus according to claim 1, further comprising:

planning means for planning a path for attaining a target as a transition sequence of a state on the state transition model indicating the internal state self-organized by the model learning means; and execution managing means for invoking, for each of transitions included in the path planned by the planning means, the controller allocated by the controller learning means to manage execution of an action along the path.

3. An information processing apparatus according to claim 2, wherein the model learning means self-organizes, independently for each of plural modals, an internal state from an observation signal obtained by a sensor of a modal corresponding thereto on the basis of state transition models, and the information processing apparatus further includes causality means for estimating causality of transition in one state transition model and a state of another state transition model among the state transition models for each of the plural modals respectively indicating the internal state self-organized by the model learning means.

4. An information processing apparatus according to claim 3, wherein the execution managing means causes, when it is difficult to directly control an internal state of a predetermined modal among the plural modals respectively indicating the internal state self-organized by the model learning means, the planning means to recursively execute planning to control the internal state on the basis of the causality estimated by the causality means.

5. An information processing apparatus according to claim 2, further comprising setting means for spontaneously setting a target from the internal state self-organized by the model learning means, wherein the controller learning means, the planning means, and the execution managing means execute respective kinds of processing to realize the target spontaneously set by the setting means.

6. An information processing method comprising the steps of:

self-organizing, on the basis of a state transition model having a state and state transition to be learned by using time series data as data in time series, an internal state from an observation signal obtained by a sensor;

performing learning for allocating a controller, which outputs an action, to each of transitions of a state or each of transition destination states in the state transition model indicating the self-organized internal state self-organized;

initializing structure of the state transition model to sparse structure;

adjusting the time series data used for the learning according to progress of the learning and outputting time series data after the adjustment;

estimating a parameter of the state transition model using the time series data after adjustment; and adjusting the structure of the state transition model.

7. An information processing apparatus according to claim 1, wherein the data adjusting means adjusts, according to the progress of the learning, the time series data from data including a macro characteristic to data including a micro characteristic.

8. An information processing apparatus according to claim 1, wherein the structure adjusting means adjusts the structure of the state transition model by performing division of a state of the state transition model, merging of a state, the addition of a state, addition of state transition, deletion of a state, or deletion of state transition.

9. An information processing apparatus according to claim 1, further comprising evaluating means for evaluating the state transition model for which the learning is performed and determining, on the basis of a result of the evaluation of the state transition model, whether the learning should be finished.

10. An information processing apparatus according to claim 1, wherein the state transition model is an HMM (Hidden Markov Model).

11. An information processing apparatus according to claim 10, wherein the structure adjusting means performs deletion of a state with a state not forming a path calculated by a Viterbi method among states of the HMM set as a target.

12. An information processing apparatus according to claim 10, wherein the structure adjusting means performs deletion of state transition with state transition not forming a path calculated by a Viterbi method among state transitions of the HMM set as a target.

13. An information processing apparatus according to claim 1, further comprising:

detecting means for detecting an event that occurs immediately preceding state transition that occurs in a first set including events exclusive to one another, the event being an event in a second set, which is a single or plural other sets including events exclusive to one another; and estimating means estimating, with the state transition set as a result event and the event in the second set detected by the detecting means set as a cause event, causality between the events included in the different sets.

14. An information processing apparatus according to claim 13, wherein the estimating means calculates, for each of events that occur in the second set immediately preceding the state transition and are detected by the detecting means, a conditional probability concerning the state transition and estimates causality between the events included in the different sets.

15. An information processing apparatus according to claim 14, wherein the detecting means detects, for a first event immediately preceding occurrence of the state transition and a second event in the second set that occurs simultaneously with the first event, a first number of times the first and second events simultaneously occur immediately preceding the state transition and a second number of times the first and second events simultaneously occurs, and the estimating means calculates a conditional probability concerning the state transition by dividing the first number of times detected by the detecting means by the second number of times detected by the detecting means.

16. An information processing apparatus according to claim 14, further comprising storing means for storing, in association with each other, each of the events that occur in the second set immediately preceding the state transition and the conditional probability concerning the state transition calculated for each of the events by the estimating means.

17. An information processing apparatus according to claim 16, further comprising determining means for determining, as a behavior for causing the state transition, a behavior for realizing an event that occurs in the second set immediately preceding the state transition, the event being associated with the conditional probability that is highest or equal to or higher than a fixed probability.

18. An information processing apparatus according to claim 16, further comprising controlling means for controlling, on the basis of a number of times of simultaneous occurrence of a first even immediately preceding occurrence of the state transition and a second event in the second set that occur simultaneously with the first event, granularity of the events stored by the storing means in association with the conditional probability concerning the state transition.

19. An information processing apparatus comprising:

a model learning unit self-organizing, on the basis of a state transition model having a state and state transition to be learned by using time series data as data in time series, an internal state from an observation signal obtained by a sensor;

a controller learning unit performing learning for allocating a controller, which outputs an action, to each of transitions of a state or each of transition destination states in the state transition model indicating the internal state self-organized by the model learning unit;

an initial-structure setting unit initializing structure of the state transition model to sparse structure;

a data adjusting unit adjusting the time series data used for the learning according to progress of the learning and outputting time series data after the adjustment;

a parameter estimating unit estimating a parameter of the state transition model using the time series data after adjustment; and a structure adjusting unit adjusting the structure of the state transition model.

*20. An information processing apparatus comprising:*

*a data receiving unit that receives time series data for learning;*

*a model storing unit that stores a state transition model for modeling the time series data, the state transition model including state information and state transition information;*

*an initial-structure setting unit that initializes structure of the state transition model to sparse structure;*

*a parameter estimating unit that estimates a parameter of the state transition model using the time series data; and*

*a structure adjusting unit that adjusts the structure of the state transition model by, with reference to a first state included in the structure of the state transition model and set as a target, removing a second merging state, in which the second merging state is included in the structure of the state transition model, from the structure of the state transition model.*

*21. The information processing apparatus of claim 20, wherein the state transition model is based on an HMM (Hidden Markov Model).*

*22. The information processing apparatus of claim 20, further comprising:*

*a data adjusting unit that adjusts the time series data according to progress of learning.*

*23. The information processing apparatus of claim 22, wherein the structure adjusting unit adjusts the structure based on adjustment conducted by the data adjusting unit.*

*24. The information processing apparatus of claim 22, wherein the data adjusting unit adjusts the time series data by adjusting a sampling rate for the time series data.*

*25. The information processing apparatus of claim 20, wherein the structure adjusting unit adjusts the structure by at least limiting a transition of the state transition model.*

*26. The information processing apparatus of claim 20, wherein the structure of the state transition model is adjusted by the removing of the second merging state and adding, with reference to the first state, a third state to the structure of the state transition model, according to progress of the learning.*

*27. A method comprising:*

*receiving time series data for learning;*

*storing a state transition model for modeling the time series data, the state transition model including state information and state transition information;*

*initializing structure of the state transition model to sparse structure;*

*estimating a parameter of the state transition model using the time series data; and*

*adjusting the structure of the state transition model by, with reference to a first state included in structure of the state transition model and set as a target, removing a second merging state, in which the second merging state is included in the structure of the state transition model, from the structure of the state transition model,*

*wherein the receiving, the storing, the initializing, the estimating and the adjusting are by a processing unit.*

*28. A non-transitory storage medium on which is recorded a program executable by a computer, the program comprising:*

*receiving time series data for learning;*

*storing a state transition model for modeling the time series data, the state transition model including state information and state transition information;*

*initializing structure of the state transition model to sparse structure;*

*estimating a parameter of the state transition model using the time series data; and*

*adjusting the structure of the state transition model by, with reference to a first state included in the structure of the state transition model and set as a target, removing a second merging state, in which the second merging state is included in the structure of the state transition model, from the structure of the state transition model.*

*29. An information processing apparatus comprising:*

*at least one processing unit to:*

*receive time series data for learning;*

*store a state transition model for modeling the time series data, the state transition model including state information and state transition information;*

*estimate a parameter of the state transition model using the time series data; and*

*adjust structure of the state transition model under conditions of sparse structure,*

*wherein the structure of the state transition model is adjusted by, with reference to a first state included in the structure of the state transition model and set as a target, removing a second merging state, in which the second merging state is included in the structure of the state transition model, from the structure of the state transition model.*

*30. The information processing apparatus of claim 29, wherein the structure is adjusted by at least limiting a transition of the state transition model.*

* * * * *